US012337613B2

(12) United States Patent
Vargo et al.

(10) Patent No.: US 12,337,613 B2
(45) Date of Patent: Jun. 24, 2025

(54) ROBOTIC APPARATUS INTERACTION WITH VEHICLE BASED ON VEHICLE DIMENSION TRANSLATION

(71) Applicant: The Reinalt-Thomas Corporation, Scottsdale, AZ (US)

(72) Inventors: Bradley Vargo, White Lake, MI (US); Keegan Elliott, Marshall, MI (US); Nathan Butler, Westland, MI (US); William Mapes, Grosse Ille Township, MI (US); Victor Darolfi, Canton, MI (US); Scott Coburn, Howell, MI (US); Riyadir Alalami, Novi, MI (US)

(73) Assignee: THE REINALT-THOMAS CORPORATION, Scottsdale, AZ (US)

( * ) Notice: Subject to any disclaimer, the term of this patent is extended or adjusted under 35 U.S.C. 154(b) by 0 days.

(21) Appl. No.: 17/975,917

(22) Filed: Oct. 28, 2022

(65) Prior Publication Data
US 2023/0052365 A1    Feb. 16, 2023

Related U.S. Application Data

(63) Continuation of application No. 17/359,389, filed on Jun. 25, 2021, now Pat. No. 11,597,233, which is a
(Continued)

(51) Int. Cl.
*B25J 9/16*    (2006.01)
*B21D 39/00*    (2006.01)
(Continued)

(52) U.S. Cl.
CPC ............ *B60B 29/001* (2013.01); *B21D 39/00* (2013.01); *B23P 6/00* (2013.01); *B23P 19/04* (2013.01);
(Continued)

(58) Field of Classification Search
CPC ... B60B 29/001; B60B 29/00; B60B 2320/10; B60B 2340/34; B60B 2340/50;
(Continued)

(56) References Cited

U.S. PATENT DOCUMENTS 9,584,364 B2 *   2/2017   Elisha ..................... H04L 41/40
10,304,261 B2 *   5/2019   Ricci .................. G06K 19/0708
(Continued)

OTHER PUBLICATIONS

Choi et al., Trends and opportunities for robotic automation of trim & final assembly in the automotive industry, 2010, IEEE, p. 124-129 (Year: 2010).*
(Continued)

*Primary Examiner* — McDieunel Marc
(74) *Attorney, Agent, or Firm* — Ballard Spahr LLP

(57) ABSTRACT

Vehicle dimension data describing dimensions of a vehicle are obtained, a robotic apparatus is moved to a position about the vehicle, a reference point of the vehicle is determined, and the robotic apparatus is caused to move to positions about the vehicle based on the reference point. The reference point is a center point of a selected wheel of the vehicle. A coordinate system of the robotic apparatus is aligned to the reference point of the selected wheel of the vehicle. Based on the aligned coordinate system of the robotic apparatus, operations are performed by the robotic apparatus to remove lug nuts from a wheel hub of the vehicle.

20 Claims, 32 Drawing Sheets

Related U.S. Application Data continuation of application No. 16/999,060, filed on Aug. 20, 2020, now Pat. No. 11,059,325, which is a continuation of application No. 16/872,666, filed on May 12, 2020, now Pat. No. 10,773,550, which is a continuation of application No. 16/386,512, filed on Apr. 17, 2019, now Pat. No. 10,974,546.

(60) Provisional application No. 63/273,143, filed on Oct. 28, 2021, provisional application No. 62/660,798, filed on Apr. 20, 2018.

(51) Int. Cl.
| | | |
|---|---|---|
| *B23P 6/00* | (2006.01) | |
| *B23P 19/04* | (2006.01) | |
| *B23P 19/06* | (2006.01) | |
| *B25J 11/00* | (2006.01) | |
| *B60B 29/00* | (2006.01) | |
| *B60C 25/05* | (2006.01) | |
| *B23P 21/00* | (2006.01) | |
| *B60S 5/00* | (2006.01) | |
| *B66F 7/26* | (2006.01) | |

(52) U.S. Cl.
CPC ............ *B23P 19/06* (2013.01); *B25J 9/1656* (2013.01); *B25J 9/1679* (2013.01); *B25J 9/1697* (2013.01); *B25J 11/005* (2013.01); *B25J 11/008* (2013.01); *B60B 29/00* (2013.01); *B60C 25/0515* (2013.01); *B23P 19/069* (2013.01); *B23P 21/002* (2013.01); *B23P 2700/50* (2013.01); *B25J 9/1661* (2013.01); *B25J 9/1674* (2013.01); *B60B 2320/00* (2013.01); *B60B 2320/10* (2013.01); *B60B 2340/18* (2013.01); *B60B 2340/34* (2013.01); *B60B 2340/50* (2013.01); *B60B 2340/52* (2013.01); *B60S 5/00* (2013.01); *B66F 7/26* (2013.01)

(58) Field of Classification Search
CPC ............ B60B 2340/52; B60B 2340/18; B60B 2320/00; B25J 11/005; B25J 9/1656; B25J 9/1697; B25J 9/1679; B25J 11/008; B25J 9/1674; B25J 9/1661; B23P 19/06; B23P 6/00; B23P 19/04; B23P 19/069; B23P 21/002; B23P 2700/50; B21D 39/00; B60C 25/0515; B60S 5/00; B66F 7/26

See application file for complete search history.

(56) References Cited

U.S. PATENT DOCUMENTS

| | | | |
|---|---|---|---|
| 10,354,460 B2* | 7/2019 | Ricci | G06F 16/951 |
| 10,552,788 B1* | 2/2020 | Hahn | G08B 25/10 |
| 10,579,062 B2* | 3/2020 | Zhu | B60W 30/095 |
| 10,672,060 B2* | 6/2020 | Ricci | G01C 21/3617 |
| 11,175,132 B2* | 11/2021 | Adams | G01C 21/1656 |
| 2019/0213752 A1* | 7/2019 | Adato | G06F 17/18 |
| 2023/0137789 A1* | 5/2023 | Vargo | B25J 9/1687 |
| | | | 700/97 |
| 2024/0219191 A1* | 7/2024 | Eylander | G01C 21/3453 |

OTHER PUBLICATIONS

Hahimoto et al., Object-transportation control by multiple wheeled vehicle-planar Cartesian manipulator systems, 1995, IEEE, pg. ( Year: 1995).*

Nitulescu, Mobile Robot Tracking Control Experiments along Memorized Planed Trajectories, 2006, IEEE, p. 1-6 (Year: 2006).*

Wada et al., Omnidirectional holonomic mobile robot using nonholonomic wheels, 1995, IEEE, p. 446-453 (Year: 1995).*

* cited by examiner

| Vehicle Id | Make | Model | Year | Lug-Nut Pattern | Vehicle Lift Height | Vehicle Lift Points |
|---|---|---|---|---|---|---|
| 1234567 | Ford | Mustang | 2015 | 5-bolt | 20 inches | x-y coordinate data |
| 1234568 | Ford | Mustang | 2016 | 5-bolt | 21 inches | x-y coordinate data |
| 1234569 | Ford | Mustang | 2017 | 5-bolt | 21 inches | x-y coordinate data |
| 1234570 | Chevrolet | Cruze | 2014 | 4-bolt | 18 inches | x-y coordinate data |
| 1234571 | Chevrolet | Cruze | 2015 | 4-bolt | 18 inches | x-y coordinate data |
| 1234572 | Chevrolet | Cruze | 2016 | 4-bolt | 18 inches | x-y coordinate data |
| 1234573 | Jeep | Wrangler | 2015 | 5-bolt | 22 inches | x-y coordinate data |
| 1234574 | Jeep | Wrangler | 2016 | 5-bolt | 22 inches | x-y coordinate data |

ROBOTIC APPARATUS INTERACTION WITH VEHICLE BASED ON VEHICLE DIMENSION TRANSLATION

CROSS-REFERENCE TO RELATED APPLICATIONS

This application is a non-provisional application and claims the benefit of provisional U.S. Patent Application Ser. No. 63/273,143, filed Oct. 28, 2021, which is hereby incorporated by reference in its entirety. This application is a continuation-in-part of U.S. application. Ser. No. 17/359,389, filed Jun. 25, 2021, which is a continuation of U.S. application Ser. No. 16/999,060, filed Aug. 20, 2020, issued as U.S. Pat. No. 11,059,325, which is a continuation of U.S. application Ser. No. 16/872,666 filed May 12, 2020, issued as U.S. Pat. No. 10,773,550, which is a continuation of U.S. application Ser. No. 16/386,512, filed on Apr. 17, 2019, issued as U.S. Pat. No. 10,974,546, which claims the benefit of U.S. Provisional Application No. 62/660,798 filed Apr. 20, 2018, which are hereby incorporated by reference in their entirety.

TECHNICAL FIELD

This specification relates generally to automobile maintenance, and more particularly to systems, apparatus and methods for automated removal and replacement of vehicle wheels and tires.

BACKGROUND

Removal of wheels from vehicle wheel hubs and placing old tires with new tires onto the removed wheels is a manual and time-intensive process. Often a vehicle is jacked up or lifted by a manually operated hydraulic lift or vehicle jack. Lug nuts are then manually removed via a torque wrench or tire iron. Once the lug nuts are removed, the wheel and tire are then physically handled and removed from a wheel-hub. Such manual operations may lead to inefficient operations, and potential physical hazards to a person removing the wheel and tire from the vehicle.

SUMMARY

Systems, apparatus and methods for obtaining vehicle dimension information and determining a reference point of a vehicle, which may be used to facilitate performance of vehicle maintenance tasks, are disclosed.

In accordance with an embodiment, vehicle dimension data describing dimensions of a vehicle are obtained, a robotic apparatus is moved to a first position about the vehicle, a first reference point of the vehicle is determined, and the robotic apparatus is caused to move to a second position about the vehicle based on the determined first reference point.

In one embodiment, the determined first reference point is a center point of a first wheel of the vehicle.

In another embodiment, a coordinate system of the robotic apparatus is aligned to the determined first reference point of the first wheel of the vehicle. Based on the aligned coordinate system of the robotic apparatus, operations are performed by the robotic apparatus to remove lug nuts from a first wheel hub of the vehicle.

In another embodiment, the robotic apparatus is moved to a second position about a second wheel of the vehicle, a second reference point of the second wheel of the vehicle is determined, and the robotic apparatus is caused to move to positions about the second wheel of the vehicle based on the determined second reference point.

In another embodiment, the determined second reference point is a center point of the second wheel of the vehicle.

In another embodiment, a coordinate system of the robotic apparatus is aligned to the determined second reference point of the second wheel. The determined second reference point is a center point of the second wheel. Based on the aligned coordinate system of the robotic apparatus, operations are performed by the robotic apparatus to remove lug nuts from a second wheel hub of the vehicle.

In another embodiment, a vehicle identification number associated with the vehicle is obtained, a database that comprises information related to a plurality of vehicles is accessed, and the vehicle dimension data is obtained from the database based on the vehicle identification number.

In another embodiment, the vehicle dimension information includes at least one of dimensions of a wheel base of the vehicle and dimensions of a track width of the vehicle.

In another embodiment, a plane of a digital camera is aligned with a plane of a first wheel of the vehicle having a center point, and the digital camera is moved to a position where a center point of the camera is aligned with a center point of the first wheel. In other embodiment, a known plane of a camera is aligned with a known plane with reference to a first wheel.

In another embodiment, one or more cameras obtain digital imagery of a first wheel of the vehicle, the first wheel having a plurality of lug nuts and a wheel center. The digital imagery is used to determine a movement offset of a then current position of the robotic apparatus. The robotic apparatus is moved from the then current position to a new position based on the determined movement offset, and a determination is made whether the one or more cameras is aligned to the wheel center.

In another embodiment, the robotic apparatus has a digital camera. One or more movement offset values are determined and the robotic apparatus is moved based on the one or more movement offset values until an alignment point of the robotic apparatus is aligned to a center point of the first wheel, the alignment point being a center point of the digital camera.

In another embodiment, the movement offset includes coordinate values for x, y, z, rX, and rY offsets, wherein rY is a rotation value about the y axis value, and rX is a rotation value about the x axis value.

In another embodiment, the digital imagery includes 2D imagery and a 3D point cloud of the first wheel. The 2D imagery is inputted into a machine learning model. A plurality of bounding boxes associated with the lug nuts of the first wheel are generated and a number of the lug nuts of the first wheel is determined. The plurality of bounding boxes and the 3D point cloud are used to define an x, y, z coordinate information for each of the plurality of lug nuts, and an average Z distance of the lug nuts is calculated. Also, Z distances for each of the lug nuts may be determined.

In accordance with another embodiment, a system includes a robotic apparatus adapted to perform a maintenance task on a vehicle and a processing device communicatively coupled to the robotic apparatus. The processing device includes a memory storing computer program instructions and a processor communicatively coupled to the memory. The processor is configured to execute the computer program instructions which, when executed on the processor, cause the processor to perform operations including obtaining vehicle dimension data describing dimensions of a vehicle, causing the robotic apparatus to move to a first position about the vehicle, determining a first reference point of the vehicle, and causing the robotic apparatus to move to a second position about the vehicle based on the determined first reference point.

These and other advantages of the present disclosure will be apparent to those of ordinary skill in the art by reference to the following Detailed Description and the accompanying drawings.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

FIG. 6 illustrates an example table for a database of the computer system.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

System

Figure 1:
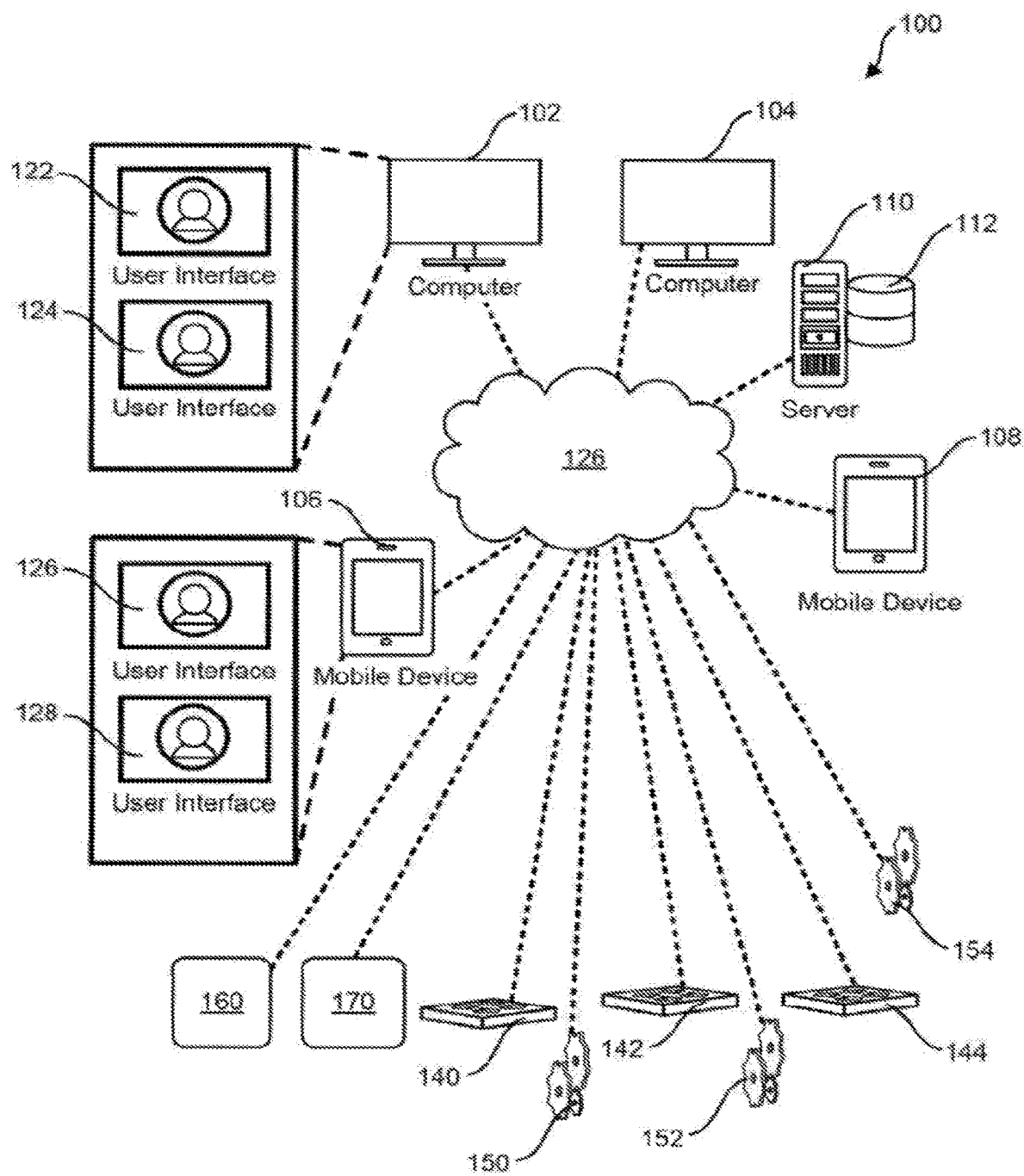
FIG. 1 illustrates an example system for the automated removal and replacement of a wheel and tire.

Referring to FIG. 1, an exemplary system 100 for the automated removal and replacement of a wheel and tire is disclosed. The system 100 can be a system of one or more computers 102, 104, 106, 108, 110 (generally referred to as 102) including software executing a method system on one or more computers 102, which is in communication with, or maintains one or more databases 112 of information. While the database 112 is depicted as coupled with one computer 110, the database may be distributed, replicated in whole or part, and communicatively coupled to other computers 102. For example, portions or subsets of data may be distributed to various computers 102 to allow for local database access of information stored on database 112. The information stored by the system 100 may include, but is not limited to, the following databases:

Customer Database, including fields such as cust_record_id, customer_name, customer_address, customer_phone_number.

Customer Vehicle Database, including fields such as cust_veh_record_id, vehicle_ make, vehicle_ model, vehicle_identification_number, vehicle_license_ plate, vehicle_ year, vehicle_color, desired_tire_ pressure, desired_ gas_type, wheel_locks.

General Vehicle Database, including fields gen_veh_ record_id, vehicle_ make, vehicle_ model, vehicle_ year, lifting_ point_coordinates, lifting_height, axle_distance, tpms_type, lugnut_configuration.

Inventory Database, including fields such as inv_record_id, tire_quantity, tire_size, tire_brand, manufacturer, speed_rating, pressure_setting, location_stored, location_coordinates.

Scheduling Database including fields such as sched_record_id, cust_record_id, cust_veh_record_id, schedule_appointment_date_and_time, front_tire_SKU_numbers, rear_tire_SKU_numbers.

The system 100 generates tire change jobs based on received customer information and customer vehicle information. The system 100 may use the received information as control parameters to direct the control or operation of a vehicle lifting device for lifting vehicles and robotic apparatus for lug nut and wheel removal and replacement as disclosed herein. The system 100 may receive and store images associated with a customer vehicle in a database 112. The system 100 uses image evaluation processes to perform object detection, and/or create 3-dimensional model of a wheel of a vehicle. The system 100 interacts and is communicatively coupled with one or more vehicle lifting devices 140, 142, 144 (generally referred to as 140), with one or more robotic apparatus 150, 152, 154 (generally referred to as 150) and one or more tire removal/replacement machines 160, and one or more tire balancing machines 170. The system 100 may include multiple interfaces 122, 124, 126, 128 (generally referred to as 122) based on the particular functionality to be performed by the system 100. For example, the system 100 may include a customer interface for receiving customer and vehicle information; an operator interface for control and operation of the vehicle lifting device 140, the robotic apparatus 150, the tire removal/replacement machines 160, and/or the tire balancing machines 170. Additionally, other interfaces may be utilized.

The system 100 may use a computer network 126 for communication to one or more computers 102 of the system 100. As described herein, the computer network 120, may include, for example, a local area network (LAN), a virtual LAN (VLAN), a wireless local area network (WLAN), a virtual private network (VPN), cellular network, wireless network, the Internet, or the like, or a combination thereof. Communication among devices of may be performed using any suitable communications protocol such as TCP/IP or EtherNET IP.

Vehicle lifting devices 140 may be communicatively coupled to the system 100 via computer network 120. The vehicle lifting devices 140 may receive instructions, commands and other data from the system 100. The vehicle lifting device 140 is further described herein. The vehicle lifting device 140 may include different types of sensors to obtain sensor data describing a vehicle. The sensor data obtained by the vehicle lifting device 140 may be transmitted to the system 100 for analysis and/or storage into a database 112. The vehicle lifting device 140 provides a mechanism to physically lift a vehicle in a vertical manner according to a predetermined height value.

Robotic apparatus 150 may be communicatively coupled to the system 100 via computer network 120. The robotic apparatus 150 may receive instructions, commands and other data from the system 100. The robotic apparatus 150 may include different types of sensors integrated into the robotic apparatus 150 to obtain sensor data describing the vehicle. The sensor data obtained by the robotic apparatus 150 may be transmitted to the system 100 for analysis and/or storage into a database 112. The robotic apparatus 150 provides a mechanism to physically remove a wheel from a vehicle and physically replace the wheel back onto the vehicle.

One or more tire removal machines 160 may be communicatively coupled to the system 100 via computer network 120. The tire removal machine 160 may include different types of sensors integrated into the tire removal machine 160 to obtain sensor data describing a wheel and/or tire. The sensor data obtained by the tire removal machine 160 may be transmitted to the system 100 for analysis and/or storage into a database 112. The tire removal machine 160 may receive one or more parameters, such as wheel size, tire size, tire pressure monitoring system (TPMS) location, desired tire inflation PSI value and/or a value for a type of gas such as air, or nitrogen to be used for tire inflation.

One or more tire balancing machines 170 may be communicatively coupled to the system 100 via computer network 120. The tire balancing machine 170 may include different types of sensors integrated into the tire balancing machine 170 to obtain sensor data describing a wheel and/or tire.

Figure 2A:
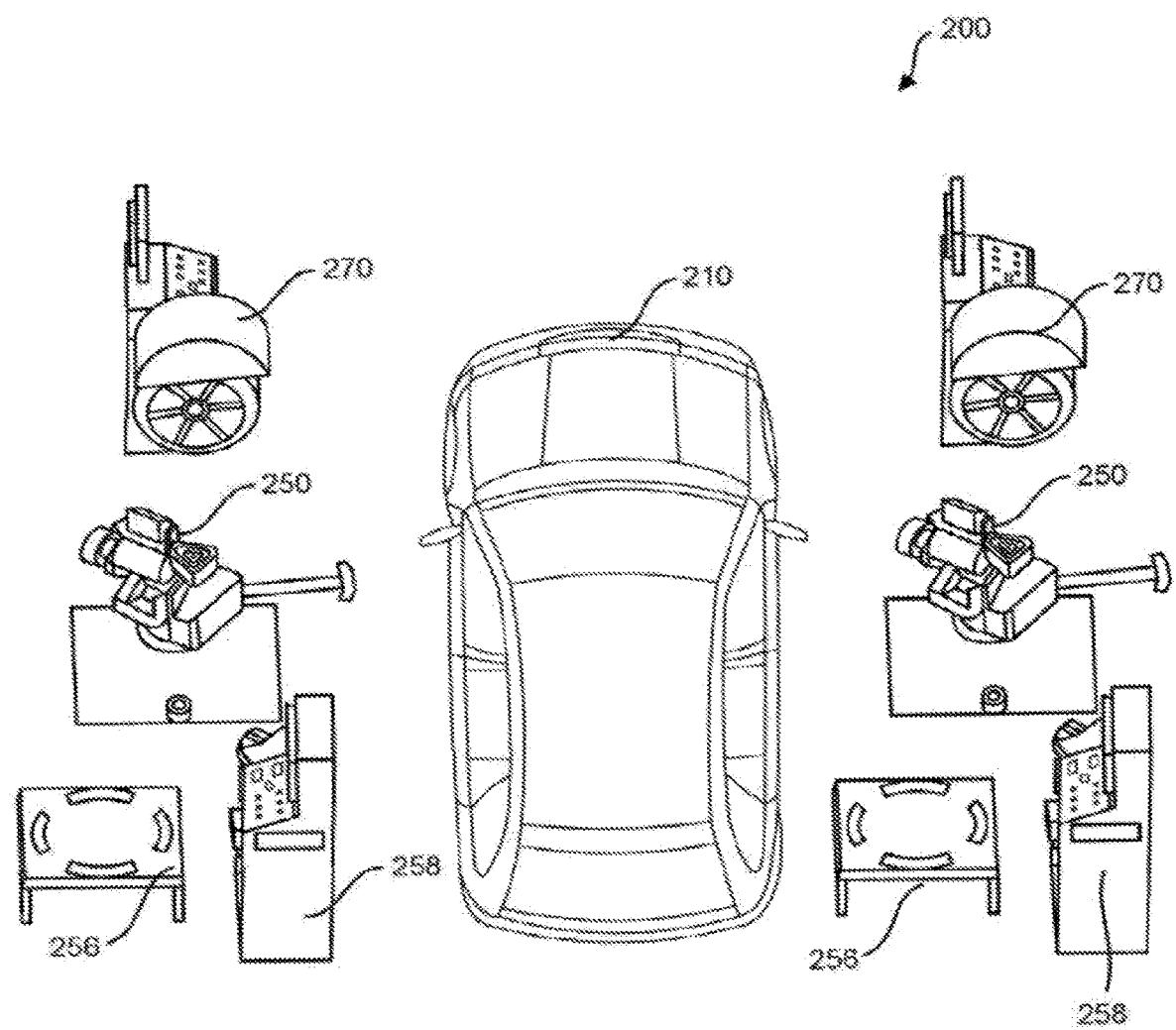
FIG. 2A illustrates an example of an automated wheel removal and wheel replacement station.

FIG. 2A illustrates an example of an automated wheel removal and wheel replacement station 200. The example illustrates a vehicle 210 positioned over a vehicle lifting device 140 (not shown). In one embodiment of the station 200, two robotic apparatus 250 (also referred to as 150 in FIG. 1) are positioned in a proximate location where the robotic apparatus 250 can interact with a vehicle 210 and manipulate the wheel fasteners, remove the wheels, and replace the wheels. Additionally, depicted are wheel holding stations 256 where the robotic apparatus 250 may place a removed wheel onto the wheel holding station 256, and/or where a wheel may be positioned in advance of the wheel being placed back onto the vehicle 210.

Additionally, a control station 258 may be used for control and operation of the robotic apparatus 250. The control station may be used for manual and/or automated control of the robotic apparatus 250. The control station 258 may receive instructions, commands and other data from the system 100 (as depicted in FIG. 1). The control station 258 may be communicatively coupled to control the robotic apparatus 250. Also depicted are tire balancing machines 270 that are communicatively coupled to the system 100 (as depicted in FIG. 1).

Figure 2B:
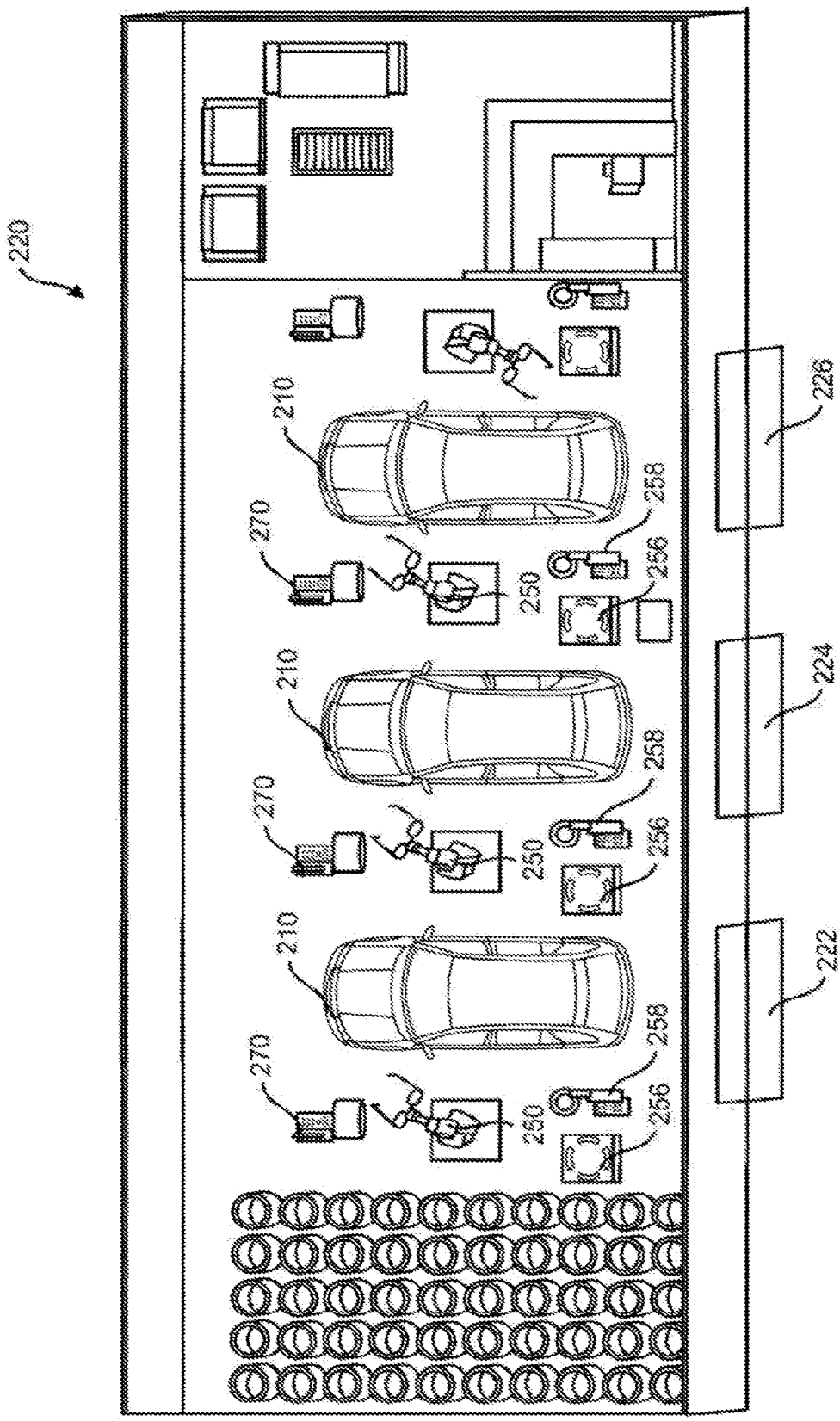
FIG. 2B illustrates an example of automated wheel removal and wheel replacement stations.

FIG. 2B illustrates an example of automated wheel removal and wheel replacement stations. This example illustrates a physical structure 220 with three bays 222, 224, 226. The physical structure 220 includes multiple robotic apparatus 250 (also referred to as 150 in FIG. 1), multiple control stations 258, multiple wheel holding stations 256, and multiple tire balancing machines 270. This example illustrates a configuration where multiple vehicles 210 may be serviced by the robotic apparatus 250 for automated wheel removal, tire change and wheel replacement.

Figure 3:
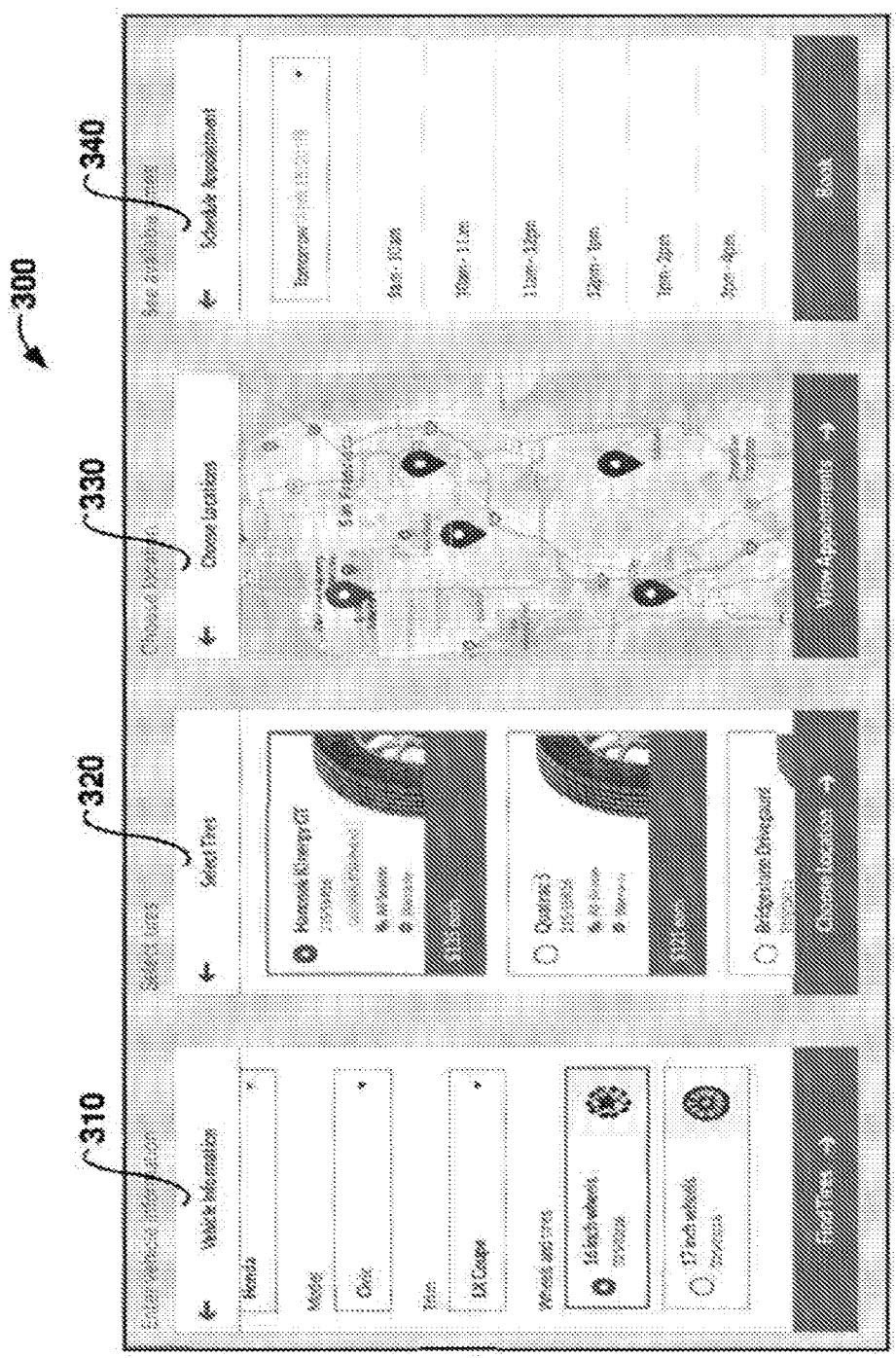
FIG. 3 illustrates an example user interface of the computer system.

Referring to FIG. 3, an exemplary application user interface (300) of the system 100 is disclosed. The application user interface 300 may be presented via a user computing device using a browser, other network resource viewer, desktop or mobile application, or otherwise. The user interface 300 includes a portion of the user interface 310 for obtaining vehicle information. The user interface 300 additionally includes a portion 320 for receiving a selection of a tire. The user interface 300 additionally includes a portion 330 for choosing a physical location for the changing of a tire. The user interface 300 additionally includes a portion 340 for selecting a date and time for scheduling the tire change job. The user interface 300 show available appointment dates and times.

The system 100 obtains customer order information through a respective website or device application. (An application can herein be described by as a software program that runs on a computer or mobile device.) A user may interact with a device 102 (as depicted in FIG. 1) (e.g. phone, tablet, computer, etc.) that runs and thereby executes an application, for example that has been downloaded from an online application store. Via a user interface of the system 100, a user can specify their vehicle make, model, and year 310.

The system 100 may prompt the user for additional information, wherein the user selects and purchases a desired tire model(s) via the user interface 320. Additionally, the system 100 prompts the user to input which tire(s) is/are going to be replaced. (i.e. the front driver's side tire, front passenger side tire, rear passenger side tire, etc.) The system 100 stores information received from the user within the database 112.

The system 100 prompts the user to input information about their desired appointment date and time 340. The system 100 checks for available dates and store hours listed by the commercial location for appointment. Once identified, the system 100 presents the appointment slots to the user in the respective device's interface.

Figure 4:
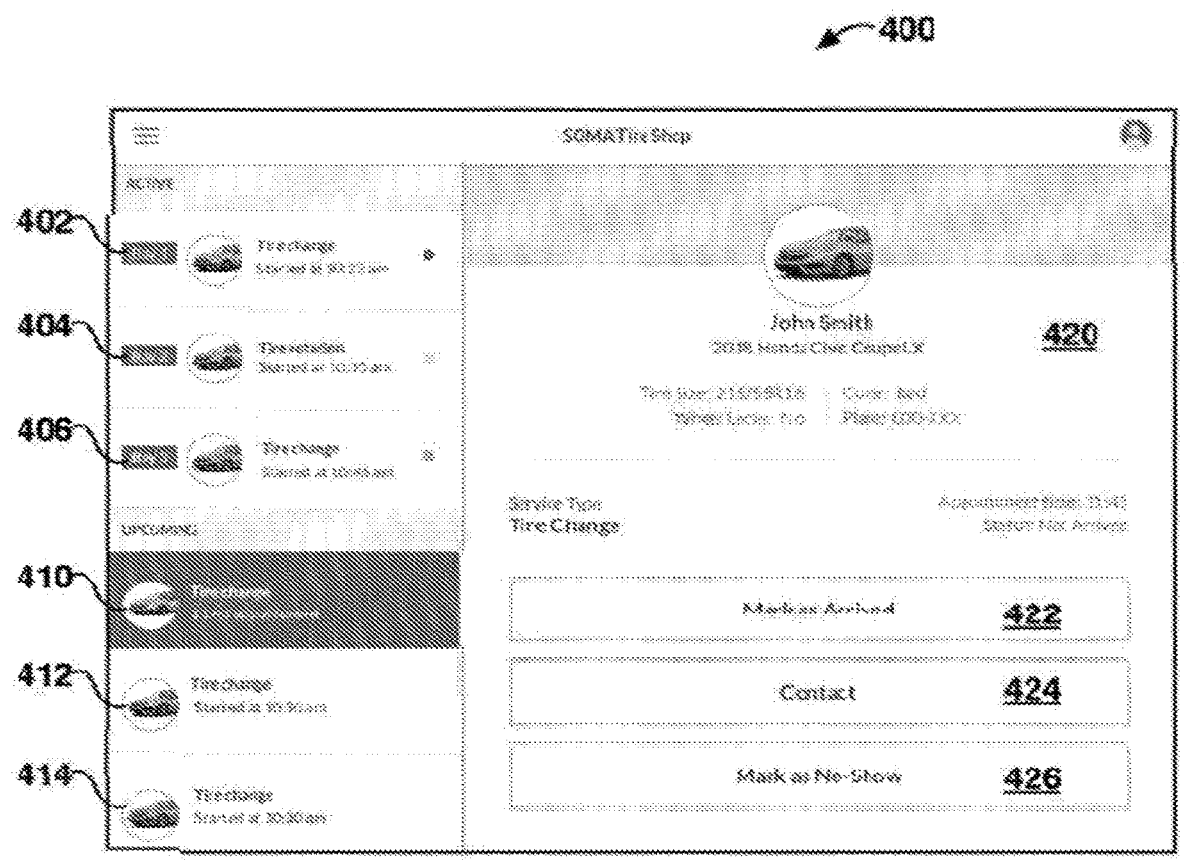
FIG. 4 illustrates an example user interface of the computer system.

Referring to FIG. 4, an exemplary application user interface 400 of the system 100 is disclosed. The user interface 400 depicts active automated tire change operations in progress 402, 404, 406 and other scheduled tire change jobs 410, 412, 414. The user interface 400 may receive a selection of an upcoming scheduled appointment, for example a selection of an appointment 410. The user interface in response to the selection may depict vehicle check-in information in a portion of the user interface 420.

The user interface 400 may receive an input of "marked as arrived" for a vehicle via user interface (UI) affordance 422. The user interface 400 may receive an input via UI affordance 424 to contact a person associated with the tire change job. In response to receipt of an input, a device of the system 100 may automatically initiate a call, text message, e-mail or other communication type to the vehicle owner, or person, associated with the tire change job. The user interface 400 may receive an input via UI affordance 426 to mark the vehicle as a not arriving for a scheduled tire change job.

Figure 5:
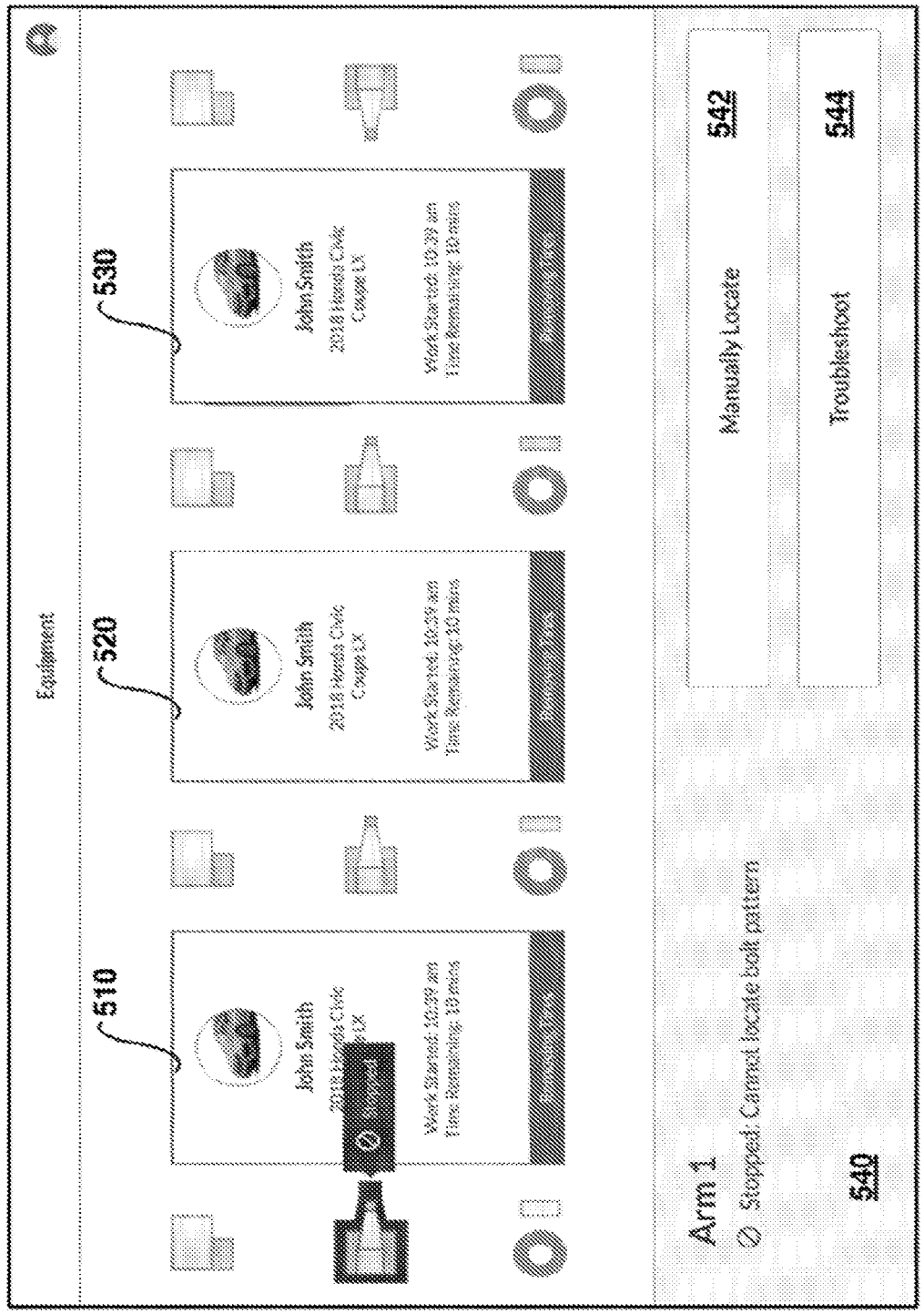
FIG. 5 illustrates an example user interface of the computer system.

Referring to FIG. 5, an exemplary application user interface 500 of the system 100 is disclosed. The system 100 may provide status and other operation information of the robotic apparatus 150, vehicle lifting device 140, tire changing machine 160, and/or the tire balancing machine 170. In this example, portions 510, 520, 530 of the user interface 500 depict status of different tire change jobs in progress.

In the example user interface, a robotic apparatus 150 is shown as not being able to locate a particular bolt pattern for a wheel. This error condition causes the system 100 to stop the automated wheel removal process and transmit information to the user interface 500 about the error condition. The user interface 500 includes a dynamic portion 540 of the user interface 500 that provides unique UI affordance 542, and real-time photos or video from the robotic apparatus, 544 based on the particular error condition or problem determined by the system 100.

FIG. 6 illustrates an example table for a database 112 of the system 100. This table 600 represents a table that includes information for automating vehicle lifting, vehicle wheel removal/replacement. For example, table 600 may include a unique vehicle identifier, the make of a vehicle, the model of the vehicle, the lug-nut configuration of the vehicle, a vehicle lift height, lifting points coordinates, axle distance.

Figure 7:
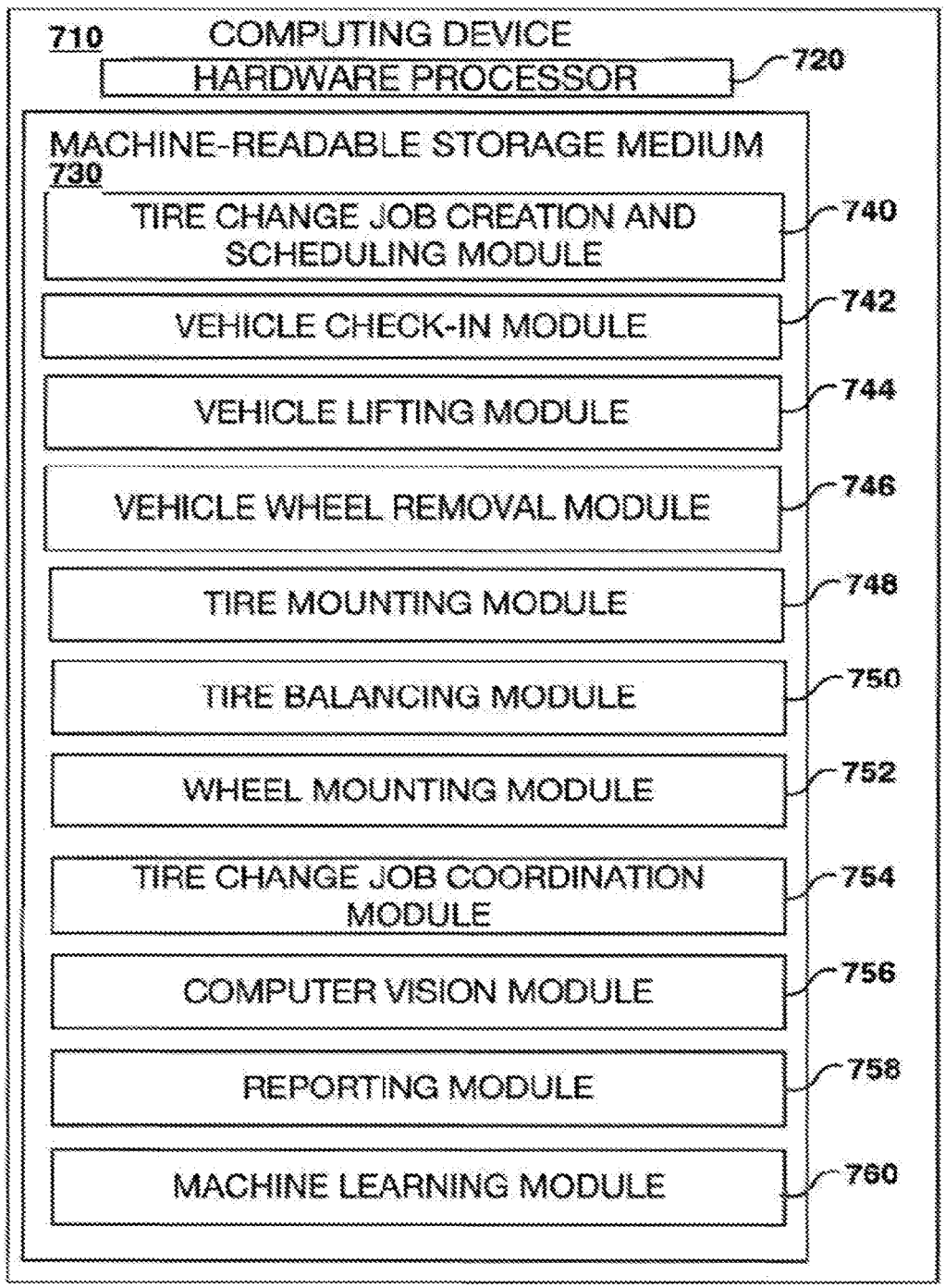
FIG. 7 illustrates system modules of the computer system.

FIG. 7 illustrates various modules 740-760, or processes, that the system 100 may perform. The modules 740-760 may be performed by any number of processors, and by any number of computers. The modules may be executed as software instructions, such as a daemon or service, by a computing device 710 by hardware processor 720. Executable instructions, programs or other code may be stored in a machine-readable storage medium 730.

Figure 8:
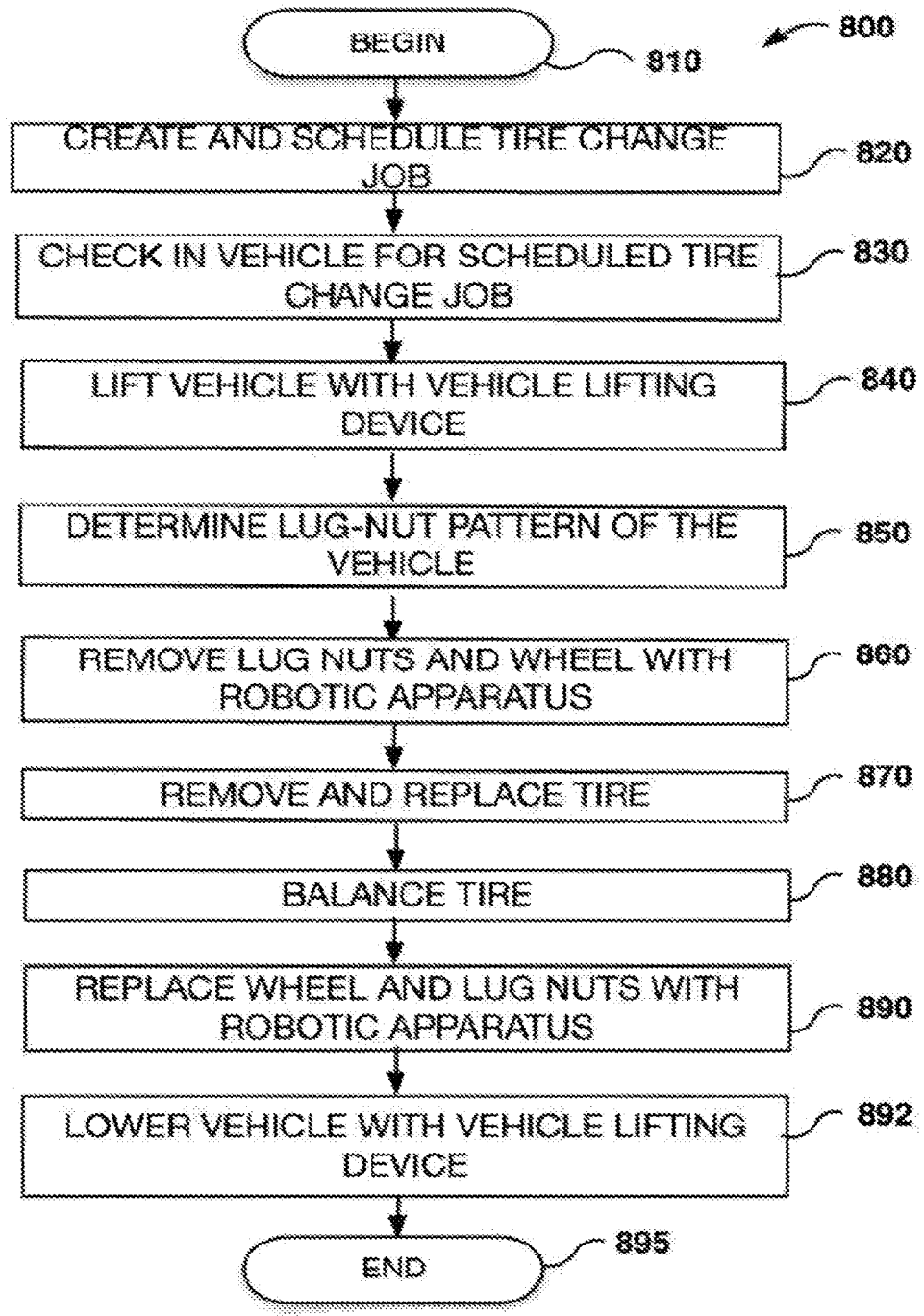
FIG. 8 illustrates an example overview of a method for automated wheel removal and wheel replacement.

FIG. 8 illustrates an example method 800 for automated wheel removal, tire change, and wheel replacement. In general, the method begins (block 810) with a tire change job being created and scheduled (block 820). The method then checks in a vehicle for a scheduled tire change job (block 830). The method then lifts the vehicle with a vehicle lifting device (block 840). The system 100 determines a lug-nut pattern for the vehicle (block 850). The lug nuts and the wheel are removed using a robotic apparatus (block 860). The removed wheel is positioned to a tire removal and replacement machine where the tire is removed from the wheel, and a new tire placed onto the wheel (block 870). The wheel with the new tire is then placed on a balancing machine and balanced with the application of weights to the wheel (block 880). The wheel is then placed back onto the vehicle, and the lug nuts are replaced using the robotic apparatus (block 890). When all wheels are secured onto the vehicle, then the vehicle is lowered by the vehicle lifting device (block 892). The method then ends (block 895). Other lifting device may be used, such as floor drop systems.

Job Scheduling

Figure 9:
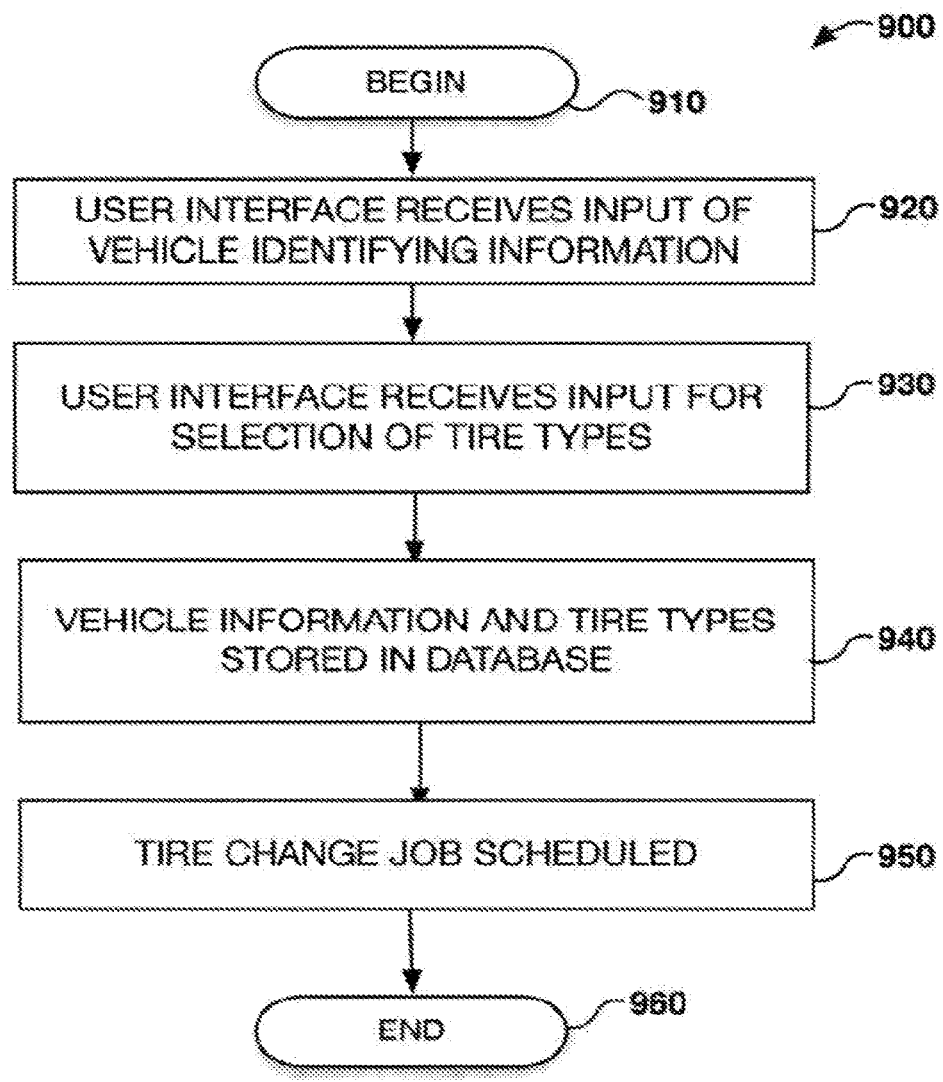
FIG. 9 illustrates an example method for tire change job creation and tire change job scheduling.

As described in FIG. 7, the system 100 may include module 740 which performs operations for the creation and scheduling of tire change jobs. FIG. 9 and the description below further describe a method 900 for the tire change job creation and scheduling. In general, the method 900 begins (block 910) with the receipt of vehicle identifying information from a user interface (block 920) of the system 100. A user interface of the system 100 receives input for selection of the tire types (block 930). The vehicle information and tire types are stored in a database (block 940). A selection for date and time for a tire change job is selected via the user interface. The tire change job is then scheduled (block 950). The method then ends (block 960).

Vehicle Check-In

A vehicle arrives at a physical location for a scheduled tire change job. The physical location ideally is a structure with one or more bays where a vehicle may enter the bay for replacement of the tires.

Figure 10:
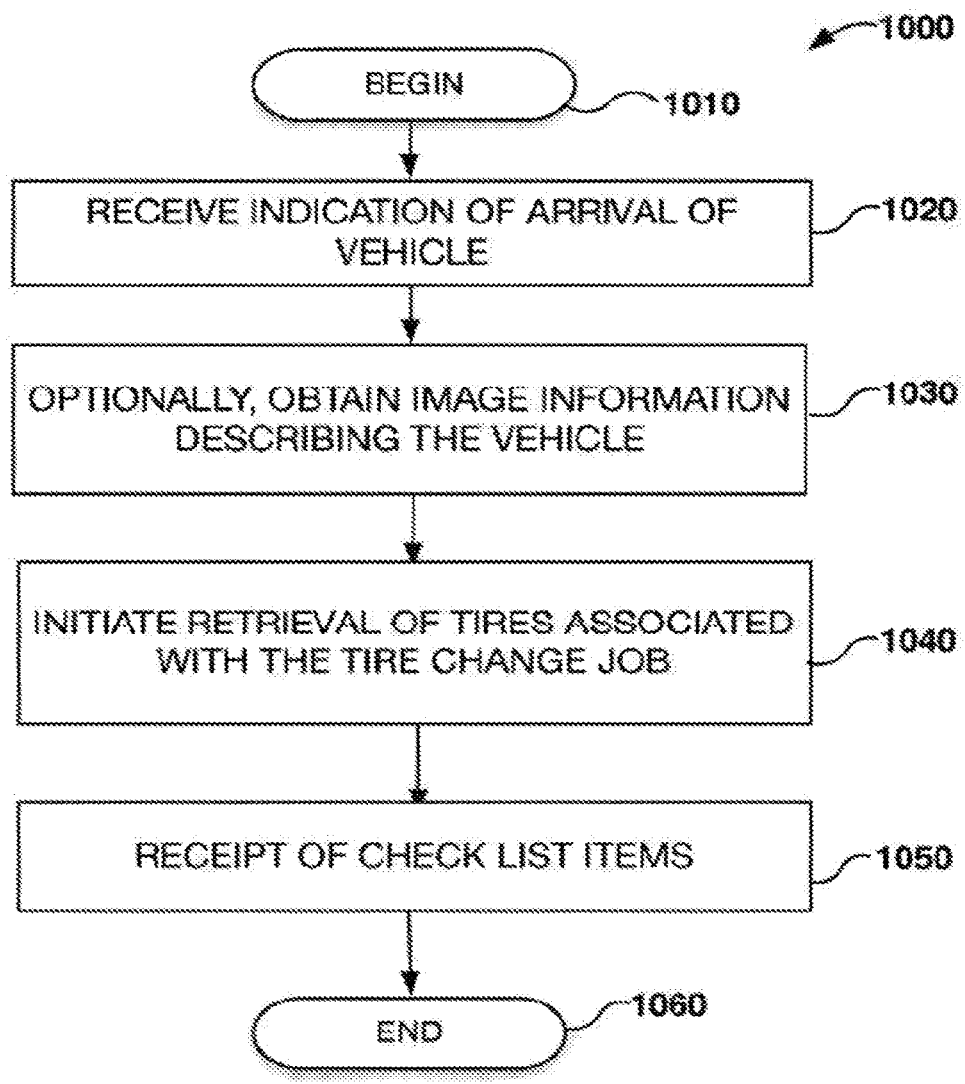
FIG. 10 illustrates an example method for vehicle check-in for a scheduled tire change job.

As described in FIG. 7, the system 100 may include module 742 which performs operations for checking in a vehicle for a scheduled tire change job. FIG. 10 and the description below further describes a method 1000 for checking in a vehicle for a scheduled tire change job. In general, the method 1000 begins (block 1010) with the receipt of an indication of arrival of a vehicle (block 1020). For example, via receipt of an input via a user interface of the system 100, and/or an automated detection of the arrival of a vehicle. The system 100 optionally obtains image information describing the vehicle (block 1030). For example, digital images of the wheels may be taken by a mobile device and submitted to the system 100. The system 100 initiates retrieval of tires associated with the tire change job (block 1040).

The system 100 receives a vehicle check-in indication. The physical location may have one or more cameras that obtain images of arriving vehicles. The system 100 receives images of the vehicle and determines if the vehicle is a vehicle slated for a scheduled tire change job. For example, the system 100 may use computer vision techniques to identify, the color, size, license plate number, or other characteristics of the vehicle, and determine there is a color match, license plate match, etc.

In response to checking in a vehicle, the system 100 initiates retrieval, via a tire retrieval apparatus, to pull the specific tires from inventory based on the tire change job information. The check-in of the vehicle may initiate a vehicle check-in event causing the system 100 to direct a robotic tire retrieval apparatus to retrieve from a stored location, the required tires for the scheduled tire change job. Lastly, the vehicle check-in process may include confirmation of one or more check list items (block 1050) to be completed.

Once the check list items have been marked as completed, the system 100 may initiate the check-in event. In addition to causing the retrieval of the tires, the check-in event may cause the robotic apparatus 150 and/or the vehicle lifting device 140 to perform preparatory operations, and/or move into an initial position. The method then ends (block 1060).

Vehicle Lifting

Figure 11:
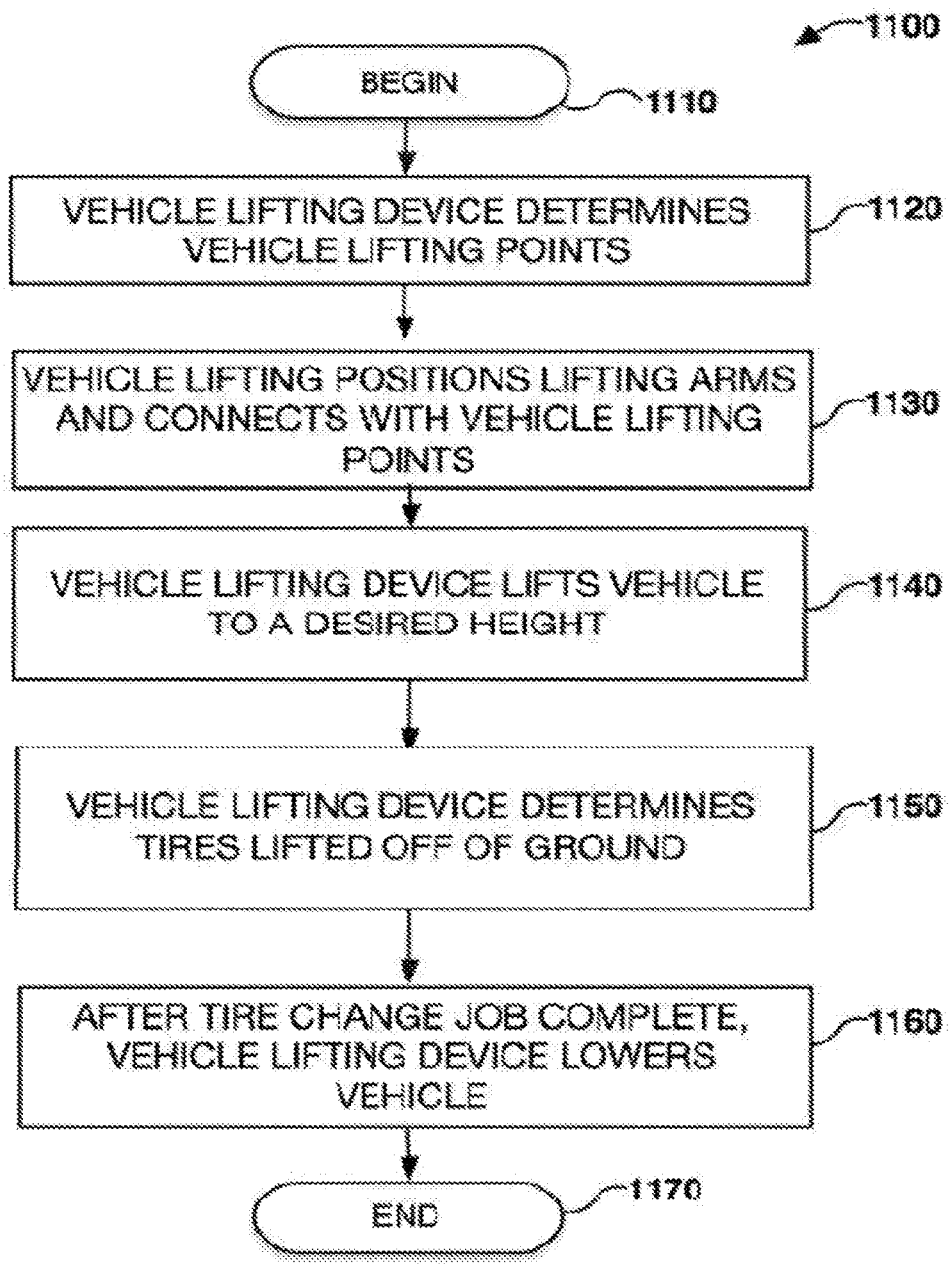
FIG. 11 illustrates an example method for vehicle lifting.

As described in FIG. 7, the system 100 may include module 744 which performs the method of lifting a vehicle with a vehicle lifting device. FIG. 11 and the description below further describes a method 1100 of lifting a vehicle with a vehicle lifting device. Various embodiments of vehicle lifting devices are described herein. In general, the method 1100 begins (block 1110) with the vehicle lifting device 140 determining vehicle lifting points (block 1120). The vehicle lifting device 140 positions lifting arms and connects with vehicle lifting points (block 1130). The vehicle lifting device 140 lifts the vehicle to a desired height (block 1140). The vehicle lifting device 140 determines the tires are lifted off of the ground (block 1150). After the tire change job is completed, the vehicle lifting device 140 lowers the vehicle (block 1160) back to the ground. The method then ends (block 1170).

The vehicle is maneuvered over the vehicle lifting device 140. In certain embodiments, the vehicle lifting device 140 is affixed to the ground, or alternatively the vehicle lifting device 140 may be mobile and moved under a stationary vehicle. The vehicle lifting device 140 is communicatively coupled to the system 100. In one embodiment, the vehicle lifting device 140 has articulating arms with lifting sections that contact lifting points of an undercarriage of a vehicle. The vehicle lifting device 140 has at least two lifting sections that are maneuvered to vehicle lifting points.

The system 100 determines the location of the vehicle lifting points. The vehicle lifting device 140 is operatively connected to the system 100. The system 100 stores vehicle lifting point locations for multiple vehicles, for example, a general vehicle database 112 may include locations of where the lifting sections should be placed. The database 112 may store the locations, for example as dimensional coordinate positions 100. The system 100 instructs the lifting sections of the vehicle lifting device 140 to maneuver to lifting locations. The system 100 may identify the vehicle lifting points of the vehicle using computer vision, and obtain images describing the undercarriage of the vehicle.

In certain cases, the general vehicle database may not have lifting locations for a particular type of vehicle. In this case, the vehicle lifting device 140 is placed into an observation mode, where sensors coupled to the lifting sections obtain information about the undercarriage. In one embodiment, the arms move to a first location, and then perform an articulating or sweeping motion when the system 100 monitors for a suitable lifting point. Once found, the system 100 stores dimensional information about the lifting points and associates the lifting point dimensions with the particular, year, make and model of the vehicle. In this manner, the system 100 may later use the lifting point locations for similar vehicles.

Once the arms and lifting sections are maneuvered into place, the system 100 instructs the vehicle lifting device 140 to lift the vehicle vertically. The lifting section of the vehicle lifting device 140 then physically connects with the lifting points of the vehicle. The system 100 then continues actuating the lifting section of the vehicle lifting device to cause vertical movement of the vehicle. The vehicle lifting device 140 stops at a predetermined height.

The system 100 may use sensors to obtain information about whether the vehicle tires have been lifted off of the ground. For example, light detection, proximity sensors, digital cameras, or other sensors may obtain information. The system 100 then determines if there is a threshold level of spacing between a tire and the ground. Once a certain threshold distance of the tires from the ground is achieved, then the system 100 stops the vehicle lifting device 140.

Additionally, the general vehicle database may include lifting height information. The lifting height information is used by the system 100 to instruct the vehicle lifting device 140 to move the lifting sections to a desired height level.

Lug-Nut and Wheel Removal

Figure 12:
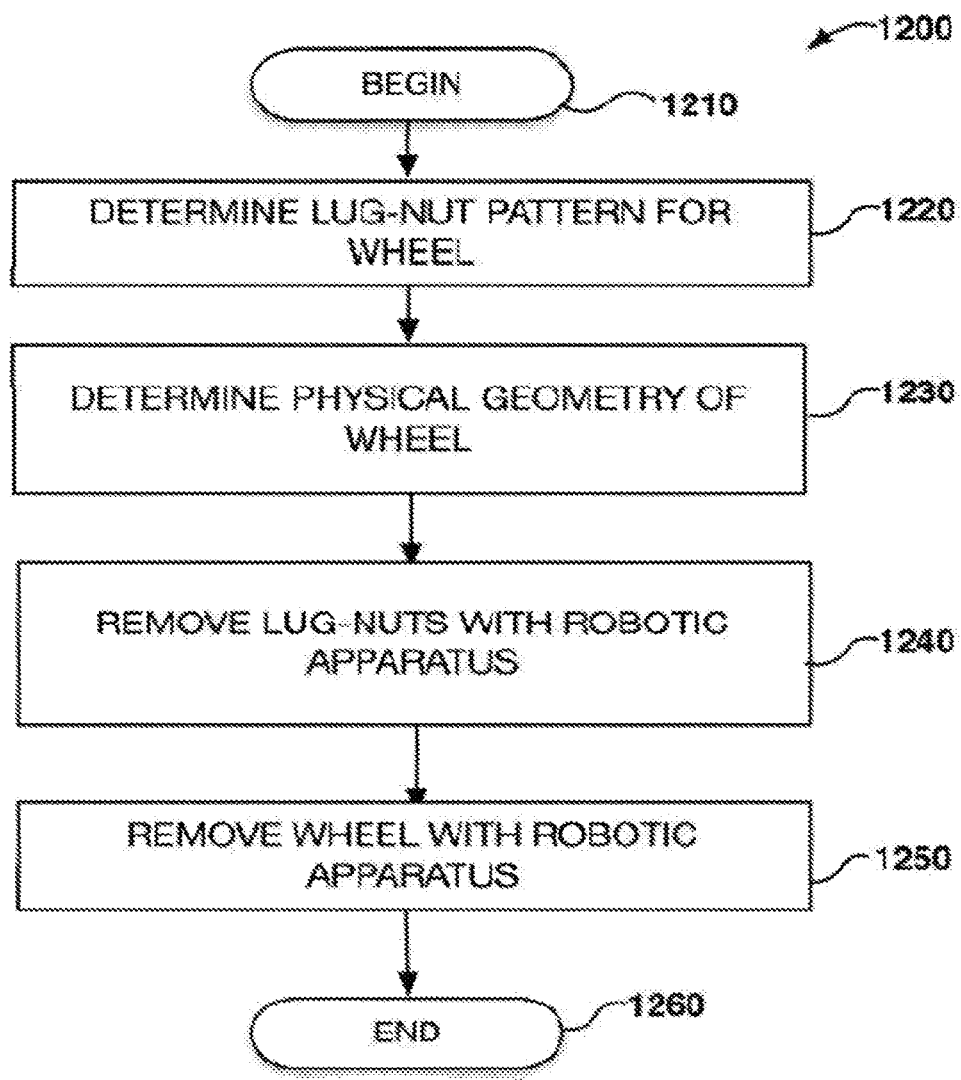
FIG. 12 illustrates an example method for automated wheel removal.

As described in FIG. 7, the system 100 may include module 746 for performing operations of removing a wheel from a vehicle. FIG. 12 illustrates a method 1200 for automated lug-nut and wheel removal. The method begins (block 1210) with the system 100 determining the lug-nut pattern for a wheel (block 1220). The system 100 determines the physical geometry of the wheel of a vehicle (block 1230). The system 100 then removes using a robotic apparatus the lug-nuts from the wheel (block 1240). The system 100 then removes the wheel from the vehicle (block 1250). The method then ends (block 1260).

Before, during or after lifting of the vehicle, the system 100 may direct the robotic apparatus into a first wheel removal position. If the robotic apparatus is affixed to the ground, then the tooling head of the robotic apparatus is moved into a first wheel removal position. Setting the robotic apparatus, and/or the tooling head, to the first wheel removal position places the robotic apparatus in proximity to a wheel of the vehicle, thereby allowing the robotic apparatus to perform a wheel removal procedure.

The system 100 may detect if the lug nuts have locks. The system 100 may detect a pattern on the surface of a lug nut by analyzing an image and determining that the lug nut may have a lock. The particular lug nut lock pattern may be associated in the general vehicle database with a required robotic tool attachment. For removal of a locked lug nut, the robotic apparatus may have specialized keyed sockets that are used to remove the locked lug nut.

The system 100 determines a lug-nut pattern for the wheel. The lug-nut pattern may be obtained from the database as associated to a particular year, make and model of the vehicle. The system 100 may have stored in the database 112 associated dimensional information about the lug-nut pattern which the system 100 uses to move one or more torque wrenches coupled to the robotic apparatus 150 for removal and replacement of lug nuts.

Additionally, the robotic apparatus 150 (i.e., the system 100) may determine a physical geometry of the wheel as to the tooling head of the robotic apparatus. The robotic apparatus for example may have lasers or other types of sensors that the robotic apparatus 150 may use to determine distances, and/or proximity, of the robotic apparatus to a vehicle's wheel. The robotic apparatus 150 may determine a plane and/or orientation of the vehicle's wheel in a three-dimensional space. While distance sensors may be used, additionally an obtained 3-D point cloud from 3d capture devices (such as 3d cameras, LiDAR sensors, a stereo vision system for 3-dimensional depth perception, or using structured light, time of flight, or other suitable devices that may be used for generating a 3-D point cloud) may be used. Determining an orientation or plane of the wheel assists the robotic apparatus in determining proper alignment of a socket when being placed onto a lug nut. If the plane of the wheel is determined, then the robotic apparatus can move linearly in a perpendicular fashion toward the wheel. The system 100 may then maintain the socket in a 90 degree orientation to the wheel as the socket is moved towards the wheel by the robotic apparatus 150.

Additionally, the system 100 may determine a lug nut pattern via computer vision processing where a digital image of the wheel is obtained. The system 100 processes obtained images using object detection techniques to identify lug nuts in the image of the wheel. The system 100 can determine based on the number of lug nut objects detected, the type of lug nut pattern (i.e., 4, 5, 6 or 8-lug nut pattern, or other lug nut patterns). The system 100 may also calculate the centroid of the lug nuts, and the spatial dimensions for each of the lug nuts.

The system 100 may then use the determined lug-nut pattern, and/or the determined physical geometry of the wheel to maneuver the robotic apparatus tooling head from one location to another location to place one or more sockets onto a respective lug nut.

The robotic apparatus can dynamically adjust between removal of lug nuts for a 4-lug nut configuration, a 5-lug nut configuration, or a 6-lug nut configuration, or other lug nut configurations. This dynamic aspect of the system 100 is quite different from an unchanging system that has a fixed-known configuration. Additionally, even within a particular lug nut configuration, for example a 5-lug nut pattern, the spacing of the lug nuts are variable among different vehicles.

The system 100 addresses this variability by multiple means. For example, based on the particular vehicle information, the General Vehicle Database may store the type (4, 5, 6, or 8-lug nut pattern, or other lug nut patterns), and the dimensional spacing of the lug nuts. Once a first lug nut position is located on the wheel, then the system 100 may calculate or determine the position of the remaining lug nuts of the wheel and maneuver the robotic arm accordingly.

Socket Selection

The robotic apparatus 150 may use or be fitted with one or more sockets for the removal of lug nuts. The sockets may be detachably affixed to a torque wrench end of the robotic apparatus 150. The system 100 may determine a socket size to be used to remove a lug nut from a wheel. The determination of the size of a lug nut may be performed through a computer vision process where an image of a wheel is obtained, and the system processes the image, and detects a size of the lug nut. Based on the determined size of the lug nut, the system 100 would instruct the robotic apparatus 150 to pick the appropriate socket size for the lug nut.

As discussed previously, a user of the system may input their vehicle information for a tire change job. Based on the vehicle information, such as make, model, and year, the system 100 may have stored for retrieval in the database 112, such as the general vehicle database, a particular socket size that is typically used for the particular vehicle associated with the vehicle information. When removing a lug nut, the system 100 may search for a stored data value for a socket size to be used, and then the system 100 may direct the robotic apparatus 150 to select or use a socket based on the data value for the socket size.

The robotic apparatus 150 may select or be fitted with different socket sizes. In one example, the robotic apparatus chooses from 6 different socket sizes, 3 metric sizes (17 mm, 19 mm, 21 mm) and 3 standard size (¾", １³⁄₁₆", ⅞"). Additionally, based on the vehicle information, the system 100 may choose from the group of 3 metric sockets, or choose from the group of 3 standard size sockets for removal of the vehicle's lug nuts.

Sometimes a socket may have been selected that is either too large, or too small, for the lug nut. The system 100 may detect this error condition. When the error condition is determined, then the robotic apparatus may pull the robotic arm back away from the lug nut. A smaller or larger socket size may be chosen by the robotic apparatus.

When a socket has been positioned onto a lug nut, the socket begins rotation in a counterclockwise manner to remove the lug nut. The robotic apparatus may include a torque sensor to receive a value for the torque applied to the lug nut. The torque value may be monitored by the system 100 to determine if the value remains within a threshold torque range. If the torque exceeds this value, then possibly the lug nut is frozen onto the wheel hub bolt. The robotic apparatus 150 may cease rotation of the socket and the wheel vehicle operation if this occurs. The system 100 may generate an exception message via a user interface for review by an operator.

In one embodiment, the robotic apparatus 150 includes a mechanism for insertion into the lug nut holes of the wheel. For example, the robotic apparatus 150 inserts one or more longitudinal fingers into the holes of the wheel where the lug nuts were removed. The robotic apparatus 150 may place the longitudinal fingers into the lug nut holes and then either move the fingers outwardly toward the tire and/or inwardly toward the center of the wheel, or in some other direction, to seat or mate the longitudinal fingers against the interior surface of the lug nut holes of the wheel. The longitudinal fingers may be coated, or made from a rubber, plastic or other material that avoids damage to the wheel. Once the longitudinal fingers are seated, then the system 100 directs the robotic apparatus 150 to pull the wheel away from the wheel hub of the vehicle.

In another embodiment to remove the wheel from the vehicle, the robotic apparatus 150 includes a tire gripper to hold the tire while the lug nuts are removed. The tire grippers are maneuvered by the robotic apparatus as controlled by the system 100 into a position where gripping arms may contact a tire, for example the tread of the tire. The robotic apparatus 150 may use sensors, such as a computer vision system, to detect the perimeter of the tire, and guide the gripping arms onto the tire. The system 100 may determine a width value of the tire, and place the gripping arms at locations around the tread portion of the tire to grip the tire at the maximum width of the tire.

Once the lug nuts are removed, then the robotic apparatus 150 pulls the wheel from the vehicle wheel hub. The robotic apparatus 150 may include bolt guides that are positioned onto one or more bolts by the robotic apparatus 150. Since the system 100 has already identified the physical location of the lug nuts, after the lug nuts are removed, the robotic apparatus 150 may place a guide or sleeve over a bolt. The guide or sleeve may help carry the weight of the wheel and avoid direct contact (and damage) to a bolt.

After removing a first wheel, the robotic apparatus then proceeds to a second position to remove a second wheel. The robotic apparatus may be directed to move to a specified distance based on retrieved data specifying a distance value, the data being retrieved from the database 112. For example, the general vehicle database may store a value for the axle distance between a front and rear axle of a vehicle. The system 100 retrieves this information and maneuvers the robotic apparatus 150 a linear distance according to the axle distance between the front and rear axle. This allows the robotic apparatus 150 to move to the location of the next wheel on the same side of the vehicle.

Tire Removal and Mounting

The system 100 instructs the robotic apparatus to hand off the removed wheel to a location for tire removal. The wheel is placed onto a mount of a tire removal machine. Once the tire is secured onto the tire removal machine, the tire removal machine is initiated. The tire is removed, and a new tire is placed onto the wheel. The tire may then be inflated to a desired air pressure.

Figure 13:
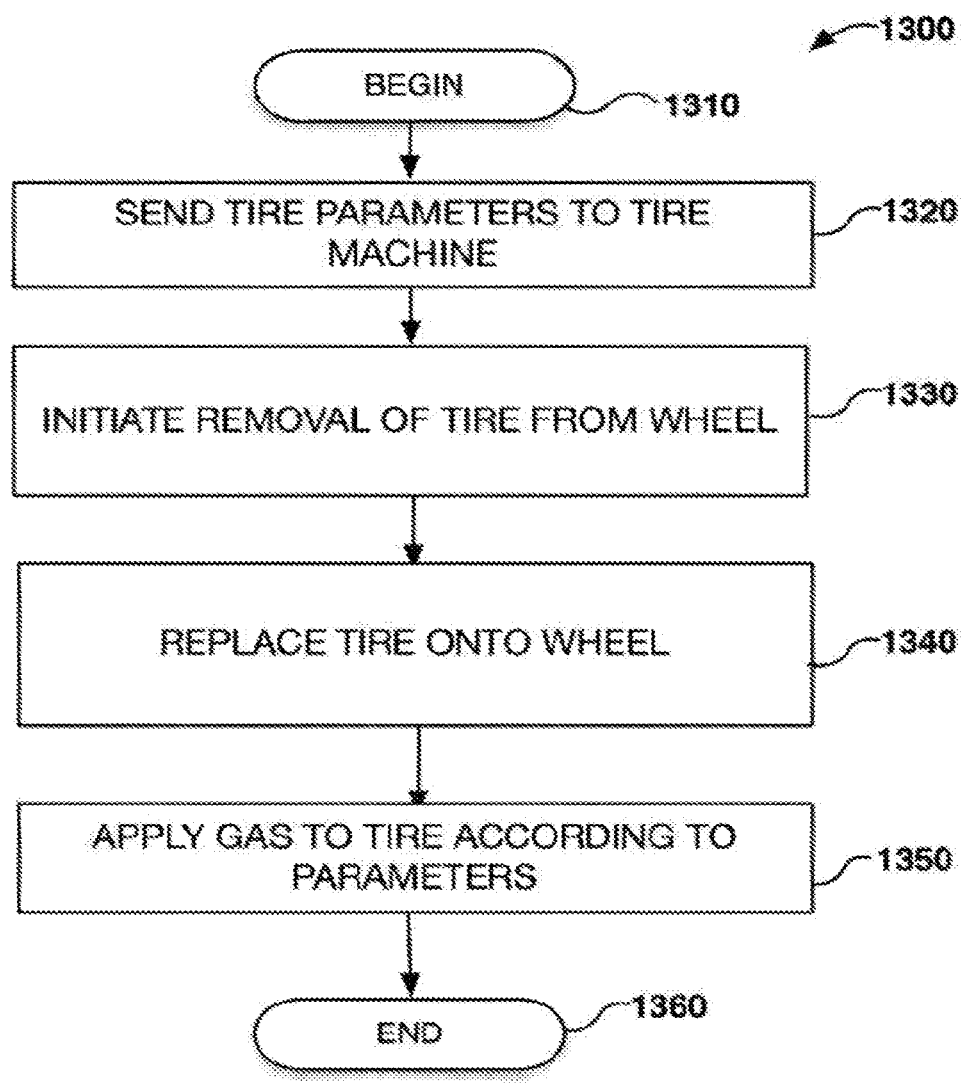
FIG. 13 illustrates an example method for tire removal and replacement.

As described in FIG. 7, the system 100 may include module 748 for performing operations of tire removal and tire mounting. FIG. 13 illustrates a method 1300 for tire removal and replacement. The method 1300 begins (block 1310) with the system 100 sending parameter to a tire removal machine (block 1320). The system 100 may then send instructions to the tire removal machine to initiate removal of a tire from a wheel (block 1330). A new tire that was pulled from inventory for the specific vehicle being serviced is set onto the wheel (block 1340). Gas is applied to the tire according to the parameters (block 1350). The method then ends (block 1360).

Tire and Wheel Balancing

Figure 14:
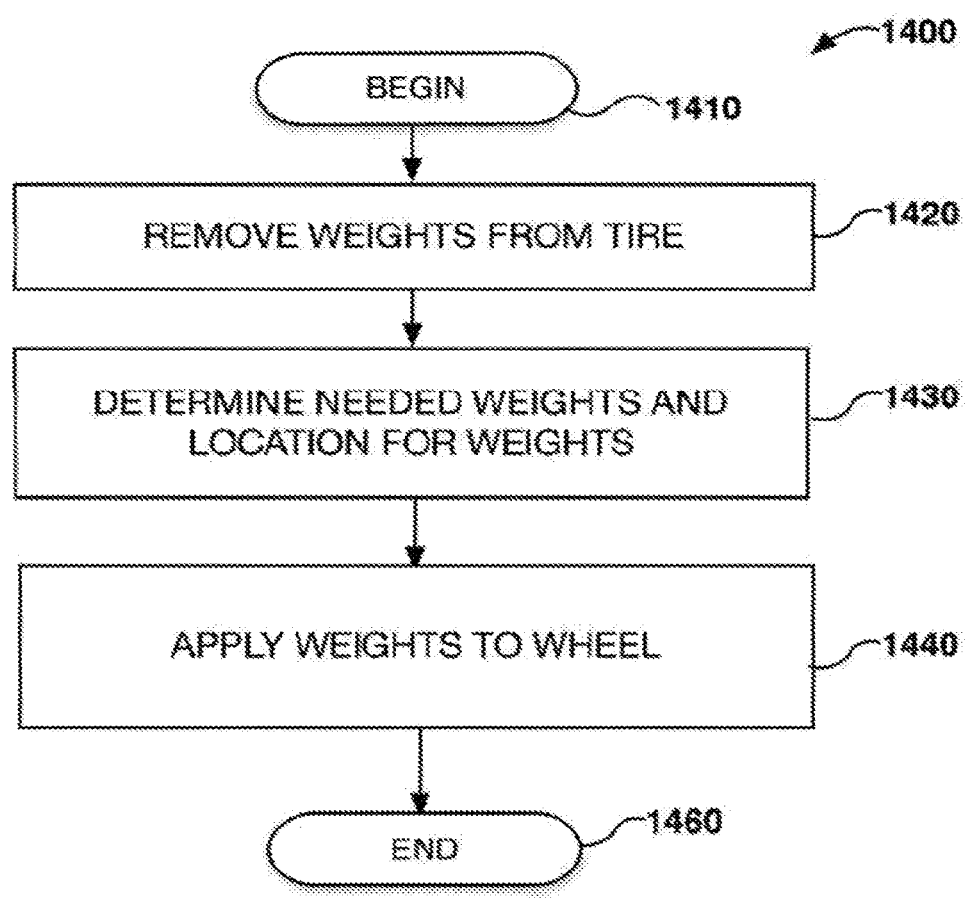
FIG. 14 illustrates an example method for tire balancing.

As described in FIG. 7, the system 100 may include module 750 for performing operations of tire and wheel balancing. FIG. 14 illustrates a method 1400 for tire and wheel balancing. The method 1400 begins (block 1410) with the system 100 directing an apparatus to remove weights from a wheel (block 1420). A tire balancing machine then spins the wheel and tire and determines a location on the wheel for placement of weights (block 1430). Based on the determined location for placement of the weight, a dispensing apparatus applies weights to the wheel (block 1440). The method then ends (block 1460).

Replace Wheel and Lug Nuts

Figure 15:
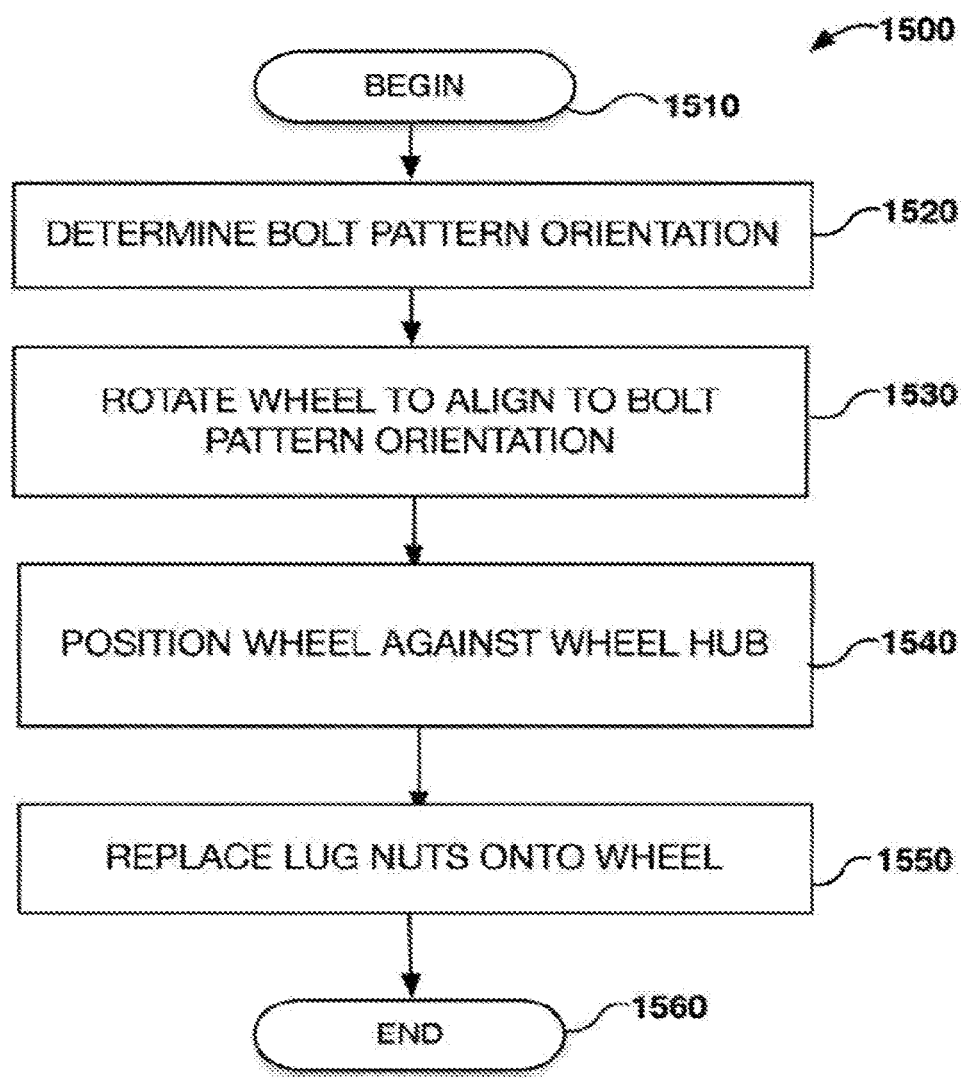
FIG. 15 illustrates an example method for automated wheel replacement.

As described in FIG. 7, the system 100 may include module 752 for performing operations of mounting a wheel. FIG. 15 illustrates a method 1500 for mounting a wheel onto a wheel hub. The system 100 begins (block 1510) determines a bolt pattern orientation of a wheel hub (block 1520). The system rotates a wheel held by a gripping device of the robotic apparatus (block 1530). The system 100 directs the robotic apparatus 150 to place the wheel against the wheel hub (block 1540). The system 100 directs the robotic apparatus to replace lug nuts onto the wheel (block 1550) and then the method ends (block 1560).

After a new tire has been placed onto a wheel and the wheel balanced, the system 100 may receive an indication that the wheel is ready for placement back onto the vehicle. The system 100 then initiates the robotic apparatus 150 to pick up the wheel with the tire gripper, and mount the wheel to the designated location.

When the robotic apparatus 150 picks up the wheel for remounting, the robotic apparatus may detect the orientation of the bolt holes of the wheel. The robotic apparatus may detect the bolt holes through sensors, and/or attached digital camera where images of the wheel are taken by the system 100, and the geometry of the wheel is determined. The system 100 may register the circumferential location of where the wheel is picked up by the tire gripper. In other words, the system would know the geometry of the wheel, and where the robotic arm has gripped the wheel.

In addition to detecting the wheel geometry, the system 100 may identify the rotational direction of the tire mounted on the wheel. The system 100 may detect in an image, a rotational indicator, such as an arrow shown on the sidewall of the tire, or some fiducial marker, such as a sticker of some shape, color or printed pattern. Based on the rotational indicator, the system 100 would only mount the wheel on to the correct side of the vehicle such that the wheel, once mounted rotates in the indicated direction of the arrow.

The robotic apparatus 150 may detect the orientation of the bolts of the wheel hub, and axially rotate the wheel to align the bolt holes of the wheel with the bolts of the wheel hub. The robotic apparatus may detect the orientation of the bolts through sensors, and/or attached digital camera where images of the wheel hub are taken by the system 100, and the geometry of the wheel hub is determined.

As the system 100, knows the wheel hub geometry and the wheel geometry, the robotic apparatus 150 may axially rotate, shift and/or position the wheel to align the wheel holes of the wheel to the bolts of the wheel hub. The system 100 may direct the robotic apparatus 150 to make slight correction movements to move the wheel in any direction while mounting the wheel against the wheel hub.

The robotic apparatus 150 seats the wheel against the wheel hub. Once the wheel is seated against the wheel hub, the robotic apparatus begins placing the lug nuts back onto the wheel.

The robotic arm picks up a lug nut from its respective bin, or other holding location of the lug nut. As indicated previously, the lug nut may be associated with a particular lug nut position. In one example, the lug nut may then be placed onto the corresponding bolt from which it was removed. In another example, the lug nut may be placed onto any one of the lug nut bolts.

In one embodiment, the lug nuts are placed onto the wheel hub in a sequentially alternating pattern. Each of the bolts are torqued to a first torque value, for example 33.90 Nm (25 ft-lbs) to set the wheel in place against the wheel hub, or rotor. Then the robotic apparatus 150 arm moves to each lug nut, and then sequentially tightens each lug nut to a desired final torque value, for example 90 ft-lbs.

The robotic apparatus 150 arm may be fitted with a multi-socket head torque wrench, such as 2, 3, 4, 5, 6 or 8 socket head. In this case, the wheel lug nuts may be placed onto the bolts in a parallel, or simultaneous fashion. With this configuration, the lug nuts may all be torqued together to the final torque value. Multiple lug nuts may be held by the robotic apparatus 150, and then concurrently replaced onto lug nut bolts. For example, the robotic apparatus 150 may be configured to concurrently torque multiple lug nuts. The robotic apparatus 150 could replace all of the lug nuts at the same time. If the bolt pattern is a 4, 6 or an 8 bolt pattern, a 2-socket head torque wrench could replace two lug nuts at opposing lug nut bolts, and the robotic apparatus 150 could rotate the 2-socket head torque wrench to replace the next set of lug nuts at opposing lug nut bolts. For a 5 bolt pattern, the 2-socket head torque wrench may apply the lug nuts using just one of the torque wrenches.

The robotic apparatus 150 begins rotation of a lug nut with a socket in a clockwise manner to replace the lug nut. The robotic apparatus 150 may include a torque sensor to receive a torque value for the torque applied to the lug nut.

The system 100 monitors the torque value to determine if the torque value remains within a threshold torque value range. If the torque value exceeds the torque value range, then possibly the lug nut is being cross-threaded onto the wheel hub bolt. The robotic apparatus 150 may cease the operation if the threshold torque value range is exceeded.

After a wheel has been mounted, the robotic apparatus 150 may obtain an image of the wheel. The system 100 may store the image in the database 112 and associate the image with the tire change job.

Vehicle Lifting Device

Figure 16:
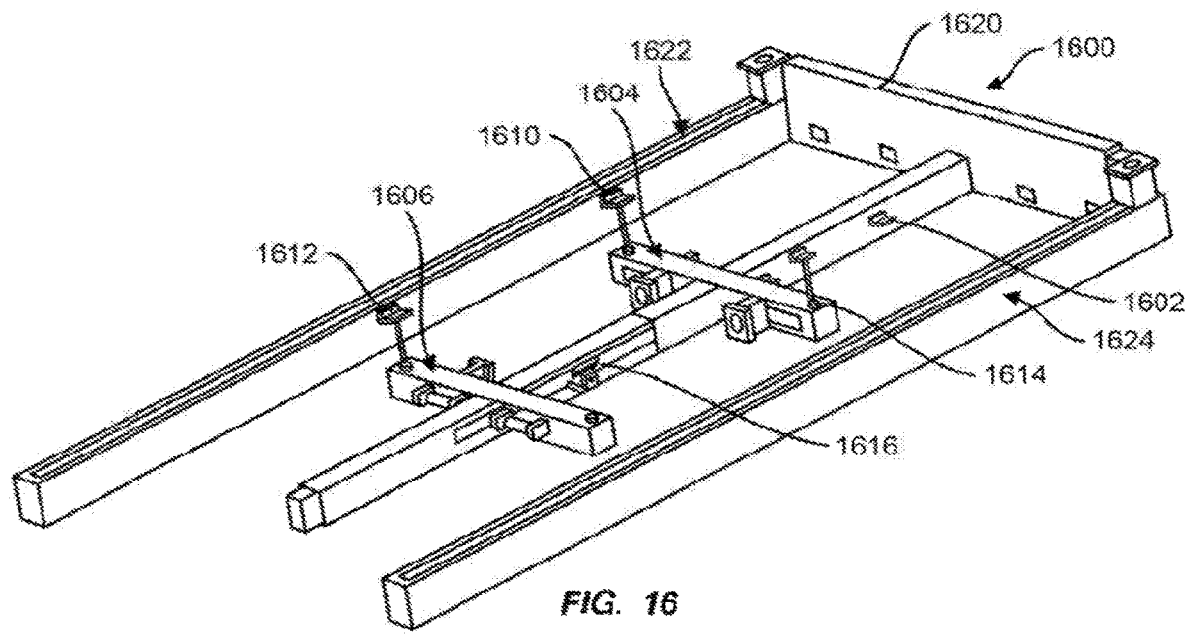
FIG. 16 illustrates a schematic drawing of an example of a vehicle lifting device.

Different embodiments of vehicle lifting devices are now disclosed. Referring to FIG. 16, one embodiment of an example vehicle lifting device 1600 is disclosed. The vehicle lifting device 1600 (referred to in FIG. 1 as 140) is comprised of one main center beam 1602 with independent lifting arm (either two or four) with lifting jacks 1610, 1612, 1614, 1616 (for example, pneumatic, hydraulic, or electric actuated jacks). At the front of the lift is a sensing system (2-dimensional or 3-dimensional vision, LiDAR, vision sensors) that may be used to detect or confirm wheelbase dimension or determine vehicle orientation and adjust the main center beam to the center of the vehicle (either by pneumatic, hydraulic, rack & pinion or linear screws). Once the vehicle lifting device 1600 is aligned, a message is sent to a user interface of the system 100 where the message indicates to move the vehicle into position over the vehicle lifting device 1600, or the vehicle lifting device 1600 may move under the vehicle. Another sensing system may be positioned to observe at the undercarriage of the vehicle to locate or confirm lifting points. Then the lifting arm may extend and move to the appreciate position. The lifting jacks 1610, 1612, 1614, 1616 may engage with the vehicle and a force feedback system coupled to the vehicle lifting device 1600 may detect if a jack is engaged. If the feedback system does not detect engagement of the lifting jack 1610, 1612, 1614, 1616, that vehicle lifting device 1600 may adjust a lifting jack 1610, 1612, 1614, 1616 height position, and then may lower the lifting jack 1610, 1612, 1614, 1616 and try a new position.

The automated vehicle lifting device 1600 may automatically lift a vehicle via two methods. In a first method, a vehicle is driven and positioned in front of the vehicle lifting device 1600, then the vehicle lifting device 1600 extends under the vehicle, positions the lifting jacks 1610, 1612, 1614, 1616, lifts the vehicle then retracts on to itself. Once work has been completed on the vehicle, the system 100 extends the vehicle lifting device 1600, and lowers the vehicle, and then the vehicle lifting device 1600 retracts.

In a second method, a vehicle is driven over the vehicle lifting device 1600 to a designated point, then the system 100 detects the vehicle lift points (e.g., the vehicle lifting locations), and then then lifts the vehicle. Once work has been completed, the vehicle is lowered by the system 100 and the vehicle is driven from the vehicle lifting device 1600.

The vehicle lifting device 1600 contains an adjustment mechanism that includes a front face beam 1620, a first stationary arm 1622, and a second stationary arm 1624 to extend and retract along the outside of the vehicle lifting device 1600. A center-beam 1602 has four moveable lifting jacks 1610, 1612, 1614, 1616 mounted on two actuating beams with two vision systems. A front face beam 1620 is moveably coupled to stationary arms 1622, 1624. The center-beam 1602 is fixed to the front face beam 1620. The adjustment mechanism 1620, 1622, 1624 may be extended or retracted in length by the system 100 to extend or retract to various positions depending on the vehicle's length. The vehicle length is communicated to the vehicle lifting device 1600 from the system 100.

A center-beam 1602 is connected to two cross-beams 1604, 1606 that are set perpendicular to the center-beam 1602. The center-beam 1602 and two cross-beams 1604, 1604 may have various numbers of rollers attached a bottom surface to help the center-beam 1602 and cross-beams 1604, 1604 move over the ground. The actuating mechanisms to position the center beam, and/or the lifting jacks 1610, 1612, 1614, 1616 may be of any actuating type, such as rack & pinion system, linear lead screw, pneumatic linear actuator.

The system 100 may maneuver the two cross-beam up and down the cross-beam depending on the vehicles lift points. At the end of each cross-beam is a lifting jack (either hydraulic, pneumatic or electric) that is extended or retracted out depending on the vehicle. That actuating mechanism is either a rack & pinion system, linear lead screw, pneumatic linear actuator. The lifting jack 1610, 1612, 1614, 1616 is equipped with a rubber pad on the top to minimize damage to the vehicle frame.

One vision system mounted at the front face of the center beam 1602 is to identify/detect the wheelbase dimension of the vehicle and the other mounted in the center of the center beam 1602 to identify/detect the hard or soft lift point on a vehicle frame. The lift points of the vehicle and wheelbase dimension can be entered into the system 100 via prior information (scanning the VIN, scanning the license plate, from the customer's input during scheduling or can be manually entered and received by the system 100 via a user interface). Other visions systems and cameras may be mounted at various locations either attached to the lifting device, robotic apparatus and/or other locations about the area about the vehicle Each jack 1610, 1612, 1614, 1616 is equipped with sensors (load, pressure, vision or laser) to detect if the vehicle shifts or if any added pressure/weight is placed on the vehicle while being lifted to prevent the vehicle from falling off. If the system 100 detects one of the jacks 1610, 1612, 1614, 1616 being disturbed, the system will cause the jacks to compensate for the jack being disturbed. Since each jack 1610, 1612, 1614, 1616 can sense the weight of the vehicle it can compensate the vehicle is unbalanced to ensure that the vehicle is lifted parallel to the ground.

The vehicle lifting device 1600 may obtain imagery or other sensor data that may be stored by the system 100 in a database 112. The system 100 for example may determine alignment of the suspension of the vehicle. The determined alignment of the suspension of the vehicle may be reported via a user interface or a generated report identifying the alignment values for the vehicle.

Figure 17:
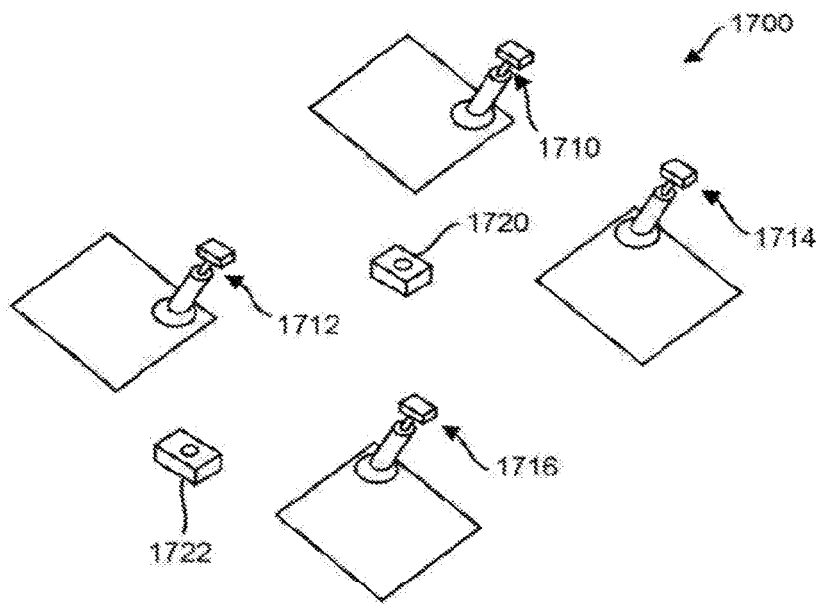
FIG. 17 illustrates a schematic drawing of an example of a vehicle lifting device.

Referring to FIG. 17, another embodiment of an example vehicle lifting device 1700 (referred to in FIG. 1 as 140) is disclosed. An automated vehicle lifting device 1700 may be comprised of lifting jacks 1710, 1712, 1714, 1716 (and may be actuated for example by pneumatic, hydraulic, electric, rack & pinion or linear screws) that are perpendicular to the vehicle. These lifting jacks 1710, 1712, 1714, 1716 may be placed in the ground or above ground. A vehicle may be parked in a designated spot above the lifting jacks 1710, 1712, 1714, 1716. A sensing system may be positioned to look at the bottom of the vehicle to locate or confirm lifting points of the vehicle. These lifting jacks 1710, 1712, 1714, 1716 extend or retract to accommodate the width of the vehicle and adjust their position to the lifting points of the vehicle or predetermined position for that specific vehicle.

As shown in the example, the vehicle lifting device 1700 is mounted in-ground and has four independent lifting jacks 1710, 1712, 1714, 1716 that may maneuver in three degrees of freedom (x,y,z). A vehicle is driven over the vehicle lifting device 1700 to a designated point or at any position over the lifting jacks 1710, 1712, 1714, 1716, and then the system 100 detects the lift points of the vehicle via a camera 1720 mounted on floor in a center of the vehicle lifting device 1700. There is another vision system 1722 mounted in front of the vehicle lifting device 1700 that provides direction by the system 100 for positioning the vehicle (for example, either by projecting laser beam on the vehicle for a live feed of a 2D/3D model moving into the vehicle lifting device 1700), or then lifts the vehicle. Once work has been completed, the vehicle is lowered and the vehicle is driven away from the vehicle lifting device 1700. The lifting jacks 1710, 1712, 1714, 1716 (either hydraulic, pneumatic or electric) move within their designated pads (x or y) depending on the vehicle. That actuating mechanism is either a rack & pinion system, linear lead screw, pneumatic linear actuator. The lifting jack 1710, 1712, 1714, 1716 may be equipped with a rubber pad on the top of the lifting jack 1710, 1712, 1714, 1716 to minimize damage to the vehicle frame.

Each lifting jack 1710, 1712, 1714, 1716 may be equipped with sensors (load, pressure, vision or laser) to detect if the vehicle shifts or if any added pressure/weight is placed on the vehicle while being lifted to prevent the vehicle from falling off. If the system 100 detects one of the lifting jacks 1710, 1712, 1714, 1716 being disturbed, the system will maneuver the other lifting jacks 1710, 1712, 1714, 1716 to compensate. Since each lifting jack 1710, 1712, 1714, 1716 can sense the weight of the vehicle the system 100 can compensate if a vehicle is unbalanced to ensure it is lifted parallel to the ground.

Figure 18:
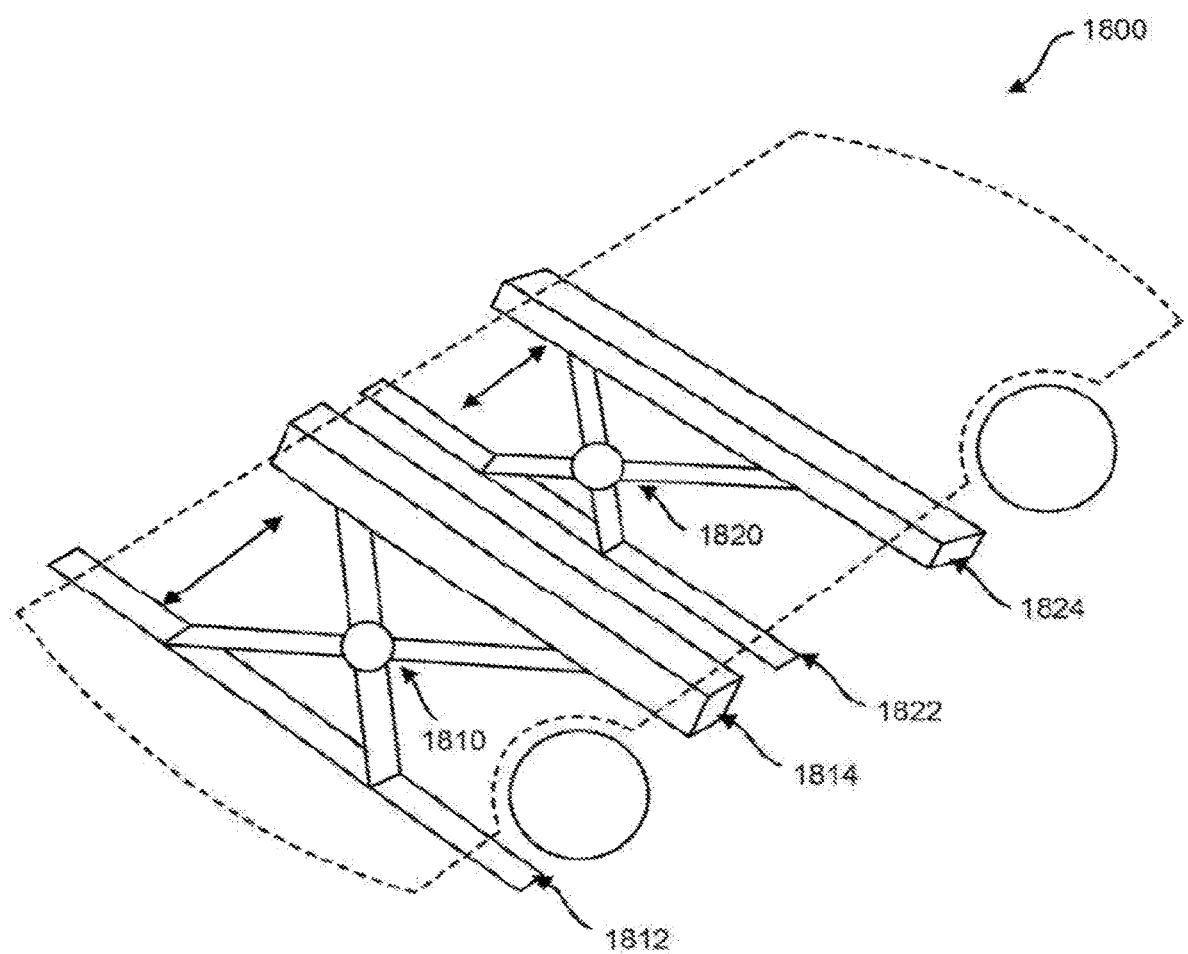
FIG. 18 illustrates a schematic drawing of an example of a vehicle lifting device.

Referring to FIG. 18, another embodiment of an example vehicle lifting device 1800 is disclosed. In another embodiment, an automated vehicle lifting device 1800 (referred to in FIG. 1 as 140) may be comprised of two independent jacks that adjusts to the lift points via a sensing system. These jacks may be placed in the ground or above ground.

This automated vehicle lifting device 1800 is designed to mounted in-ground or above ground and has two lifting jacks 1810, 1820 that are perpendicular to the vehicle. The lifting jacks 1810, 1820 span the width of various vehicles. Each lifting jack 1810, 1820 may expand or contract along the length of the vehicle depending on the vehicle lifting points.

Figure 19:
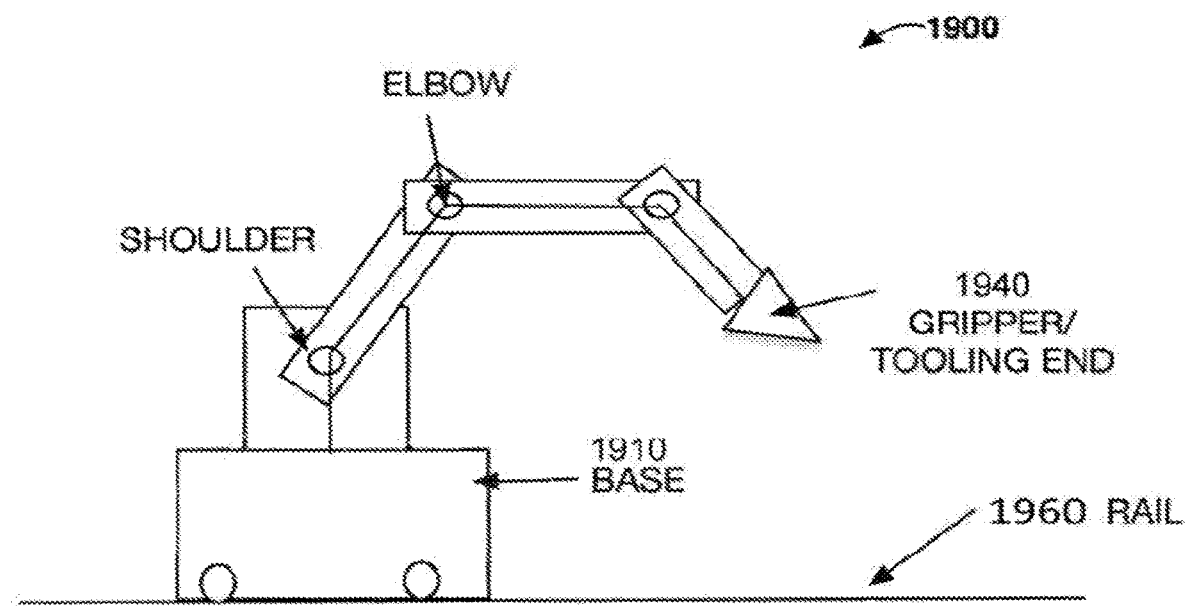
FIG. 19 illustrates a schematic drawing of an example robotic apparatus.

When a vehicle is driven over the vehicle lifting device 1800 to a designated point or at any position over the lifting pads then the system 100 detects the lift points of the vehicle via a camera mount in the floor in the center of the system. There is another vision system mounted in front of the system that provides direction for positioning the vehicle (either by projecting lasers beam on the vehicle for, a live feed of a 2D/3D model moving over the vehicle lifting device 1800), or then lifts the vehicle. Once work has been completed, the vehicle is lowered and then the vehicle is moved away from the vehicle lifting device 1800. The lifting jacks 1810, 1820 (either hydraulic, pneumatic or electric) move within their designated pads (x or y) depending on the vehicle. That actuating mechanism for the lifting jacks 1810, 1820 may be of various types, such as rack & pinion system, linear lead screw, or a pneumatic linear actuator. The lifting jacks 1810, 1820 are equipped with a rubber pad on a top surface of that comes into contact with a vehicle to minimize damage to the vehicle frame/components. Other visions systems and cameras may be mounted at various locations either attached to the lifting device, robotic apparatus and/or other locations about the area about the vehicle Robotic Apparatus Referring to FIG. 19, an exemplary robotic apparatus 1900 for wheel removal and replacement is disclosed. The robotic apparatus is generally referred to in FIG. 1 as 150. The robotic apparatus 1900 is in electronic communication with the system 100. The robotic apparatus 1900 may receive instructions, commands and data from the system 100. Likewise, the robotic apparatus may send data, and other information to the system 100.

In some embodiments, the robotic apparatus has control circuitry, processors, and data storage. While the disclosure discusses operable communication with the system 100, the robotic apparatus may perform the methods described herein without interaction with the system 100.

The robotic apparatus may include different types of sensors for the inspection of a vehicle's wheel, these may include proximity sensors, video or still image cameras, LiDAR, thermal sensors, lighting, pressure sensors, and any combination thereof. For example, the sensors may obtain image information for a wheel, and the system 100 may analyze the image to determine orientation of the lug nuts, to determine physical geometry of the wheel, and to determine other aspects of the wheel.

In one example, the robotic apparatus 1900 is a 6-axis robot, or articulated robot, that allows articulated and interpolated movement to any point within a working envelope. At axis 1, the robot rotates the base 1910 of the robot. At axis 2, the robot extends forward and backward the robot's lower arm. At axis 3, the robot raises and lowers the robot's upper arm. At axis 4, the robot's upper arm can wrist roll. At axis 5, the robot's lowers wrist of the robot's arm. At axis 6, the robot rotates wrist of the arm. The arm may have a tooling end 1940 with sensors, a torque wrench, and/or other devices attached.

The robotic apparatus 150 may include proximity sensors to detect objects within a working envelope, or within a threshold distance, of the robotic apparatus 150. The working envelope is a physical volume of space of movement and/or operation of the robotic apparatus 150. For example, a sensor may detect movement of a person that walks near or into the working envelope of the robotic apparatus 150. The system 100 may determine that the detected object is with a certain distance of the robotic apparatus 150. If the detected object is determined to be within a threshold distance of the robotic apparatus or the working envelope, then the system 100 may direct the robotic apparatus to cease movement and/or other operations. The system 100 may generate an error condition, and display the error condition to a user interface of the system 100. In one example, the robotic apparatus 150 may automatically resume operation once the system 100 determines that the detected object is no longer within the working envelope, or the within the threshold distance of the robotic apparatus 150. In another example, to resume operations, the user interface receives an input to resume operations. In response to the received input, the robotic apparatus 150 resumes operation.

Additionally, proximity sensors may be placed in a working environment, such as a vehicle bay, and the proximity sensors are communicatively coupled to the system 100. Similar to the discussion above, the system 100 may receive sensor data from the proximity sensors and detect an object within a working space, the system 100 may in response to detecting the object, cause one or more robotic apparatus 150 to cease operations when the object moves into the working environment.

Robotic Apparatus Placement. The number of robotic apparatus 150 may be positioned in different locations for operation and access to vehicle wheels. The following illustrates exemplary placement of a robotic apparatus and is not meant to be limiting. For example, one robotic apparatus may be positioned at two locations for access to a left and right side of a vehicle. The robotic apparatus may include a multipurpose tool for tire and lug nut removal. The robotic apparatus 150 may be affixed to a rail 1960 thereby allowing linear movement of the robotic apparatus along the rail.

In another example, two robotic apparatus 150 may be attached to a guide of rail 1960. In this configuration, one of the robotic apparatus is tooled for lug nut removal, and the other for wheel removal. The robotic apparatus may move in a linear fashion to access the front and rear wheel on a particular side of the vehicle.

In another example, four robotic apparatus 150 may be positioned with two robotic apparatus on each side of a vehicle. One robotic apparatus may be configured for lug nut removal and another for wheel removal.

Robotic Tooling Head. The robotic apparatus 1900 may include a multi-purpose tool head 1940 that is equipped with a gripping mechanism, torque wrench and/or sensing system to detect or confirm lug nut position and lug nut type. The tool head 1940 is configured to remove the lug nuts thereby allowing removal of a wheel. The tool head 1940 may also replace lug nuts after the wheel is replaced onto a wheel hub. The tooling end of the robotic apparatus 150 may be configured to remove lug nuts for a 4-lug nut, 5-lug nut, 6-lug nut or 8-lug nut configuration. Other number of lug nut configurations may also be removed by the robotic apparatus 1900. The tooling end may include multiple attachment ends for different socket configurations.

In one example, the robotic apparatus 1900 may include two independent tool heads with a sensing system that will either grip the wheel for removal and install, or removal and install lug nuts.

Computer Vision

The system 100 may include a computer vision module (756 as referenced in FIG. 7) that processes obtained images. As described herein, various components may use computer vision cameras or other sensors to assist in the location determination of physical aspects of the vehicle, physical geometry of physical aspects of the wheels of the vehicles.

Examples of image capture systems that may obtain an image via a computer vision camera and lug-pattern determination are described in PCT Application No. PCT/US2020/055441, filed Oct. 13, 2020. The system 100 may determine the pattern of lug nut bolts, where there is a determined four bolt pattern, a five bolt pattern, a six bolt pattern and/or an eight bolt pattern.

The system 100 may use a trained neural network to identify a lug nut pattern. For example, using machine learning training techniques, the system 100 may be trained with multiple images of a 4-pattern, 5-pattern, 6-pattern, or 8 pattern lug nut configurations. Using the trained model in a production mode, then the system 100 may identify a lug nut pattern from a received image as an input to the trained neural network.

In one embodiment, the system 100 obtains an image of a wheel. The system 100 may process the obtained image via the trained neural network as a data input, and an image classifier may then determine the particular lug nut pattern type. The system 100 may then use the lug nut pattern type as discussed herein.

The system 100 may also use an image object detection process to identify the number of lug nuts of the wheel. For example, the system 100 may receive an image and detect the number of lug nut objects of a wheel depicted in the image. The system may identify the number of lug nuts, and set the lug nut pattern based on the number of lug nuts detected. For example, if the system 100 detects 4 lug nut objects in the image, then the system 100 may use a 4 lug nut pattern for lug nut removal for a wheel. If the system 100 detects a 5 lug nut objects in the image, then the system 100 may use a 5 lug nut pattern for lug nut removal for a wheel. Based on the position of the detected objects, the system may calculate a centroid or center of the objects by connecting a line between each of the lug nut objects, and determining an intersection point of the lines. The determined centroid of the wheel may be used to position the robotic apparatus for removal of the lug nuts from the wheel.

Additionally, fiducial markers may be placed on the vehicle to assist the system 100 for determining locations. As an example, stickers with certain patterns, colors, shapes, or a combination thereof, may be placed on the vehicle. In the context of the vehicle lifting process, these fiducial markers may be placed on lifting points under the vehicle which would assist the vehicle lifting device in locating the lifting contact points for the vehicle.

Additionally, fiducial markers may be placed on a wheel fastener to indicate a location of a lug nut. This may help the robotic apparatus 150 in determining one or more positions of lug nuts of the vehicle. Fiducial markers may be wireless devices that may be affixed to the vehicle. The wireless device may be for example a blue-tooth enabled socket that is placed onto the lug nut. The socket size of the blue-tooth enabled socket may be for example in the sizes of (SAE ¾ inch, ⅞ inch, ¹³⁄₁₆ inch; Metric 17 mm, 19 mm, 21 mm). Each of the wireless devices may emit a unique signal or signature that may be recognized by the system 100. Using multiple fiducial markers on the lug nuts the system 100 may determine the lug nut configuration of the wheel. The system 100 may detect the position of fiducial markers placed adjacently to one another, or placed across from one another, or placed on the second or third lug nut. The system 100 may then determine the center or centroid of two markers and calculate the distance between the markers. Additionally, the system 100 may determine the angle of two lines from a first fiducial marker and to a second fiducial marker, and then from the second fiducial marker to a third fiducial marker that have been placed on the lug nuts.

Based on the position of the lug nuts the system may determine the bolt pattern (for example the number of bolts and metric size in mm and/or imperial size in inches: 4–100, 4×3.94; 4–114.3, 4×4.5; 5–100, 5×3.94; 5–108, 5×4.25; 5–112, 5×4.41 ; 5–114.3, 5×4.5; 5–115, 5×4.52; 5–12, 5×4.72; 5–120.7, 5×4.75; 5–127, 5×5; 5–130, 5×5.12; 5–135, 5×5.3; 5–39.7, 5×5.5; 6–114.3, 6×4.5; 6–127, 6×5; 6–135, 6×5.3; 6–139.7, 6×5.5; 8–165.1, 8×6.5; 8–170, 8×6.69. The first number indicates how many lug nuts are on the wheel, and the second number describes the distance between two lug nuts. This is also referred to as the bold circle diameter, or the pitch circle diameter. While the foregoing discusses the system 100 using fiducial markers to determine a bolt pattern, the system 100 may also determine the bolt pattern using computer vision by obtaining imagery of the bolts on the wheel and using an object detection process to identify the centroid, or edge of the lug nuts. The number of bolts and the metric size in mm and/or imperial size may then be calculated by the system 100.

The system using computer vision, fiducial makers, or other techniques described herein may determine the particular bolt pattern for the vehicle. The system 100 may then instruct the robotic apparatus accordingly to remove and/or replace lug nuts. In determining the particular size of the bolt pattern in the case of a vehicle with four lug nuts, the system 100 may measure the center of two holes that are directly across from one another. In determining the particular size of the bolt pattern in the case of a vehicle with five lug nuts, the system 100 may measure from the center on one lug nut to the back of the third lug nut. In determining the particular size of the bolt pattern in the case of a vehicle with six lug nuts, the system 100 may measure the center of two holes that are directly across from one another. In determining the particular size of the bolt pattern in the case of a vehicle with eight lug nuts, the system 100 may measure the center of two holes that are directly across from one another.

Positioning and Movement of Robotic Apparatus

Examples of robotic apparatus for wheel replacement and removal, and methods of controlling the robotic apparatus, are disclosed in PCT Application No. PCT/US2020/055441, filed Oct. 13, 2020.

Due to the variability of the length of a vehicle, the system 100 may automatically position one or more robotic apparatus based on the wheelbase dimension of a vehicle. For example, a truck would have a longer wheel-base than a sedan. As discussed previously, the wheelbase of a vehicle may be determined by the system 100 receiving information (e.g., scanning the VIN, scanning the license plate, from the customer's input during scheduling or can be manually entered and received by the system 100 via a user interface), and/or using a vision system (e.g., a system connected digital camera) to obtain digital imagery of two wheels on one side of the vehicle. Using the computer vision system, the system 100 may then determine a distance from a centroid of the first wheel (e.g., the front wheel) and a centroid of a second wheel (e.g., the rear wheel). To establish an accurate distance, a known fixed device may be included in the imagery. For example, a fixed length object, a magnetic device, such as a ruler, or other marker, may be placed onto or adjacent to the body of the vehicle where the digital camera would be able to capture the device in an image. The system 100 may have previously stored dimensions of the known fixed or magnetic device. Using the dimensions of the device or marker, the system 100 may then determine an accurate ratio of the device or marker, and the centroids of the first and second wheels to establish an accurate wheelbase measurement. The system 100 may then save the wheelbase measurement in a memory store associated with the vehicle being serviced.

In one embodiment, the system 100 may direct linear movement of the robotic apparatus along a rail based on a wheelbase associated with the vehicle. For example, after the robotic apparatus has been positioned to the first wheel for service operations (e.g., lug nut removal and/or replacement), the system 100 may instruct the robotic apparatus to linearly move along a rail based on the wheelbase associated with the vehicle to the second wheel for service.

Machine Learning of Lug Nut Locks, Lug Nuts and Lug Nut Patterns

The system 100 may train a machine learning model to identify, classify and/or infer from a digital image of a vehicle wheel the type of lug nut pattern, the type of lug nut (i.e., generally referred to as a wheel fastener) and/or the type of lug nut lock. The system 100 may use any suitable machine learning training technique, including, but are not limited to a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a a tree-based algorithm, such as Classification and Regression Tree, Random Forest, Extra Tree, Gradient Boost Machine, or Alternating Model Tree; Naive Bayes Classifier; and others suitable machine learning algorithms.

The system 100 may be trained with a training sample of multiple images of lug nut locks. Using the trained model in a production mode, then the system 100 may identify a lug nut type on a wheel a received image as an input to the trained neural network. In response to determining the type of lug nut lock, the system 100 may indicate a required socket needed to remove the type of lug nut lock. The system 100 may automatically retrieve or obtain the required socket for the tooling end of the robotic apparatus.

The system 100 may be trained with a training sample of multiple images of lug nuts. Using the trained model in a production mode, then the system 100 may identify a lug nut type on a wheel a received image as an input to the trained neural network. In response to determining the type of lug nut, the system 100 may indicate a required socket needed to remove the type of lug nut. The system 100 may automatically retrieve or obtain the required socket for the tooling end of the robotic apparatus.

The system 100 may be trained with a training sample of multiple images of a 4-pattern, 5-pattern, 6-pattern, or 8 pattern lug nut configurations. Using the trained model in a production mode, then the system 100 may identify a lug nut pattern on a vehicle wheel from a received image as an input to the trained neural network. In response to determining the type of lug nut pattern for the vehicle wheel, the system 100 may instruct a robotic apparatus tooling end to maneuver to positions in accordance of the pattern to remove and/or replace lug nuts of a vehicle wheel.

In one embodiment, the system 100 may be trained with a training sample of digital images depicting lug nuts having a lug nut lock. To remove a lug nut having a lug nut lock, a particular lug nut key socket is required to remove the lug nut having the lug nut lock. The system 100 may obtain a digital image of the lug nuts of a wheel of a vehicle. The system 100 may use a trained machine learning model to determine the probability or likelihood that a particular lug nut is of a lug nut lock type. The system 100 may train the machine learning model to identify a particular lug nut lock pattern. For example, each of the lug nut key sockets have a different key pattern to remove a particular type of lug nut lock. The system 100 may determine that a key pattern of a lug nut is of a particular type and/or shape. Based on the identified type or shape of the lug nut key pattern, the system 100 may identify a particular lug nut key socket that would be required to remove the lug nut having a lug nut lock. For example, the system 100 may determine from an obtained image of a wheel of a vehicle that a lug nut has a lug nut key pattern. Determination of the lug nut key pattern would indicate to the system 100 that a lug nut key socket will be required to remove the lug nut having the lug nut key.

The system 100 may determine which particular lug nut key socket should be used to remove the lug nut having the lug nut lock. For example, based on the key pattern shape, the system 100 may identify which particular lug nut key socket corresponds to the key pattern shape. The system 100 may then indicate, via a user interface of the system 100, the particular key socket that is needed to remove the lug nut lock. In this case, an operator would retrieve the appropriate key socket and place the key socket on the torque wrench affixed to the tooling end of a robotic apparatus. Also, the system 100 may optionally be configured to allow the tooling end of the robotic apparatus to automatically retrieve from a set of key sockets and obtain the particular key socket needed to remove the lug nut lock. In one embodiment, an operator may simply place the correct key socket onto the lug nut lock of the wheel, and the system 100 will detect the placed key socket, and automatically couple the torque wrench with the key socket.

After obtaining the particular key socket needed to remove the lug nut lock, then the system 100 instructs the robotic apparatus to remove the lug nut lock from the wheel hub of the wheel. For example, the system 100 may direct the tooling end of the robotic apparatus equipped with a torque wrench and obtained particular key socket to remove the lug nut lock.

After the system 100 has obtained the image of the wheel depicting the lug nuts and determined the occurrence of a lug nut lock, the system 100 may store in non-volatile storage (such as a database) a physical position of the lug nut lock on the wheel. For example, the system 100 may store the location of the lug nut lock as a coordinate (or set of coordinates) for a 3-dimensional space map. The system 100 may maneuver the lug nut key socket to the stored position of where the lug nut lock is located on the wheel.

In combination with the stored lug nut lock position, or independently, the system 100 may also use computer-assisted vision to place of the lug nut key socket on the lug nut lock. For example, the tooling end of the robotic apparatus may have an attached camera. The system 100 may obtain a continuous stream of digital images. As described above, the system 100 may detect the occurrence of the lug nut lock based on object detection, machine learning inference, or other suitable computer-vision technique. The system 100 then may maneuver the lug nut key socket to the location of the lug nut lock on the vehicle wheel.

Once positioned in front of the lug nut lock, the system 100 instructs the robotic apparatus to move the tooling end of the linearly towards the lug nut key lock, such that the lug nut key socket sets over the lug nut lock. To position over key pattern of the lug nut lock, the system 100 may instruct the robotic apparatus via the torque wrench to slowly rotate the lug nut key socket such that the inner key pattern of lug nut key mates or matches up with the key pattern of the lug nut lock. To confirm proper placement of the lug nut key socket on the lug nut lock, the system 100 may direct the torque wrench to rotate the lug nut key socket while applying a force against the lug nut. The system 100 may obtain via feedback from the torque wrench a resistance (or torque) value. Should the resistance (or torque) meet or exceed a predetermined threshold value, the system 100 may confirm that the key portion of the lug nut key socket is properly set within the lock portion of the lug nut lock. The system 100 may then add increasing levels of torque against the lug nut lock to commence rotation (such as counter-clockwise rotation) of the lug nut lock. The system 100 would continue to rotate the lug nut lock until the lug nut lock is removed.

Methods for machine learning training and inference of lug nut types based on digital imagery are described in PCT Application No. PCT/US2020/055441, filed Oct. 13, 2020. The system 100 may be trained with a training sample of digital images depicting lug nuts having differing shapes and sizes. To remove a lug nut from a wheel, a particular sized and internal shape of lug nut socket is required to remove the lug nut.

The system 100 may obtain a digital image of the lug nuts of a wheel of a vehicle. The system 100 may determine for a lug nut of the wheel the size and shape of the lug nut. The system 100 may use a trained machine learning model to determine the probability or likelihood that a particular lug nut is of a particular size and shape. Also, the system 100 may employ shape detection determination to identify the shape and size of the lug nut. Based on the determined shape and size of the lug nut, the system 100 may identify that a particular lug nut requires a particular sized and shape lug nut socket.

The system 100 may obtain a socket for the required shape and size of the lug nut. The system 100 may indicate, via a user interface of the system 100, that a particular socket is needed. In this case, an operator would retrieve the appropriate socket and place the socket on the torque wrench affixed to the tooling end of a robotic apparatus. Also, the system 100 may optionally be configured to allow the tooling end of the robotic apparatus to automatically retrieve from a set of sockets and obtain the particular socket needed to remove the lug nut. In one embodiment, an operator may simply place a correctly sized socket onto a lug nut, and the system 100 will detect the placed socket, and automatically couple the torque wrench with the socket.

After obtaining the particular socket needed to remove the lug nut, then the system 100 instructs the robotic apparatus to remove the lug nut from the wheel hub of the wheel. For example, the system 100 may direct the tooling end of the robotic apparatus equipped with a torque wrench and the obtained particular socket to remove the lug nut.

After the system 100 obtained the image of the wheel depicting the lug nuts, the system 100 may also store in non-volatile memory (such as a database) a physical position of the one or more lug nuts. For example, the system 100 may store the location of the one or more lug nuts as a coordinate (or set of coordinates) for a 3-dimensional space map. The system 100 may maneuver the lug nut socket to each of the stored positions where lug nuts of the vehicle wheel are located.

In combination with the stored lug nut position, or independently, the system 100 may also use computer-assisted vision to place of the lug nut socket onto a lug nut. For example, the tooling end of the robotic apparatus may have an attached camera. The system 100 may obtain a continuous stream of digital images. As described above, the system 100 may detect the occurrence of a lug nut based on object detection, machine learning inference, or other suitable computer-vision assisted technique. The system 100 then may maneuver the lug nut socket to a location of a lug nut on the vehicle wheel.

Once positioned in front of a lug nut, the system 100 instructs the robotic apparatus to move the tooling end linearly towards the lug nut, such that the lug nut socket sets over the lug nut. The system 100 may need to slowly rotate the socket such that the internal socket edges align with the lug nut edges. To confirm proper placement of the lug nut socket on the lug nut, the system 100 directs the torque wrench to rotate the lug nut socket. The system 100 may obtain feedback from the torque wrench indicating a resistance (or torque) value. Should the resistance (or torque) value meet or exceed a predetermined threshold value, the system 100 may confirm that the lug nut socket is properly set. The system 100 may increase the level of torque of the torque wrench to then commence rotation (such as counterclockwise rotation) of the lug nut socket to remove the lug nut. The system 100 would continue to rotate the lug nut socket until the lug nut is removed.

Typically, a vehicle will have a similar lug nuts on each of the four wheels of a vehicle. In the instance of the robotic apparatus having the correct lug socket attached to the torque wrench, after removing a lug nut of a first wheel (e.g. a front wheel) of a vehicle, the system 100 may direct the robotic apparatus to position to another location such that the robotic apparatus 150, 250, 1900, 2620, 3420, 3430 may be able to remove each of the lug nuts of a second wheel (e.g., a back wheel) of the vehicle (block 3170).

Methods for machine learning training and inference of lug nut patterns based on digital imagery are described in PCT Application No. PCT/US2020/055441, filed Oct. 13, 2020. The system 100 may be trained with a training sample of digital images depicting lug nuts having differing patterns (e.g., a four bolt pattern, a five bolt pattern, a six bolt pattern and/or an eight bolt pattern). To remove the lug nuts from a wheel, the system 100 needs to identify the location of each of the lug nuts to be removed.

The system 100 may obtain a digital image of the lug nuts of a wheel of a vehicle. The system 100 may determine for a lug nut pattern of the lug nuts depicted in the image. The system 100 may use a trained machine learning model to determine the probability or likelihood that a lug nut pattern in the digital image is of a particular lug nut pattern type (e.g., a four bolt pattern, a five bolt pattern, a six bolt pattern and/or an eight bolt pattern).

The system 100 then performs upon a first vehicle wheel lug nut removal by the robotic apparatus based on the determined lug nut pattern. The system 100 then may determine based on the pattern of the lug nuts, the locations and distances the tooling end (e.g. with attached torque wrench and/or socket) needs to move from one lug nut to the next. Additionally, the system 100 may determine a lug nut loosening and/or replacement sequence of the lug nuts, and a path for the tooling end of the robotic apparatus to move from one lug nut to the next. For example, based on a four lug nut pattern, with lug nut referenced as 1, 2, 3 4 sequentially from a first lug nut to the next lug nut in a clock-wise manner, the system 100 may determine that for the four lug nut pattern, that lug nut 1, then lug nut 3, then lug nut 2, and then lug nut 4 should be loosened in that order to optimally remove the lug nuts. For a five lug nut pattern referenced as 1, 2, 3, 4, 5 sequentially from a first lug nut to the next lug nut in a clock-wise manner, the system 100 may determine that for the five lug nut pattern, that lug nut 1, then lug nut 3, then lug nut 5, then lug nut 2, and then lug nut 4 should be loosed in that order to optimally remove the lug nuts from the wheel studs. For the six and eight lug nut pattern, the system 100 may also use a predetermined path or sequence base on the lug nut pattern type to remove and/or replace the lug nuts.

Since the system 100 has determined the lug nut pattern for a first vehicle wheel, the system 100 may forgo determining the lug nut pattern for subsequent wheels of a vehicle. The system 100 may after performing a lug nut replacement and/or removal operation on a first wheel, may direct the robotic apparatus to maneuver to the location of a second wheel. The system 100 may then perform upon the second vehicle wheel lug nut removal and/or replacement by the robotic apparatus based on the previously determined lug nut pattern.

Moreover, while a lug nut is being applied to the wheel stud, the system 100 may determine how far the lug nut has moved along the length of the wheel stud. Initially, when the system 100 removes a lug nut from the wheel stud, the system 100 may track the number of rotations of the lug nut from an original seated position against a wheel to a free position. The free position is when the lug nut detaches from the wheel stud. The system 100 may compute a distance the lug nut has moved based on the number of rotations of the lug nut.

Additionally, the system 100 may measure the linear distance the tooling end of a robotic apparatus moves to rotate a lug nut from a seated position to a free position. The system 100 may store the linear distance that each lug nut traveled from the seated position to the freed position. For a particular wheel of a vehicle, the system 100 may track the distances each of the lug nuts have traveled. Then when the system 100 replaces a lug nut to a respective wheel stud, the system 100 may track the distance the lug nut has traveled back on to the wheel stud. While the foregoing refers to a lug nut and wheel stud, the measuring also applies to a wheel bolt which are screwed into a threaded hole in a wheel hub, commonly referred to as a bolted joint.

When reapplying the lug nut to a wheel stud, the system 100 may determine the overall distance the lug nut has moved and stop rotation when the lug nut has moved to an approximate distance similar to the measured distance when the lug nut was removed.

Moreover, when reapplying a lug nut to a wheel stud, the system 100 may determine whether the lug nut is fully seated against the wheel of the vehicle. The system 100 may use an initial determined position where the robotic apparatus removed the lug nut. As described above, the system 100 may determine the distance of how far a lug nut (or a wheel bolt) has traveled from an original seated position against the wheel. The system 100 may also confirm that a lug nut is seated against the wheel via computer vision image acquisition and analysis. For example, the system 100 may obtain digital imagery of the lug nut while the lug nut is being applied and fastened to the wheel stud. The system 100 may evaluate the obtained digital imagery to determine whether any threads are exposed. If the system 100 determines that threads are still exposed, then the system 100 may infer that the lug nut is not yet seated. Moreover, the system 100 may evaluate whether there exists any gap between the end of the lug nut and the wheel. A detection of a gap by the system 100 would indicate that the lug nut is not fully seated against the wheel. Additionally, the system 100 may use a laser measuring device to measure a distance to a surface of the pocket of the wheel rim and the lug nut. If the measured distance exceeds a predetermined threshold distance value, then they system 100 may determine that the lug not is not yet fully seated. If the system 100 determines that the lug nut is not fully seated, the system 100 may instruct the robotic apparatus to apply additional rotational torque to the lug nut, and then stop rotational torque when a predetermined torque value has been achieved.

Also, the system 100 may stop rotation of the lug nut when the lug nut reaches a specified torque value (e.g., 20-120 ft-lbs.) or when the lug nut is within a torque value range. For example, the system 100, when replacing a lug nut, may determine that the lug nut is fully seated against the wheel and then continue rotation of the lug nut until a predetermined torque value has been reached. The system 100 may retrieve a torque value from a database with stored torque values for different vehicle makes and models. Based on a retrieved torque value from the database, the system 100 may instruct the robotic apparatus to tighten the lug nut to the retrieved torque value for the specified make and model of vehicle. Additionally, the system 100 may provide a system user interface where an operator may input a desired torque value for a vehicle. The system 100 will then instruct the robotic apparatus to torque one or more lug nuts of a vehicle to the specified input data value. The foregoing also apples to a wheel bolt as to the threaded hole. Once the system 100 has determined that the lug nut is fully seated, the system 100 may instruct the robotic apparatus to replace the lug nut for another wheel stud.

Determination of Vehicle Dimensions and Vehicle Reference Point

Figure 20:
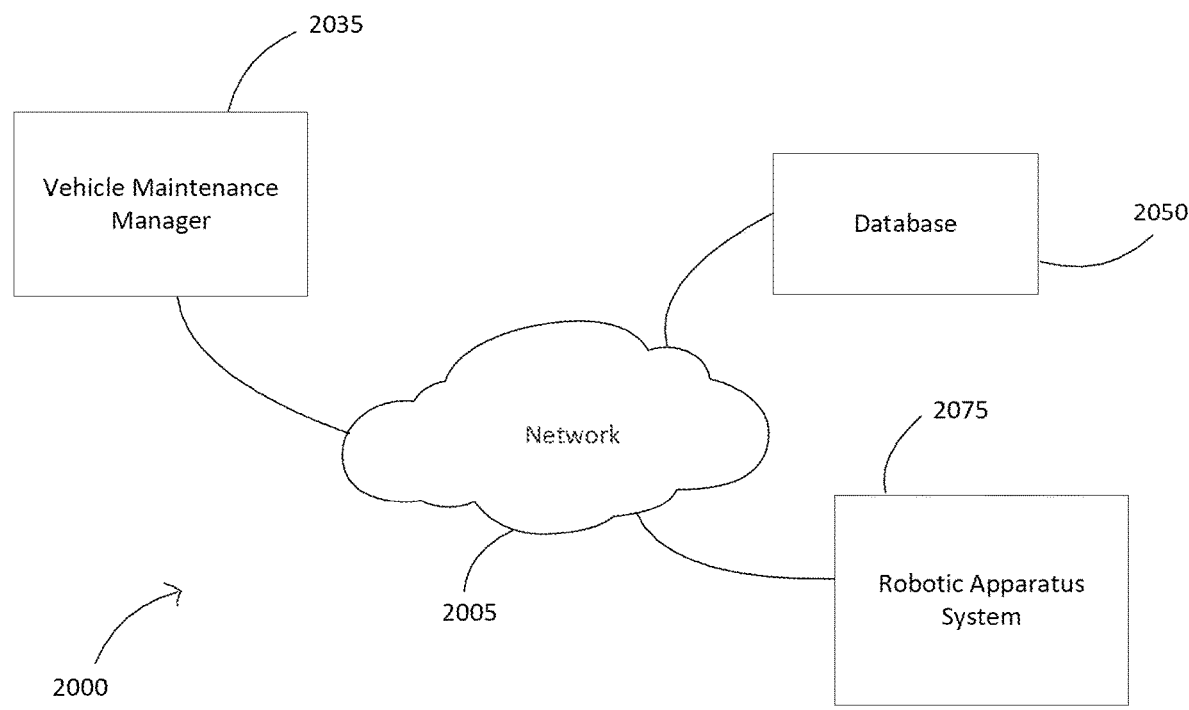
FIG. 20 shows a communication network in accordance with an embodiment.

FIG. 20 shows a communication network in accordance with an embodiment. Communication network 2000 includes a network 2005, a vehicle maintenance manager 2035, a database 2050, and a robotic apparatus system 2075.

In one embodiment, components of communications network 2000 are located and operate within a vehicle maintenance facility such as an automobile repair shop, a tire change store, or other similar establishment. Components of communications network 2000 may be activated, for example, when a vehicle enters a vehicle bay in the facility.

Network 2005 may include any type of network adapted to transmit data. Network 2005 may include, for example, a local area network (LAN), a virtual LAN (VLAN), a wireless local area network (WLAN), a virtual private network (VPN), cellular network, wireless network, the Internet, or the like, or a combination thereof. In one embodiment, network 2005 includes computer network 126.

Vehicle maintenance manager 2035 manages the performance of various vehicle maintenance-related tasks. For example, in response to a request to perform a specified maintenance task, vehicle maintenance manager 2035 may instruct robotic apparatus system 2075 to perform the specified task.

In one embodiment, vehicle maintenance manager 2035 may include software and/or hardware residing and operating on computer 102. Database 2050 may be a privately maintained database or may be a publicly available information source. For example, vehicle maintenance manager 2035 may be part of a software application (or group of software applications) that schedules and manages vehicle maintenance tasks.

Vehicle maintenance manager 2035 and/or robotic apparatus system 2075 may from time to time access database 2050 to obtain information relating to vehicles, wheels, lug-nuts, etc. For example, vehicle maintenance manager 2035 and/or robotic apparatus system 2075 may access database 2050 to obtain information specifying various aspects of a particular vehicle including dimensions of the vehicle, locations of various components of the vehicle, types of tires that may be used on the vehicle, etc.

Database 2050 is adapted to store data relating to vehicles, wheels, lug-nuts, etc. For example, database 2050 may include the General Vehicle Database described above.

Robotic apparatus system 2075 is adapted to perform various vehicle maintenance tasks. In order to facilitate performance of these tasks, robotic apparatus system 2075 is adapted to obtain information pertaining to a vehicle's position in the vehicle bay. For example, robotic apparatus system 2075 may generate one or more images of the vehicle and analyze the images to determine a vehicle's position within the vehicle bay with a desired degree of precision. Robotic apparatus system 2075 may be from time to time move a vehicle, or cause a vehicle to move, within the vehicle bay to a desired position. Robotic apparatus system 2075 may additionally be adapted to perform one or more vehicle maintenance tasks, such as removing lug nuts from a wheel, removing and replacing a wheel, etc.

Figure 21:
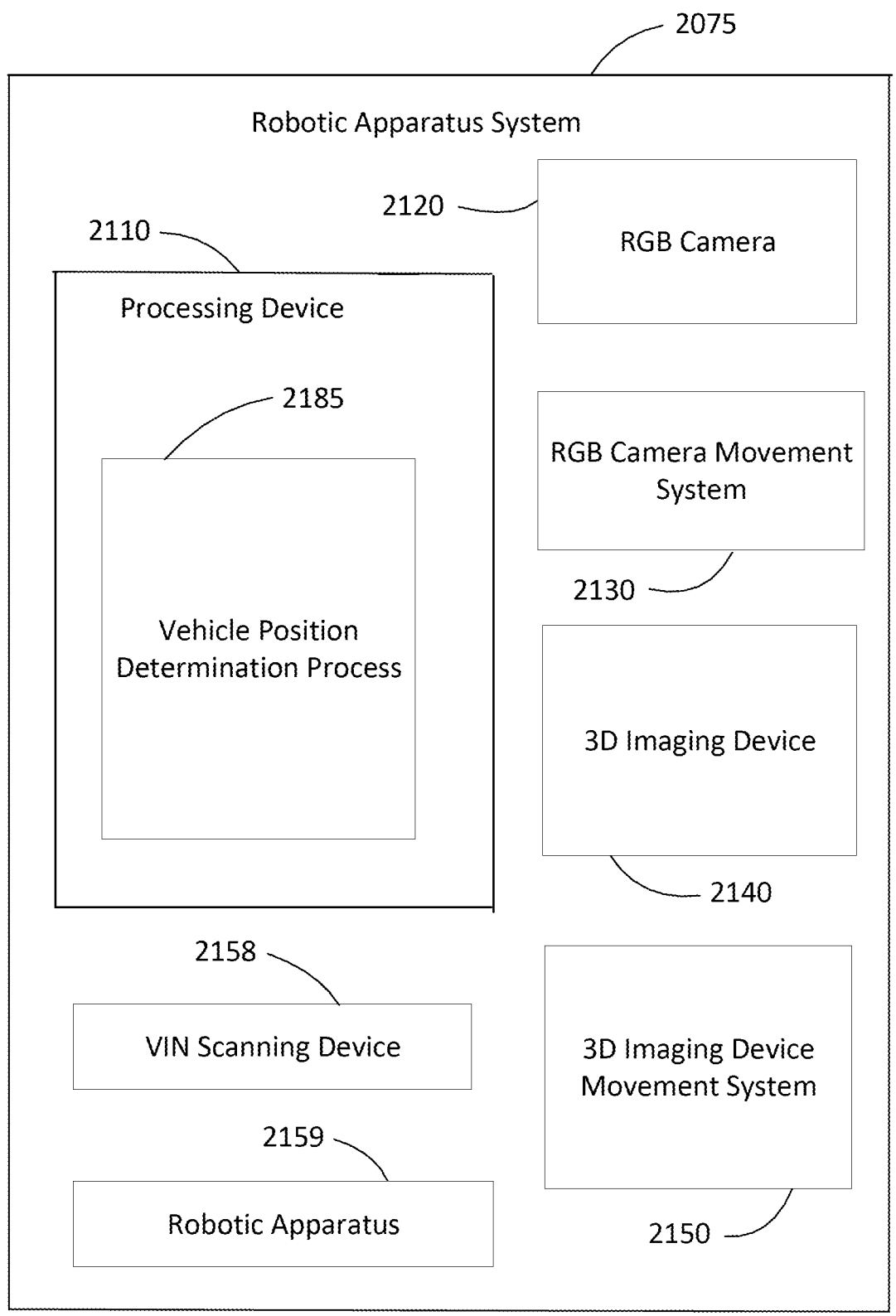
FIG. 21 shows components of robotic apparatus system in accordance with an embodiment.

FIG. 21 shows components of robotic apparatus system 2075 in accordance with an embodiment. Robotic apparatus system 2075 includes a processing device 2110, an RGB camera 2120, an RGB camera movement system 2130, a 3D imaging device 2140, a 3D imaging device movement system 2150, a vehicle identification number (VIN) scanning device 2158, and a robotic apparatus 2159.

RGB camera 2120 is adapted to obtain images of a selected object or field of view. For example, RGB camera 2120 may from time to time obtain an image of a wheel or other portion of a vehicle. Images obtained by RGB camera 2120 are stored in image database 2294 (shown in FIG. 22).

RGB camera movement system 2130 includes an apparatus adapted to support RGB camera 2120 and move RGB camera 2120 in three-dimensions to a desired position. For example, RGB camera movement system 2130 may from time to time move RGB camera 2120 to a selected position that allows RGB camera 2120 to obtain an image of a wheel of a vehicle. RGB camera movement system 2130 may include support structures, mechanical arms, tracks, rails, wheels, gears, and/or any other structures or devices suitable for supporting and moving RGB camera 2120. RGB camera movement system 2130 is also adapted to rotate RGB camera 2120 with respect to multiple axes in order to position the camera with a desired orientation.

3D imaging device 2140 is adapted to obtain 3-dimensional images. For example, 3D imaging device 2140 may from time to time obtain a 3D image of a particular wheel of a vehicle. 3D imaging device 2140 may include such as 3d cameras, LiDAR sensors, a stereo vision system for 3-dimensional depth perception, or using structured light, time of flight, or other suitable devices that may be used for generating a 3-D point cloud. 3D image data obtained by 3D imaging device 2140 is provided to point cloud generation 2232 (shown in FIG. 21).

3D imaging device movement system 2150 includes an apparatus adapted to support 3D imaging device 2140 and move 3D imaging device 2140 in three-dimensions to a desired position. For example, 3D imaging device movement system 2150 may from time to time move 3D imaging device 2140 to a selected position that allows 3D imaging device 2140 to obtain a 3D image of a wheel of a vehicle. 3D imaging device movement system 2150 may include support structures, mechanical arms, tracks, rails, wheels, gears, and/or any other structures or devices suitable for supporting and moving 3D imaging device 2140. 3D imaging device movement system 2150 is also adapted to rotate 3D imaging device 2140 with respect to multiple axes in order to position the camera with a desired orientation.

VIN scanning device 2158 is adapted to scan a vehicle's vehicle identification number from a predetermined location on the vehicle. For example, VIN scanning device 2158 may scan a vehicle's VIN from the registration sticker attached to the vehicle's front windshield. VIN scanning device 2158 may scan a vehicle's VIN from other locations on a vehicle. After scanning a vehicle's VIN, VIN scanning device 2158 provides the VIN information to processing device 2110.

Robotic apparatus 2159 is a robotic apparatus adapted to perform a vehicle maintenance task. For example, robotic apparatus may include robotic apparatus 150, tire removal/replacement machines 160, tire balancing machine 170, etc.

Processing device 2110 is adapted to control the operation of various components of robotic apparatus system 2075. For example, processing device 2110 controls the operation of RGB camera 2120, and controls the movement of RGB camera 2120 by controlling RGB camera movement system 2130. Similarly, processing device 2110 controls the operation of 3D imaging device 2140, and controls the movement of 3D imaging device 2140 by controlling 3D imaging device movement system 2150. When a vehicle enters the vehicle bay, processing device 2110 may instruct VIN scanning device 2158 to scan a vehicle's VIN information.

When a vehicle enters the vehicle bay, robotic apparatus system 2075 determines the position of the vehicle before performing any vehicle maintenance tasks. For this purpose, a vehicle position determination process 2185, which may be, for example, a software application, resides and operates on processing device 2110. Vehicle position determination process 2185 is adapted to control various components of robotic apparatus system 2075 in order to obtain information relating to the vehicle and determine the position of a vehicle in the vehicle bay. In the illustrative embodiment, vehicle position determination process 2185 obtains images of the vehicle and then determines the location and position of one or more of the vehicle's wheels. Vehicle position determination process 2185 also obtains information relating to the vehicle's dimensions. The vehicle's location and position are defined based on the location and position of the vehicle's wheel(s) and the vehicle's dimensions.

Figure 22:
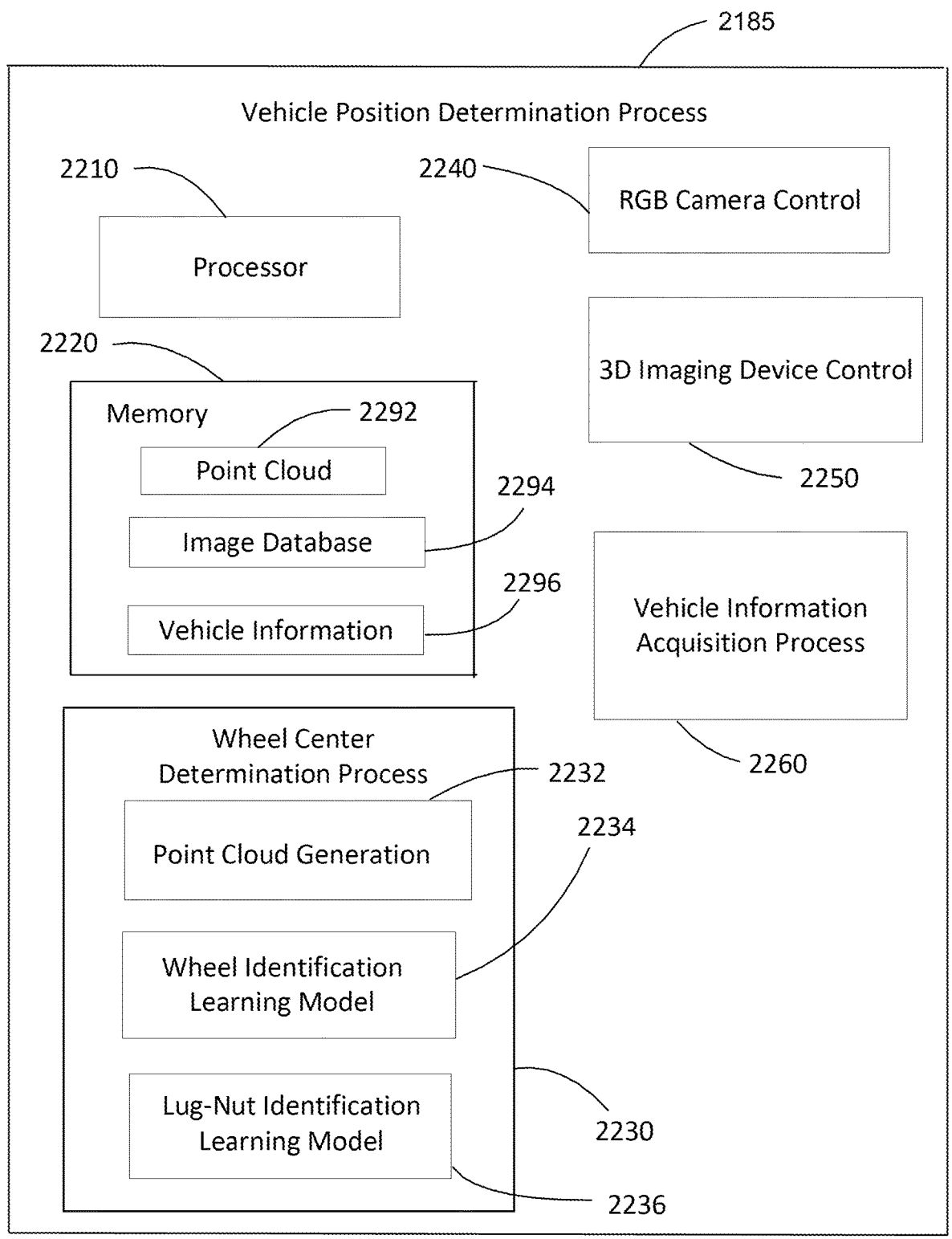
FIG. 22 shows components of a vehicle position determination process in accordance with an embodiment.

FIG. 22 shows components of vehicle position determination process 2185 in accordance with an embodiment. Vehicle position determination process 2185 includes a processor 2210, a memory 2220, a wheel center determination process 2230, an RGB camera control 2240, a 3D imaging device control 2250, and a vehicle information acquisition process 2260.

Processor 2210 controls the operation of various components of vehicle position determination process 2185. Memory 2220 is adapted to store data.

Wheel center determination process 2230 is adapted to obtain information relating to a wheel of a vehicle and define a center of the wheel. Wheel center determination process 2230 may analyze one or more images of a wheel and determine a location of a center of the wheel based on information in the image. Wheel center determination process 2230 may use other types of information in addition to image data.

RGB camera control 2240 controls the operation and movement of RGB camera 2120. RGB camera control 2240 from time to time causes RGB camera 2120 to generate an image. RGB camera control 2240 may cause RGB camera movement system 2130 to move RGB camera 2120 to a specified position to obtain an image of a vehicle, a wheel or a portion of a wheel. RGB camera control 2240 may store images generated by RGB camera 2120 in memory 2220. In the illustrative embodiment of FIG. 22, images are stored in image database 2294 in memory 2220.

3D imaging device control 2250 controls the operation and movement of 3D imaging device 2140. 3D imaging device control 2250 from to time causes 3D imaging device 2140 to generate a 3D image. 3D imaging device control 2250 may cause 3D imaging device movement system 2150 to cause 3D imaging device 2140 to move to a specified position to obtain an image of a vehicle, a wheel, or a portion of a wheel. 3D imaging device control 2250 may store image data generated by 3D imaging device 2140 in memory 2220. For example, image data generated by imaging device 2140 may be stored in image database 2294 or in point cloud 2292.

Vehicle information acquisition process 2260 is adapted to control various components of vehicle position determination process 2185 in order to obtain information relating to a vehicle, including dimension information, and to determine a position of the vehicle. Vehicle information acquisition process 2260 is also adapted to use information obtained from various sources in order to define a reference point on the vehicle. The reference point may be used by to facilitate other processes, such as moving the vehicle within the vehicle bay and performing vehicle maintenance tasks.

Wheel center determination process 2230 includes a point cloud generation 2232, a wheel identification learning model 2234, and a lug-nut identification learning model 2236.

Point cloud generation 2232 generates a point cloud from 3D image data obtained by 3D imaging device 2140. A point cloud may include a three-dimensional representation of a selected objected, such as a vehicle, a wheel, a lug-nut, etc. A point cloud may include information defining the locations of various objects in a 3D coordinate system. For example, a point cloud may define (X, Y, Z) coordinates for an object within a Cartesian coordinate system. A point cloud may additionally include information defining the rotation of an object relative to a defined orientation. For example, rotational information may be represented by rX and rY values representing rotation about x and y axes, respectively. In other embodiments, point cloud generation 2232 may use data obtained by other devices such as distance sensors, sonic sensors, etc.

Wheel identification learning model 2234 is adapted to identify a wheel within an image.

In one embodiment, wheel identification learning model 2234 is a machine learning model trained to identify, classify and/or infer from a digital image of a vehicle wheel a type of wheel. Wheel identification learning model 2234 may use any suitable machine learning training technique. Examples of machine learning training techniques that may be used include, but are not limited to, a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a tree-based algorithm, such as Classification and Regression Tree, Random Forest, Extra Tree, Gradient Boost Machine, or Alternating Model Tree; Naive Bayes Classifier, and others suitable machine learning algorithms.

Wheel identification learning model 2234 may be trained with a training sample of multiple images of wheels. Using the trained model in a production mode, wheel identification learning model 2234 may identify a wheel based on a received image as an input to the trained neural network.

Lug-nut identification learning model 2236 is adapted to identify one or more lug-nuts based on image data and other information. In one embodiment, lug-nut identification learning model 2236 is a machine learning model trained to identify, classify and/or infer from a digital image of a vehicle wheel a type of lug nut pattern, a type of lug nut (i.e., generally referred to as a wheel fastener) and/or a type of lug nut lock. Lug-nut identification learning model 2236 may use any suitable machine learning training technique. Examples of machine learning training techniques that may be used include, but are not limited to, a neural net based algorithm, such as Artificial Neural Network, Deep Learning; a robust linear regression algorithm, such as Random Sample Consensus, Huber Regression, or Theil-Sen Estimator; a kernel based approach like a Support Vector Machine and Kernel Ridge Regression; a tree-based algorithm, such as Classification and Regression Tree, Random Forest, Extra Tree, Gradient Boost Machine, or Alternating Model Tree; Naive Bayes Classifier, and others suitable machine learning algorithms.

Lug-nut identification learning model 2236 may be trained with a training sample of multiple images of lug nut locks. Using the trained model in a production mode, lug-nut identification learning model 2236 may identify a lug nut type on a wheel based on a received image as an input to the trained neural network. In response to determining the type of lug nut lock, lug-nut identification learning model 2236 may also indicate a required socket needed to remove the type of lug nut lock.

Lug-nut identification learning model 2236 may be trained with a training sample of multiple images of a 4-pattern, 5-pattern, 6-pattern, or 8 pattern lug nut configurations. Using the trained model in a production mode, lug-nut identification learning model 2236 may identify a lug nut pattern on a vehicle wheel from a received image as an input to the trained neural network.

In accordance with an embodiment, information relating to the dimensions of a vehicle is obtained. A robotic apparatus is moved to a first position proximate the vehicle. One or more images of the vehicle are captured by the robotic apparatus. A reference point on the vehicle is defined based on the image data. The robotic apparatus is moved to a second position proximate the vehicle based on the reference point.

Figure 23:
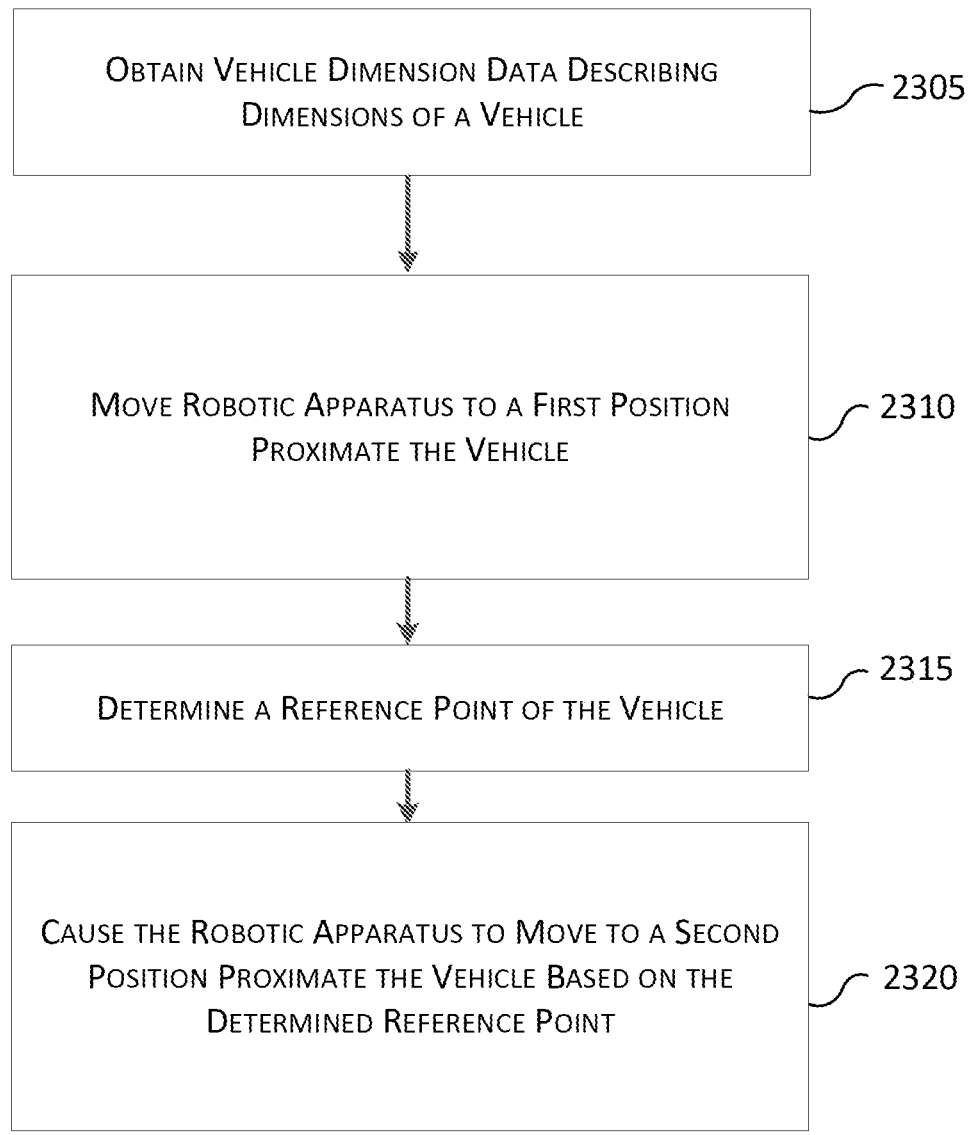
FIG. 23 is a flowchart of a method in accordance with an embodiment.

FIG. 23 is a flowchart of a method in accordance with an embodiment. The method of FIG. 23 is discussed with reference to the illustrative embodiments of FIGS. 21 and 22.

At step 2305, vehicle dimension data describing dimensions of a vehicle is obtained. In the illustrative embodiment, after a vehicle enters the vehicle bay, vehicle information acquisition process 2260 may instruct VIN scanning device 2158 to scan the vehicle identification number of the vehicle. In response, VIN scanning device 2158 scans the VIN of the vehicle. Vehicle information acquisition process 2260 may then access database 2050 and obtain dimension information pertaining to the vehicle based on the VIN information. For example, vehicle information acquisition process 2260 may obtain information such as the vehicle's wheel base, track width, etc.

At step 2310, a robotic apparatus is moved to a first position proximate the vehicle. Vehicle information acquisition process 2260 now determines an expected location of a selected wheel of the vehicle, for example, the right rear wheel, based on the vehicle dimension information. Vehicle information acquisition process 2260 instructs RGB camera control 2240 to move RGB camera 2120 to a selected position proximate the expected location of the wheel. Accordingly, RGB camera control 2240 causes RGB camera movement system 2130 to move RGB camera 2120 to the selected position. The position is selected in order to capture the wheel in the field of view of RGB camera 2120.

RGB camera control 2240 causes RGB camera 2120 to move to the selected position proximate the selected wheel. RGB camera control 2240 then instructs RGB camera 2120 to capture an image of the wheel. The image is stored in image database 2294 (in memory 2220).

3D imaging device control 2250 may also cause 3D imaging device movement system 2150 to move 3D imaging device 2140 to a selected position proximate the expected location of the wheel. 3D imaging device control 2250 causes 3D imaging device 2140 to generate a 3D image of the wheel. The 3D image data is provided to point cloud generation 2232. Point cloud generation 2232 may use the 3D image data to generate or update a point cloud of the vehicle. The point cloud data is stored in point cloud 2292 (in memory 2220).

At step 2315 a reference point of the vehicle is determined. In an illustrative embodiment, vehicle acquisition process 2260 defines the center of the wheel and uses the center of the wheel as the vehicle reference point. Thus, vehicle information acquisition process 2260 instructs wheel center determination process 2230 to analyze the RGB image of the wheel and the point cloud data and determine a location of the center of the wheel. In response, wheel center determination process 2230 activates wheel identification learning model 2234 and lug-nut identification learning model 2236. These learning models analyze the RGB image data and the point cloud data and identify the location of the center of the wheel. The center of the wheel is then defined as the reference point of the vehicle.

At step 2320, the robotic apparatus is caused to move to a second position proximate the vehicle based on the determined reference point. After the reference point of the vehicle is defined, a coordinate system of the robotic apparatus 2159 is aligned to the vehicle reference point. For example, offsets associated with various points on the vehicle within the robotic apparatus coordinate system may be defined. Other tasks may then be performed by the robotic apparatus. For example, if one or more tasks are to be performed on a second wheel of the vehicle, vehicle information acquisition process 2260 may instruct robotic apparatus 2159 to move to a selected position near the second wheel. RGB camera control 2240 may then cause RGB camera 2120 to move to a position proximate the second wheel. Processing device 2110 may then move robotic apparatus 2159 to an appropriate position proximate the second wheel based on the vehicle reference point. Robotic apparatus 2159 may then perform a desired task, such as removing one or more lug nuts, replacing a tire, etc.

In accordance with another embodiment the robotic apparatus is moved to a second position about a second wheel of the vehicle. A second reference point of the second wheel of the vehicle is determined, and the robotic apparatus is caused to move to positions about the second wheel of the vehicle based on the determined second reference point. The second reference point may be, for example, a center point of the second wheel of the vehicle.

In one embodiment, the coordinate system of the robotic apparatus is aligned to the second reference point of the second wheel, and, based on the aligned coordinate system of the robotic apparatus, the robotic apparatus performs operations to remove lug nuts from a second wheel hub of the vehicle.

While in the illustrative embodiment described herein, the vehicle reference point is defined as the center of a wheel, in other embodiments, any point on a vehicle may be used as the vehicle reference point.

Any suitable method may be used to determine the center of a wheel. In one embodiment, the determination of the center of a wheel is achieved through an iterative process of repeatedly capturing images of a wheel, analyzing the images to determine a location of the center of the wheel, determining an offset between the determined center of the wheel and the center of the camera's field of view, and adjusting the position of the camera to align the camera's field of view with the determined center, until the offset is within an acceptable tolerance.

Figure 24A:
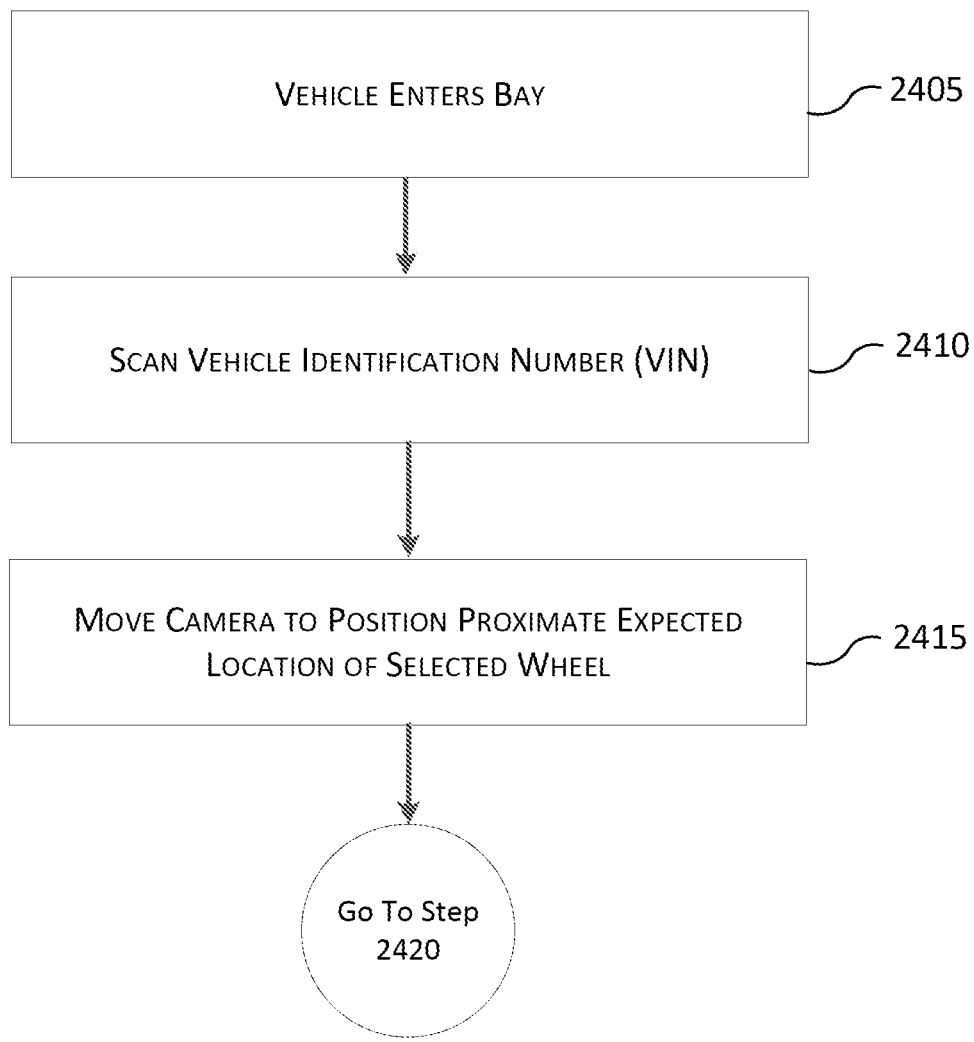
FIGS. 24A-24C include a flowchart of a method of defining a vehicle reference point in accordance with an embodiment.
Figure 24B:
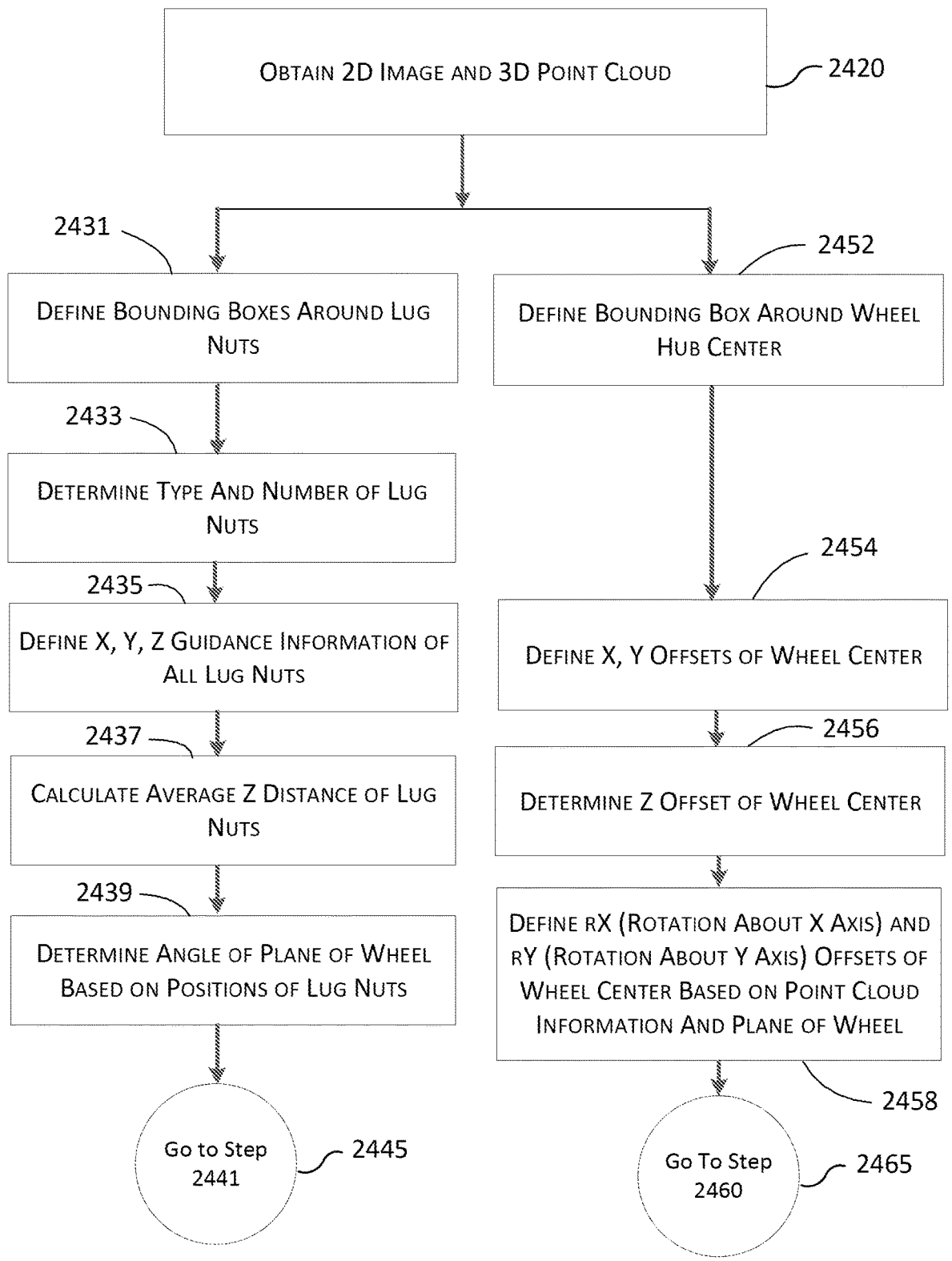
Figure 24C:
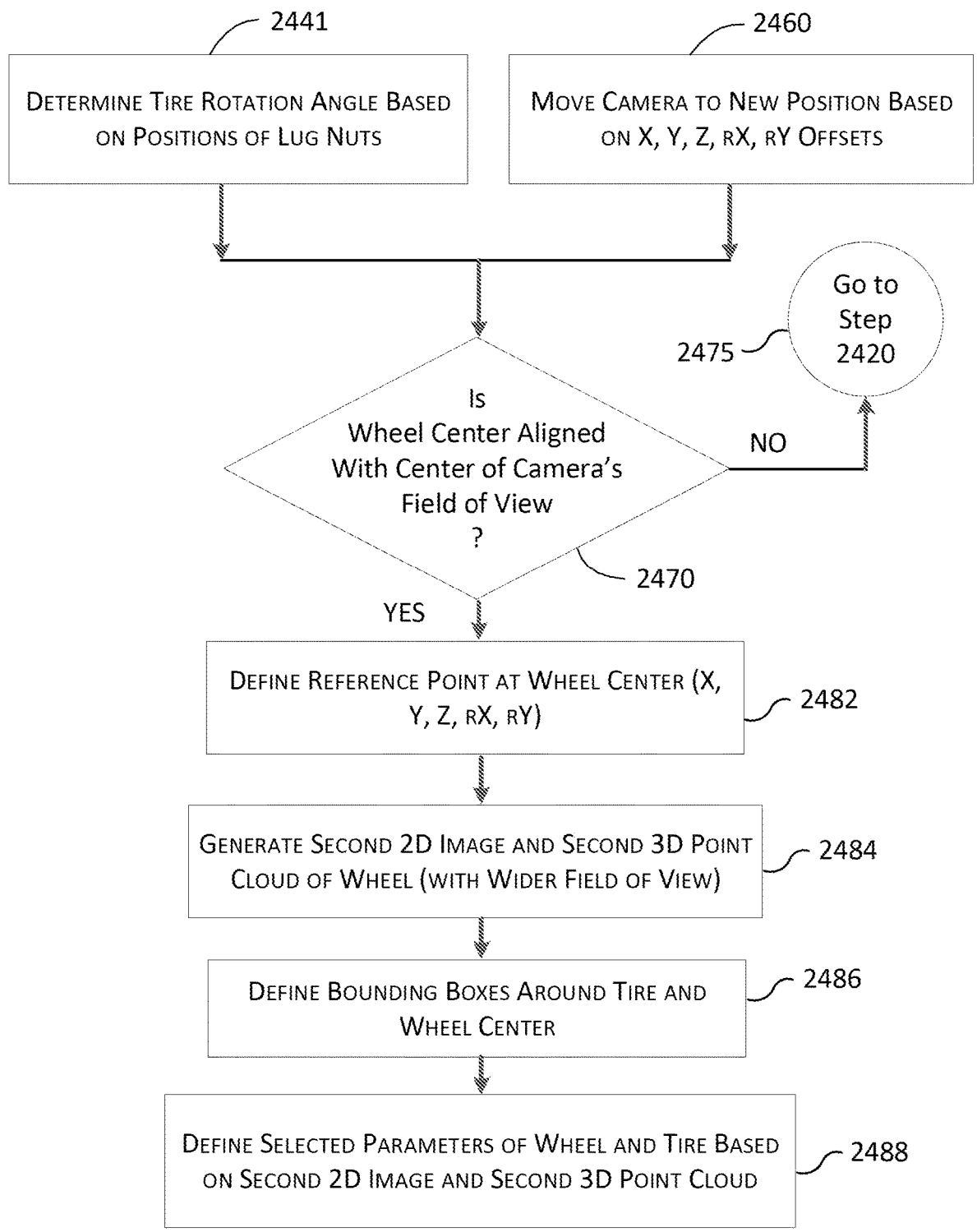

FIGS. 24A-24C include a flowchart of a method of defining a vehicle reference point in accordance with an embodiment.

At step 2405, a vehicle enters the vehicle bay. The vehicle may be positioned in the vehicle bay manually or automatically. In the illustrative embodiment, a human operator places the vehicle in an initial position, for example, with the front wheels at a predetermined position. At step 2410, the vehicle identification number is scanned. As discussed above, VIN scanning device 2158 scans the VIN and provides the VIN information to vehicle information acquisition process 2260. At step 2415, a camera is moved to a position proximate an expected location of a selected wheel. RGB camera 2120 and 3D imaging device 2140 are moved to appropriate positions near the expected location of a selected wheel.

At step 2420, a 2D image and 3D point cloud data of the vehicle are obtained. RGB camera 2120 captures an RGB image of the vehicle's wheel, and 3D imaging device 2140 generates 3D point cloud data of the vehicle's wheel. The RGB image is stored in image database 2294. The 3D point cloud data is provided to point cloud generation 2232 and is stored in point cloud 2292.

Figure 25A:
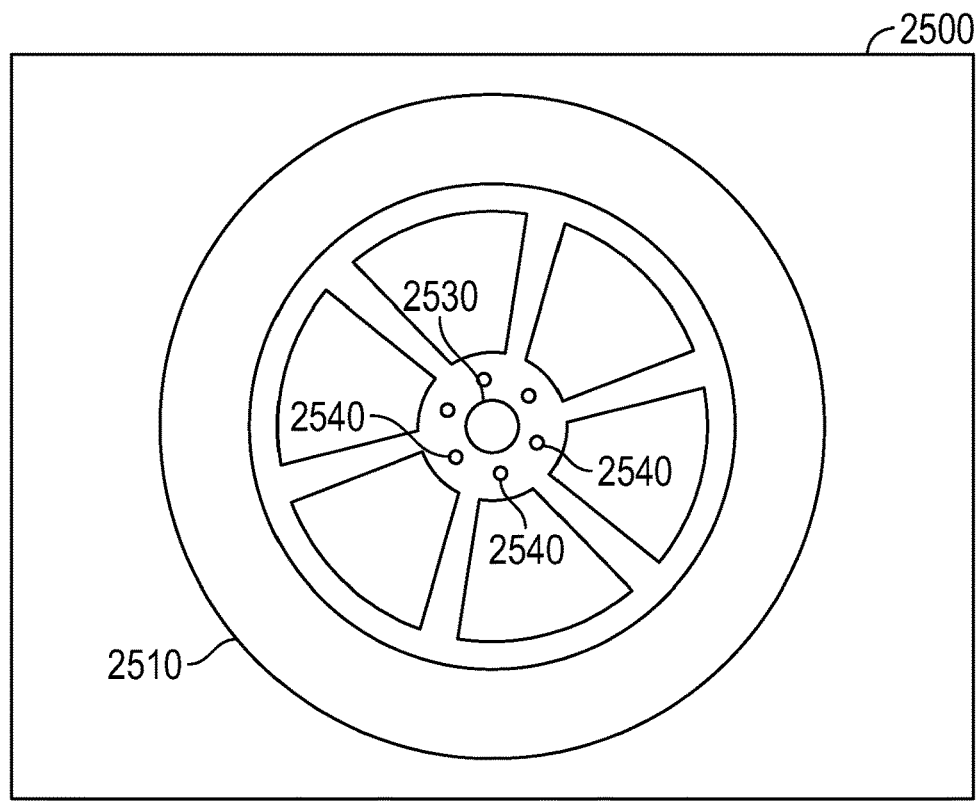
FIG. 25A shows an image of a wheel in accordance with an embodiment.

FIG. 25A shows an image of a wheel in accordance with an embodiment. Image 2500 shows wheel 2510 which includes a wheel hub 2530 and a plurality of lug nuts 2540.

Wheel identification learning model 2234 and lug-nut identification learning model 2236 are now applied to the RGB image data and the 3D point cloud data. Referring to FIGS. 24B and 24C, wheel identification learning model 2234 performs steps 2452, 2454, 2456, 2458, and 2460. Lug-nut identification learning model 2236 performs steps 2431, 2433, 2435, 2437, 2439, and 2441.

Figure 25B:
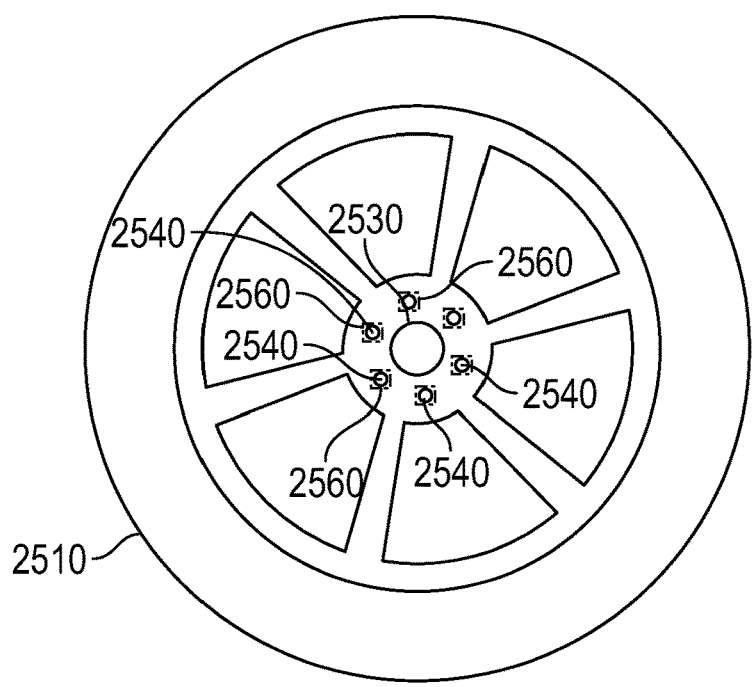
FIG. 25B is a representation of a wheel with bounding boxes defined around the lug nuts in accordance with an embodiment.

The steps performed by lug-nut identification learning model 2236 are described first. At step 2431, bounding boxes are defined around the lug nuts in the image data. Lug-nut identification learning model 2236 identifies each lug nut 2540 in the image data and defines a bounding box around the lug nut. FIG. 25B shows a representation of wheel 2510 in accordance with an embodiment. A bounding box 2560 is defined around each respective lug nut 2540.

At step 2433, the type and number of lug nuts are determined. Lug-nut identification learning model 2236 determines how many lug nuts are on wheel 2510. Lug-nut identification learning model 2236 also determines the type of lug nut used.

Figure 26:
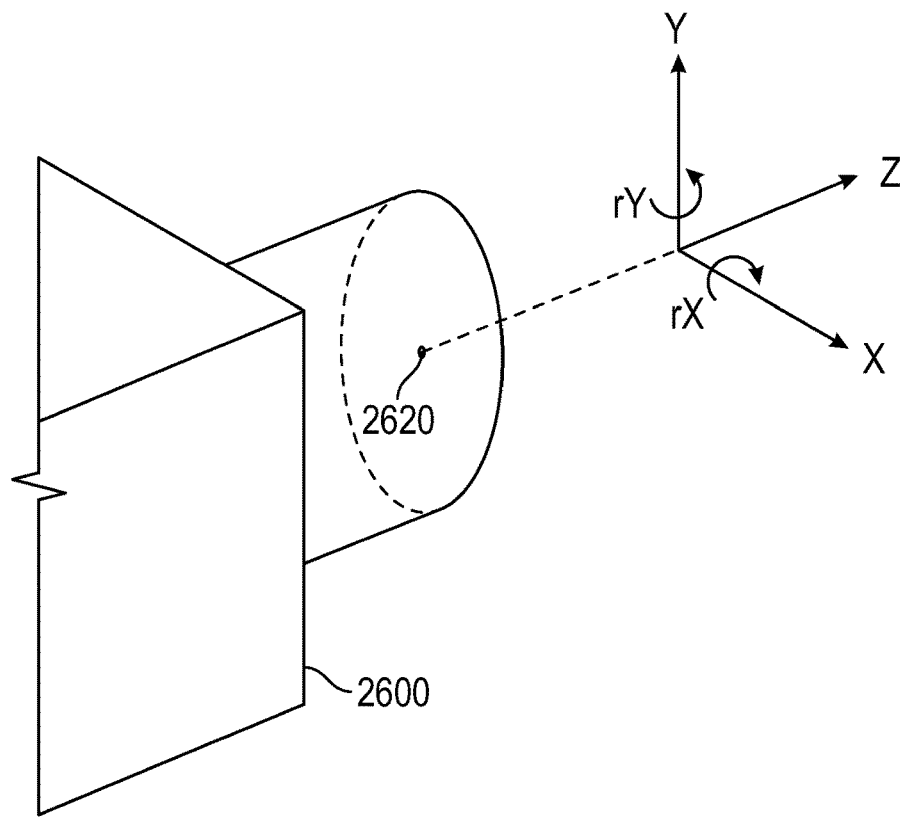
FIG. 26 illustrates a coordinate system used to determine offsets in accordance with an embodiment.

At step 2435, X, Y, Z guidance information of all lug nuts is defined. Lug-nut identification learning model 2236 determines X, Y, and Z offsets for each lug nut. In the illustrative embodiment, offsets are determined relative to an origin point defined at the center of the field of view of RGB camera 2120. FIG. 26 illustrates a coordinate system used to determine offsets in accordance with an embodiment. Camera 2600 is shown and a point 2620 is defined at the center of the camera's field of view. Point 2620 is defined as the origin of a Cartesian coordinate system with X, Y, and Z axes. Rotational offsets rX (rotation about the x axis) and rY (rotation about the y axis) are conceptually defined as well. In other embodiments, other coordinate systems may be used, other points may be used as a point of origin, and offsets may be determined using other methods.

Figure 27:
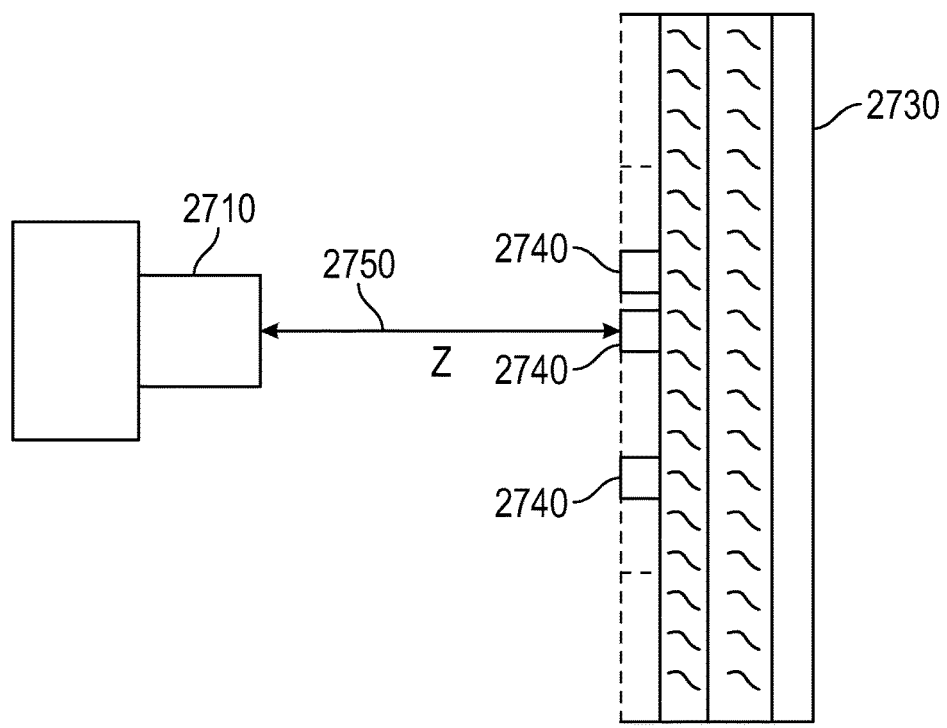
FIG. 27 illustrates a z distance of a lug nut in accordance with an embodiment.

FIG. 27 illustrates a z distance of a lug nut in accordance with an embodiment. A camera 2710 is shown in a position proximate a wheel 2730. A plurality of lug nuts 2740 are disposed on the wheel. A Z distance 2750 between the camera and a selected lug nut may be calculated.

At steps 2437, the average Z distance of the lug nuts is calculated. Lug-nut identification learning model 2236 determines the average Z offset based on the offset information determined at step 2435. Also, the system may determine the Z distance for all of the lug nuts.

Figure 28A:
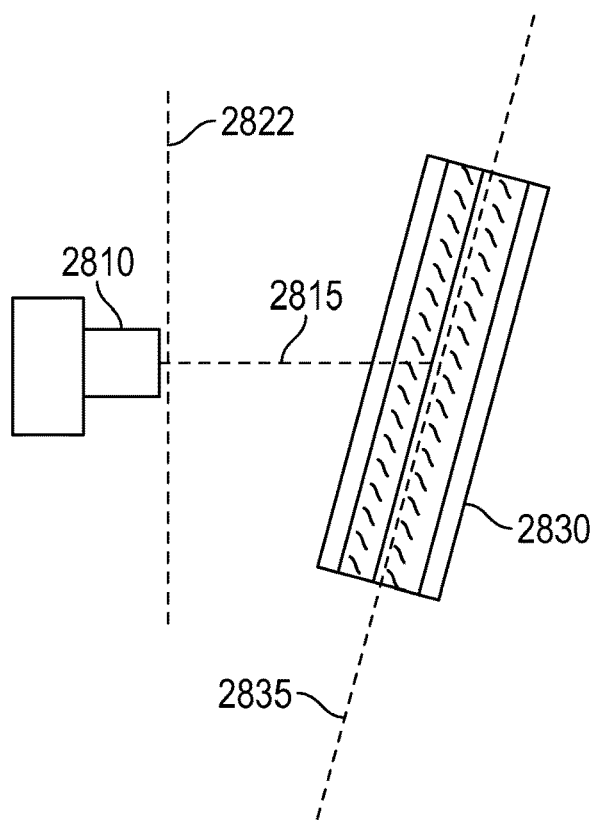
FIG. 28A illustrates a plane of a wheel in accordance with an embodiment.
Figure 28B:
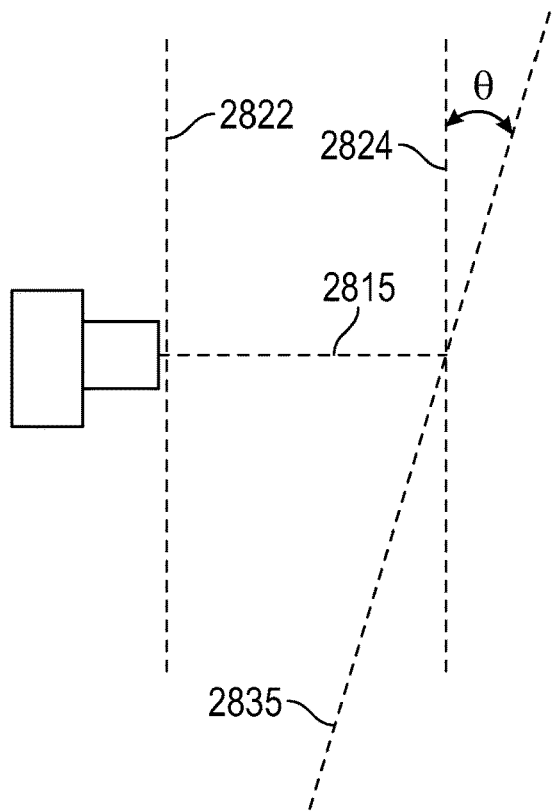
FIG. 28B illustrates an angle of a plane of a wheel in accordance with an embodiment.

At step 2439, the angle of the plane of the wheel is determined based on the positions of the lug nuts. In the illustrative embodiment, vehicle position determination process 2285 determines the angle of the plane of wheel 2510 using the Z offset information of the lug nuts. FIG. 28 illustrates a plane of a wheel in accordance with an embodiment. FIG. 28A shows a top view of a camera 2810 in a position proximate a wheel 2830. For example, camera 2810 may be disposed in the vehicle bay. Wheel 2830 may be a wheel of a vehicle in the bay that is positioned at an angle. Vehicle position determination process 2285 determines a plane 2822 associated with the field of view of camera 2810. Vehicle position determination process 2285 also determines a plane 2835, which is congruent to the center line of the wheel and thus represents the orientation of the wheel. The plane of the wheel may be determined based on the positions of the lug nuts, for example, or based on other information. In some embodiments, the system may determine plane based on the position of the lug nuts. The system may also determine a plane of the tire and/or wheel.

Vehicle position determination process 2285 now determines the angle of the plane of the wheel. Any suitable method may be used to determine the angle of the plane of the wheel. In an illustrative embodiment illustrated by FIG. 28B, a line 2815 that passes through the center of the camera's field of view and is perpendicular to plane 2822 is defined. A plane 2824 that is parallel to plane 2822 and passes through the point of intersection of line 2815 and plane 2835 (the plane of the wheel) is also defined. An angle θ defined by plane 2824 and plane 2835 is determined, and used to represent the angle of the plane of the wheel.

Figure 29A:
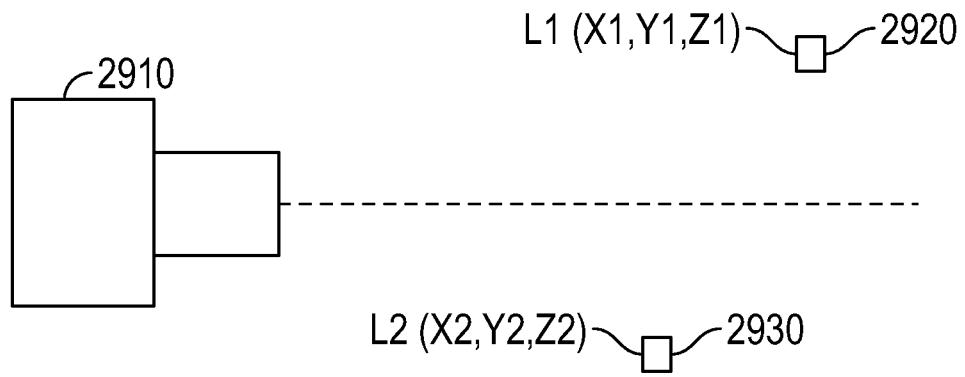
FIGS. 29A-29B illustrate a method of determining the angle of the plane of the wheel in accordance with an embodiment.
Figure 29B:
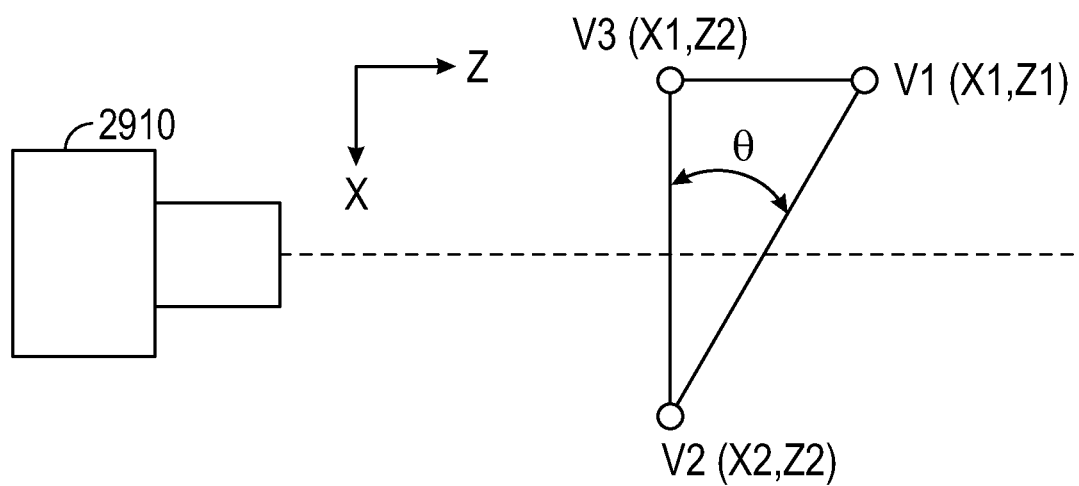

FIGS. 29A-29B illustrate a method that may be used to determine the angle of the plane of the wheel in accordance with an embodiment. FIG. 29A shows the position of two lug nuts relative to a camera in accordance with an embodiment. Camera 2910 captures image data relating to two lug nuts 2920 and 2930. Based on the image data, a determination is made that first lug nut 2920 is located at point L1 defined by coordinates (X1, Y1, Z1) and that second lug nut 2930 is located at point L2 defined by coordinates (X2, Y2, Z2). The coordinates of the lug nuts may now be used to define a triangle in a two-dimensional X-Z space, as shown in FIG. 29B. Triangle 2960 is defined by vertices V1 (X1, Z1), V2 (X2, Z2), and V3 (X1, Z2). Trigonometric principles may be used to determine angle θ within triangle 2960. Angle θ is the angle of the plane of the wheel.

At step 2441, the tire rotation angle is determined based on the positions of the lug nuts. Tire rotation angle may be determined in a manner similar to that used to determine the angle of the plane of the wheel.

Figure 25C:
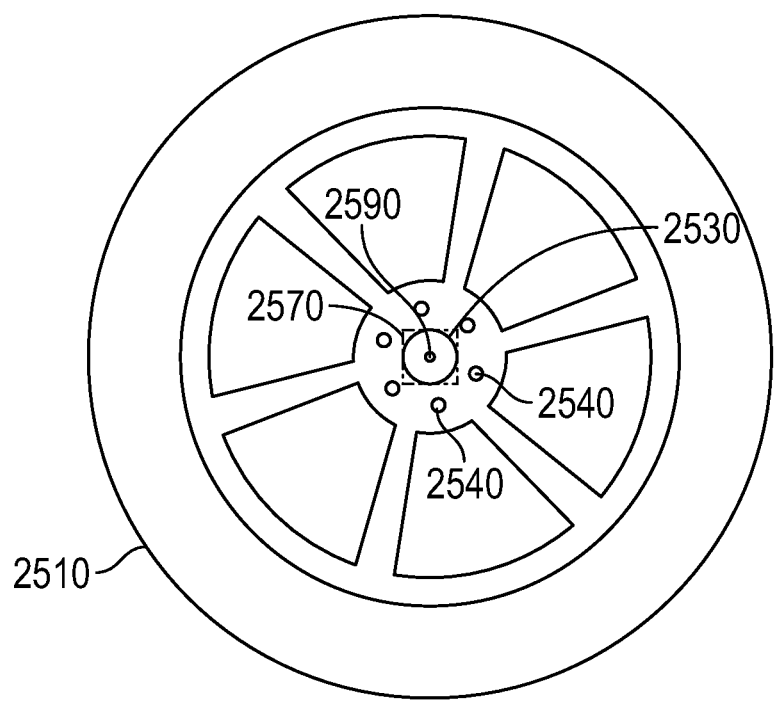
FIG. 25C is a representation of a wheel with a bounding box defined around the wheel center in accordance with an embodiment.

Steps performed by wheel identification learning model 2234 are now described. At step 2452, a bounding box is defined around the wheel hub center. Wheel identification learning model 2234 analyzes the RGB image data and the point cloud data and identifies a wheel hub center. Wheel identification learning model 2234 defines a bounding box around the wheel hub center. FIG. 25C shows a representation of a wheel with a bounding box around the wheel hub center in accordance with an embodiment. Specifically, FIG. 25C shows wheel 2510, wheel hub 2530 and lug nuts 2540. A wheel hub center 2590 is defined. A bounding box 2570 is defined around the wheel hub center.

At step 2454, X, Y offsets of the wheel center are defined. At step 2456, a Z offset of the wheel center is determined. Wheel identification learning model 2234 determines X, Y, and Z offsets of the wheel center relative to the field of view of the camera in a manner similar to that used to determine offsets of the lug nuts.

At step 2458, rX and rY offsets (representing rotation of the x-axis and y-axis, respectively) of the wheel center are defined based on the point cloud information and the plane of the wheel. Wheel identification learning model 2234 determines the rotational offsets of the wheel center based on the 2D RGB image data and the 3D point cloud data.

At step 2460, a camera is moved to a new position based on the X, Y, Z, rX, and rY offsets. Vehicle position determination process 2185 causes RGB camera 2120 to adjust its position based on the X, Y, Z, rX, and rY offsets to better align the camera's field of view with the wheel center.

Referring now to block 2470, wheel identification learning model 2234 determines whether the wheel center is aligned with the center of the camera's field of view. The location and orientation of the wheel center are compared to the location and orientation of the camera's field of view. If the wheel center is aligned with the center of the camera's field of view to within a predetermined tolerance, then the routine proceeds to step 2482. If the wheel center is not aligned with the center of the camera's field of view within the predetermined tolerance, then the routine returns to step 2420, additional image data is generated, and the routine is repeated.

At step 2482, a reference point is defined at the wheel center based on the X, Y, Z, rX, rY offsets determined. Vehicle information acquisition process 2260 defines the reference point at the wheel center.

After the vehicle reference point is defined, the reference point may be used to facilitate movement of the vehicle and performance of various maintenance tasks. Steps 2484, 2486, and 2488 illustrate actions that may be performed in connection with performance of one or more maintenance-related tasks.

At step 2484, a second 2D image and a second 3D point cloud of the wheel are generated with a wider field of view. RGB camera 2120 generates a 2D image. The image includes the wheel well arch. 3D imaging device 2140 generates 3D point cloud data.

At step 2486, bounding boxes are defined around the tire and the wheel center. Wheel identification learning model 2234 defines bounding boxes around the tire and the wheel center.

At step 2488, selected parameters of the wheel and tire are defined based on the second 2D image and the second 3D point cloud. For example, vehicle information acquisition process 2260 may determine tire diameter and the space between the tire and the wheel well arch.

Robotic apparatus system 2075 may now perform a selected vehicle maintenance task. For example, robotic apparatus 2159 may remove one or more lug nuts, remove a tire, or perform a different task.

In accordance with another embodiment, the robotic apparatus has a digital camera. The determination of a reference point of the vehicle includes aligning a plane of the digital camera with a plane of a wheel of the vehicle having a center point, and moving the digital camera to a position where a center point of the camera is aligned with a center point of the wheel. Referring to FIG. 28A, for example, the position of camera 2810 may be adjusted so that plane 2822 associated with the camera is aligned with (parallel to) plane 2835. The position of camera 2810 may be further adjusted so that the center point of the camera is aligned with the center point of wheel 2830.

In another embodiment, determining a reference point of a wheel of the vehicle includes obtaining, via one or more cameras, digital imagery of the wheel, the wheel having a plurality of lug nuts and a wheel center, determining, using the digital imagery, a movement offset of a then current position of the robotic apparatus, and moving the robotic apparatus from the then current position to a new position based on the determined movement offset. In the illustrative embodiment, a movement offset representing a movement from the robotic apparatus' current position to a desired position about the vehicle is determined. The robotic apparatus is moved to the desired position based on the offset. A determination is then made whether the one or more cameras is aligned to the wheel center. The camera(s) may be adjusted further so that the cameras are aligned to the wheel center.

In another embodiment, the robotic apparatus has a digital camera. Determining a reference point of a wheel of the vehicle includes determining one or more movement offset values and moving the robotic apparatus based on the one or more movement offset values until an alignment point of the robotic apparatus is aligned to a center point of the wheel, the alignment point being a center point of the digital camera.

In various embodiments, the method steps described herein, including the method steps described in FIGS. 23 and/or 24A-24C, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 23 and/or 24A-24C, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 30:
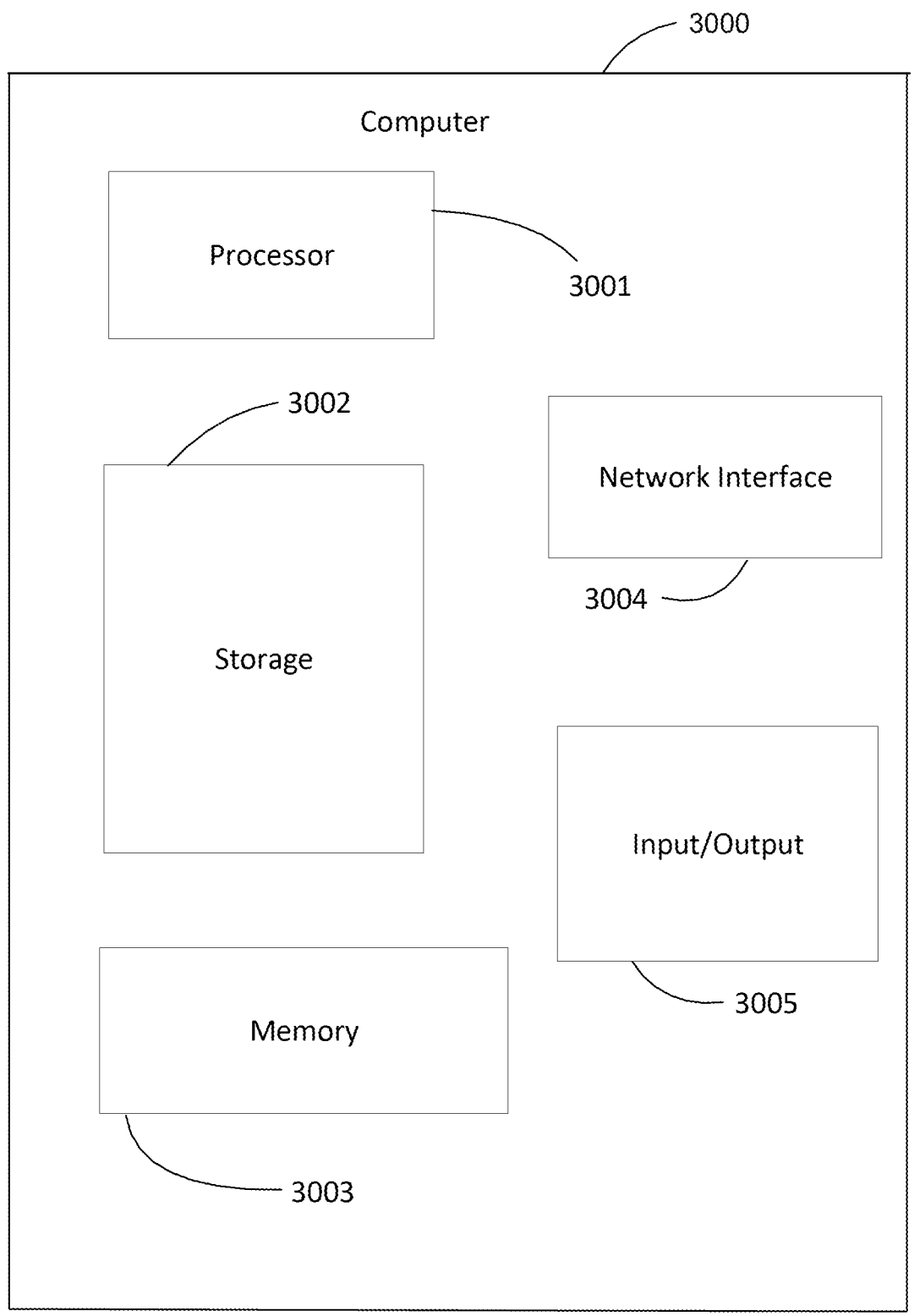
FIG. 30 shows components of an exemplary computer that may be used to implement various embodiments.

A high-level block diagram of an exemplary computer that may be used to implement systems, apparatus and methods described herein is illustrated in FIG. 30. Computer 3000 includes a processor 3001 operatively coupled to a data storage device 3002 and a memory 3003. Processor 3001 controls the overall operation of computer 3000 by executing computer program instructions that define such operations. The computer program instructions may be stored in data storage device 3002, or other computer readable medium, and loaded into memory 3003 when execution of the computer program instructions is desired. Thus, the method steps of FIGS. 23 and/or 24A-24C can be defined by the computer program instructions stored in memory 3003 and/or data storage device 3002 and controlled by the processor 3001 executing the computer program instructions. For example, the computer program instructions can be implemented as computer executable code programmed by one skilled in the art to perform an algorithm defined by the method steps of FIGS. 23 and/or 24A-24C. Accordingly, by executing the computer program instructions, the processor 3001 executes an algorithm defined by the method steps of FIGS. 23 and/or 24A-24C. Computer 3000 also includes one or more network interfaces 3004 for communicating with other devices via a network. Computer 3000 also includes one or more input/output devices 3005 that enable user interaction with computer 3000 (e.g., display, keyboard, mouse, speakers, buttons, etc.).

Processor 3001 may include both general and special purpose microprocessors, and may be the sole processor or one of multiple processors of computer 3000. Processor 3001 may include one or more central processing units (CPUs), for example. Processor 3001, data storage device 3002, and/or memory 3003 may include, be supplemented by, or incorporated in, one or more application-specific integrated circuits (ASICs) and/or one or more field programmable gate arrays (FPGAs).

Data storage device 3002 and memory 3003 each include a tangible non-transitory computer readable storage medium. Data storage device 3002, and memory 3003, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 3005 may include peripherals, such as a printer, scanner, display screen, etc. For example, input/output devices 3005 may include a display device such as a cathode ray tube (CRT) or liquid crystal display (LCD) monitor for displaying information to the user, a keyboard, and a pointing device such as a mouse or a trackball by which the user can provide input to computer 3000.

Systems and apparatus discussed herein, and components thereof, may be implemented using a computer such as computer 3000.

One skilled in the art will recognize that an implementation of an actual computer or computer system may have other structures and may contain other components as well, and that FIG. 30 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A computer-implemented method comprising the operations of:
   obtaining vehicle dimension data describing dimensions of a vehicle;
   causing, based at least in part on the vehicle dimension data, a robotic apparatus to move to a first position about the vehicle to collect data regarding a selected wheel of the vehicle;
   determining a first reference point of the vehicle based at least in part on the collected data regarding the selected wheel; and
   causing the robotic apparatus to move to a second position about the vehicle based on the determined first reference point.

2. The method of claim 1, wherein the determined first reference point is a center point of a first wheel of the vehicle.

3. The method of claim 2, further comprising the operations of:
   aligning a coordinate system of the robotic apparatus to the determined first reference point of the first wheel of the vehicle; and
   based on the aligned coordinate system of the robotic apparatus, removing, via the robotic apparatus, lug nuts from a first wheel hub of the vehicle.

4. The method of claim 2, wherein the second position is about a second wheel of the vehicle, the method further comprising the operations of:
   determining a second reference point of the second wheel of the vehicle; and
   causing the robotic apparatus to move to positions about the second wheel of the vehicle based on the determined second reference point.

5. The method of claim 4, wherein the determined second reference point is a center point of the second wheel of the vehicle.

6. The method of claim 5, further comprising the operations of:
   aligning a coordinate system of the robotic apparatus to the determined second reference point of the second wheel; and based on the aligned coordinate system of the robotic apparatus, removing, via the robotic apparatus, lug nuts from a second wheel hub of the vehicle.

7. The method of claim 1, wherein obtaining the vehicle dimension information comprises:
obtaining a vehicle identification number associated with the vehicle;
accessing a database that comprises information related to a plurality of vehicles; and
obtaining the vehicle dimension data from the database based on the vehicle identification number.

8. The method of claim 7, wherein the vehicle dimension information includes at least one of dimensions of a wheel base of the vehicle and dimensions of a track width of the vehicle.

9. The method of claim 1, wherein determining a first reference point of the vehicle comprises:
aligning a plane of a digital camera with a plane of a first wheel of the vehicle having a center point; and
moving the digital camera to a position where a center point of the camera is aligned with a center point of the first wheel.

10. The method of claim 1, wherein determining a first reference point of the first wheel of the vehicle comprises:
obtaining, via one or more cameras, digital imagery of a first wheel of the vehicle, the first wheel having a plurality of lug nuts and a wheel center;
determining, using the digital imagery, a movement offset of a then current position of the robotic apparatus;
moving the robotic apparatus from the then current position to a new position based on the determined movement offset; and
determining whether the one or more cameras is aligned to the wheel center.

11. The method of claim 10, wherein the robotic apparatus has a digital camera, and wherein determining a first reference point of the first wheel of the vehicle comprises:
determining one or more movement offset values and moving the robotic apparatus based on the one or more movement offset values until an alignment point of the robotic apparatus is aligned to a center point of the first wheel, the alignment point being a center point of the digital camera.

12. The method of claim 11, wherein the movement offset comprises coordinate values for an x, y, z, rX, and rY offset, wherein x is an x axis value, wherein y is a y axis value, wherein z is a z axis value, wherein rY is a rotation value about the y axis value, and rX is a rotation value about the x axis value.

13. The method of claim 11, wherein the digital imagery comprises 2D imagery and a 3D point cloud of the first wheel, and wherein determining, using the digital imagery, the movement offset comprises the operations of
inputting into a machine learning model the 2D imagery and generating a plurality of bounding boxes associated with the lug nuts of the first wheel and determining a number of the lug nuts of the first wheel;
using the generated plurality of bounding boxes with the 3D point cloud to define x, y, z coordinate information for each of the plurality of lug nuts; and
calculating an average Z distance of the lug nuts.

14. A system comprising:
a robotic apparatus adapted to perform a maintenance task on a vehicle;
a processing device communicatively coupled to the robotic apparatus, the processing device comprising:
a memory storing computer program instructions; and
a processor communicatively coupled to the memory, the processor configured to execute the computer program instructions which, when executed on the processor, cause the processor to perform operations comprising:
obtaining vehicle dimension data describing dimensions of a vehicle;
causing, based at least in part on the vehicle dimension data, the robotic apparatus to move to a first position about the vehicle to collect data regarding a selected wheel of the vehicle;
determining a first reference point of the vehicle based at least in part on the collected data regarding the selected wheel; and
causing the robotic apparatus to move to a second position about the vehicle based on the determined first reference point.

15. The system of claim 14, wherein the determined first reference point is a center point of a first wheel of the vehicle.

16. The system of claim 15, the operations further comprising:
aligning a coordinate system of the robotic apparatus to the determined first reference point of the first wheel of the vehicle; and
based on the aligned coordinate system of the robotic apparatus, causing the robotic apparatus to remove lug nuts from a first wheel hub of the vehicle.

17. The system of claim 14, the operations further comprising:
causing the robotic apparatus to move to a second position about a second wheel of the vehicle;
determining a second reference point of the second wheel of the vehicle; and
causing the robotic apparatus to move to positions about the second wheel of the vehicle based on the determined second reference point.

18. The system of claim 17, wherein the determined second reference point is a center point of the second wheel of the vehicle.

19. The system of claim 18, the operations further comprising:
aligning a coordinate system of the robotic apparatus to the determined second reference point of the second wheel; and
based on the aligned coordinate system of the robotic apparatus, causing the robotic apparatus to remove lug nuts from a second wheel hub of the vehicle.

20. A computer-implemented method comprising the operations of:
obtaining vehicle dimension data describing dimensions of a vehicle;
causing a robotic apparatus to move to a first position about the vehicle;
determining a first reference point of the vehicle; and
causing the robotic apparatus to move to a second position about the vehicle based on the determined first reference point;
wherein determining the first reference point of the first wheel of the vehicle comprises:
obtaining, via one or more cameras, digital imagery of a first wheel of the vehicle, the first wheel having a plurality of lug nuts and a wheel center;
determining, using the digital imagery, a movement offset of a then current position of the robotic apparatus;

moving the robotic apparatus from the then current position to a new position based on the determined movement offset; and determining whether the one or more cameras is aligned to the wheel center, wherein the robotic apparatus is moved from the then current position to the new position until an alignment point of the robotic apparatus is aligned to a center point of the first wheel, wherein the alignment point is a center point of the digital camera;

wherein the movement offset comprises coordinate values for an x, y, z, rX, and rY offset, wherein x is an x axis value, wherein y is a y axis value, wherein z is a z axis value, wherein rY is a rotation value about the y axis value, and rX is a rotation value about the x axis value.

* * * * *